US012566489B2

(12) United States Patent
Armstrong-Muntner et al.

(10) Patent No.: US 12,566,489 B2
(45) Date of Patent: Mar. 3, 2026

(54) MONITORING A USER OF A HEAD-WEARABLE ELECTRONIC DEVICE

(71) Applicant: Apple Inc., Cupertino, CA (US)

(72) Inventors: Joel S. Armstrong-Muntner, San Carlos, CA (US); Nicholas P. Allec, Santa Cruz, CA (US); James E. Stark, New York, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/821,659

(22) Filed: Aug. 30, 2024

(65) Prior Publication Data

US 2024/0419239 A1 Dec. 19, 2024

Related U.S. Application Data

(60) Continuation of application No. 18/059,347, filed on Nov. 28, 2022, now Pat. No. 12,086,304, which is a continuation of application No. 17/938,596, filed on Oct. 6, 2022, now abandoned, which is a division of application No. 17/073,936, filed on Oct. 19, 2020, now abandoned, which is a continuation of application No. 16/144,485, filed on Sep. 27, 2018, now Pat. No. 10,809,796.

(60) Provisional application No. 62/718,937, filed on Aug. 14, 2018, provisional application No. 62/565,272, filed on Sep. 29, 2017.

(51) Int. Cl.
G06F 3/01 (2006.01)
G02B 27/01 (2006.01)
G06F 1/16 (2006.01)
G06F 3/03 (2006.01)
G06N 20/00 (2019.01)

(52) U.S. Cl.
CPC ............ *G06F 3/011* (2013.01); *G02B 27/017* (2013.01); *G06F 1/163* (2013.01); *G06F 3/012* (2013.01); *G06F 3/017* (2013.01); *G06F 3/0304* (2013.01); *G06N 20/00* (2019.01)

(58) Field of Classification Search
CPC .......... G06F 3/011; G06F 3/012; G06F 3/017; G06F 3/0304; G06F 1/163; G02B 27/017; G06N 20/00
See application file for complete search history.

(56) References Cited

U.S. PATENT DOCUMENTS 7,221,374 B2 * 5/2007 Dixon .................. G09G 3/3413
345/589
7,515,054 B2 4/2009 Torch
(Continued)

OTHER PUBLICATIONS

Final Office Action received for U.S. Appl. No. 17/073,936, mailed on Jun. 6, 2022, 22 pages.
(Continued)

*Primary Examiner* — Gene W Lee
(74) *Attorney, Agent, or Firm* — Kubota & Basol LLP

(57) ABSTRACT

Systems, methods, and computer-readable media for monitoring a user of a head-wearable electronic device with multiple light-sensing assemblies. For instance, methods and/or related systems or computer readable media programmed to perform the methods, directed to the selection of light sensing assemblies and/or light sensor data based on the detected saturation of the light-sensing assemblies and/or components.

20 Claims, 16 Drawing Sheets

(56) References Cited

U.S. PATENT DOCUMENTS

| | | | | |
|---|---|---|---|---|
| 8,154,478 | B2 * | 4/2012 | Park | G09G 3/3208 |
| | | | | 345/82 |
| 8,305,370 | B2 * | 11/2012 | Song | G09G 3/3275 |
| | | | | 345/207 |
| 8,432,340 | B2 * | 4/2013 | Okita | G09G 3/3648 |
| | | | | 345/694 |
| 8,686,981 | B2 * | 4/2014 | Barnhoefer | H05B 45/12 |
| | | | | 345/207 |
| 8,884,939 | B2 * | 11/2014 | Barnhoefer | H05B 45/12 |
| | | | | 345/207 |
| 9,119,261 | B2 * | 8/2015 | Barnhoefer | H05B 45/12 |
| 9,171,198 | B1 | 10/2015 | Raffle et al. | |
| 9,355,314 | B2 * | 5/2016 | Yang | G06V 10/143 |
| 9,542,016 | B2 | 1/2017 | Armstrong-muntner | |
| 9,807,291 | B1 | 10/2017 | Tome et al. | |
| 10,121,063 | B2 | 11/2018 | Von Und Zu Liechtenstein | |
| 10,252,058 | B1 | 4/2019 | Fuerst | |
| 10,509,466 | B1 | 12/2019 | Miller et al. | |
| 10,592,002 | B2 * | 3/2020 | Iyer | G06F 3/0346 |
| 10,747,327 | B2 * | 8/2020 | Iyer | G06F 3/017 |
| 2013/0050258 | A1 | 2/2013 | Liu et al. | |
| 2013/0289886 | A1 | 10/2013 | Ricks | |
| 2014/0354514 | A1 | 12/2014 | Aronsson | |
| 2015/0058615 | A1 | 2/2015 | Lee | |
| 2015/0087924 | A1 | 3/2015 | Li et al. | |
| 2015/0139509 | A1 | 5/2015 | Yang | |
| 2016/0187652 | A1 | 6/2016 | Fujimaki et al. | |
| 2017/0090567 | A1 | 3/2017 | Allec et al. | |
| 2017/0111723 | A1 | 4/2017 | Boesen | |
| 2017/0323485 | A1 | 11/2017 | Samec et al. | |
| 2017/0371417 | A1 | 12/2017 | Iyer et al. | |
| 2018/0061128 | A1 | 3/2018 | Cabanier et al. | |
| 2018/0137395 | A1 | 5/2018 | Han et al. | |
| 2019/0018485 | A1 | 1/2019 | Aleem et al. | |
| 2019/0101977 | A1 | 4/2019 | Armstrong-muntner et al. | |
| 2019/0101984 | A1 | 4/2019 | Talati et al. | |
| 2019/0313073 | A1 * | 10/2019 | Patel | G06V 20/584 |
| 2019/0350472 | A1 | 11/2019 | Zhovnirovsky | |
| 2019/0384408 | A1 * | 12/2019 | Iyer | G02B 27/017 |
| 2020/0174262 | A1 | 6/2020 | Godar et al. | |
| 2021/0034145 | A1 | 2/2021 | Armstrong-muntner et al. | |
| 2023/0297163 | A1 | 9/2023 | Armstrong-muntner et al. | |

OTHER PUBLICATIONS

Final Office Action received for U.S. Appl. No. 18/059,347, mailed on Jan. 19, 2024, 7 pages.
Non-Final Office Action received for U.S. Appl. No. 16/144,485, mailed on Feb. 7, 2020, 15 pages.
Non-Final Office Action received for U.S. Appl. No. 17/073,936, mailed on Dec. 15, 2021, 16 pages.
Non-Final Office Action received for U.S. Appl. No. 18/059,347, mailed on Aug. 17, 2023, 17 pages.
Notice of Allowance received for U.S. Appl. No. 16/144,485, mailed on Jun. 15, 2020, 15 pages.
Notice of Allowance received for U.S. Appl. No. 18/059,347, mailed on May 3, 2024, 10 pages.
Restriction Requirement received for U.S. Appl. No. 16/144,485, mailed on Nov. 15, 2019, 9 pages.
Goudreau, Jenna, "7 Signs Someone's Not Listening To You", Business Insider, Available online at: <https://www.businessinsider.com/signs-someone-is-not-listening-2014-6>, Jun. 11, 2014, 3 pages.
Quora, "Does a blank facial expression still count as a nonverbal cue?", Available online at: <https://www.quora.com/Does-a-blank-facial-expression-still-count-as-a-nonverbal-cue>, Nov. 19, 2017, 4 pages.

* cited by examiner

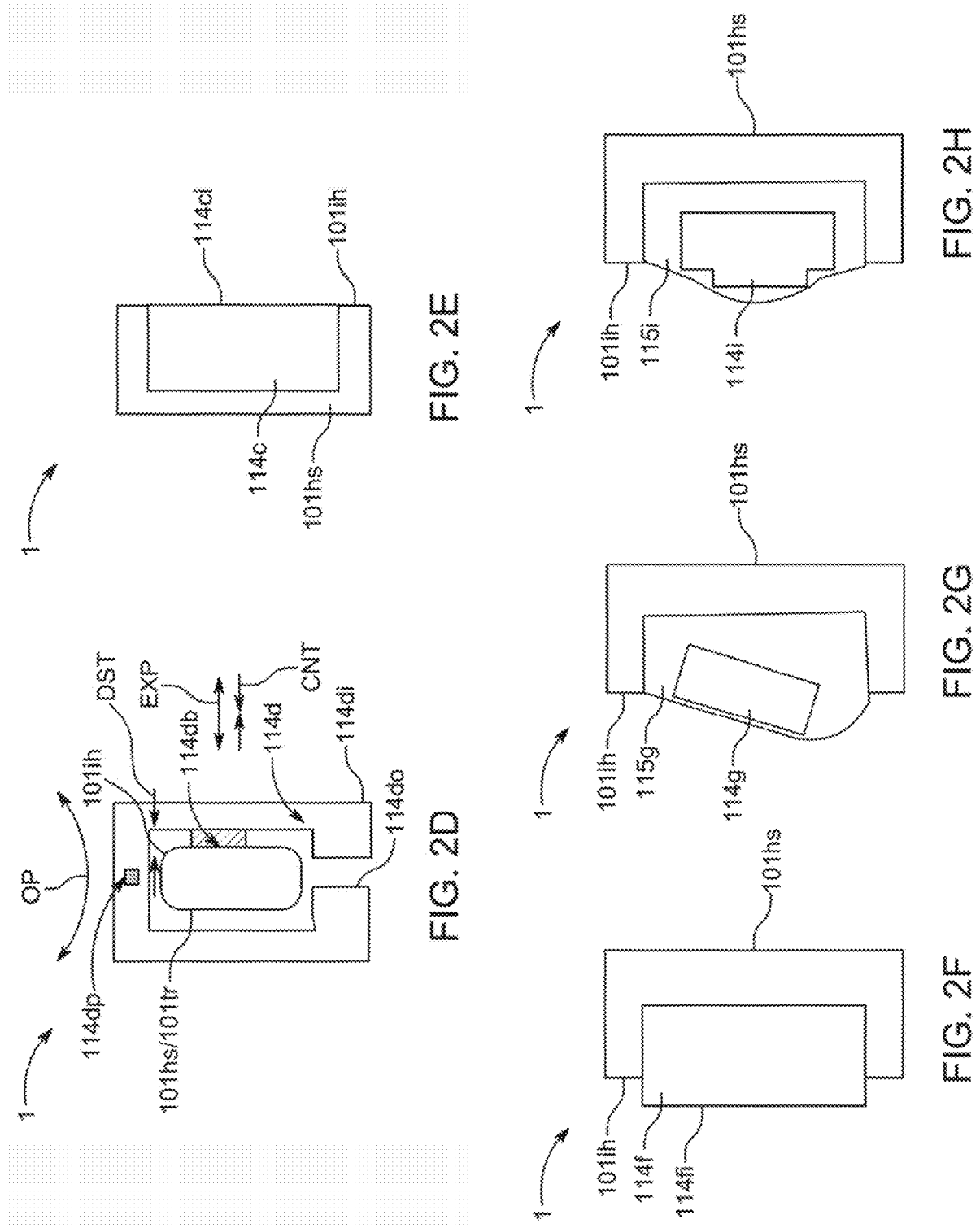

500a

Amplitude Difference - Left vs. Right Side Sensor Data (Chewing)

500b

Amplitude Difference - Left vs. Right Side Sensor Data (Open&Close Right Side of Mouth)

500c

Amplitude Difference - Left vs. Right Side Sensor Data (Stationary)

500d

508

509

507

Amplitude Difference - Left vs. Right Side Sensor Data (Clustered)

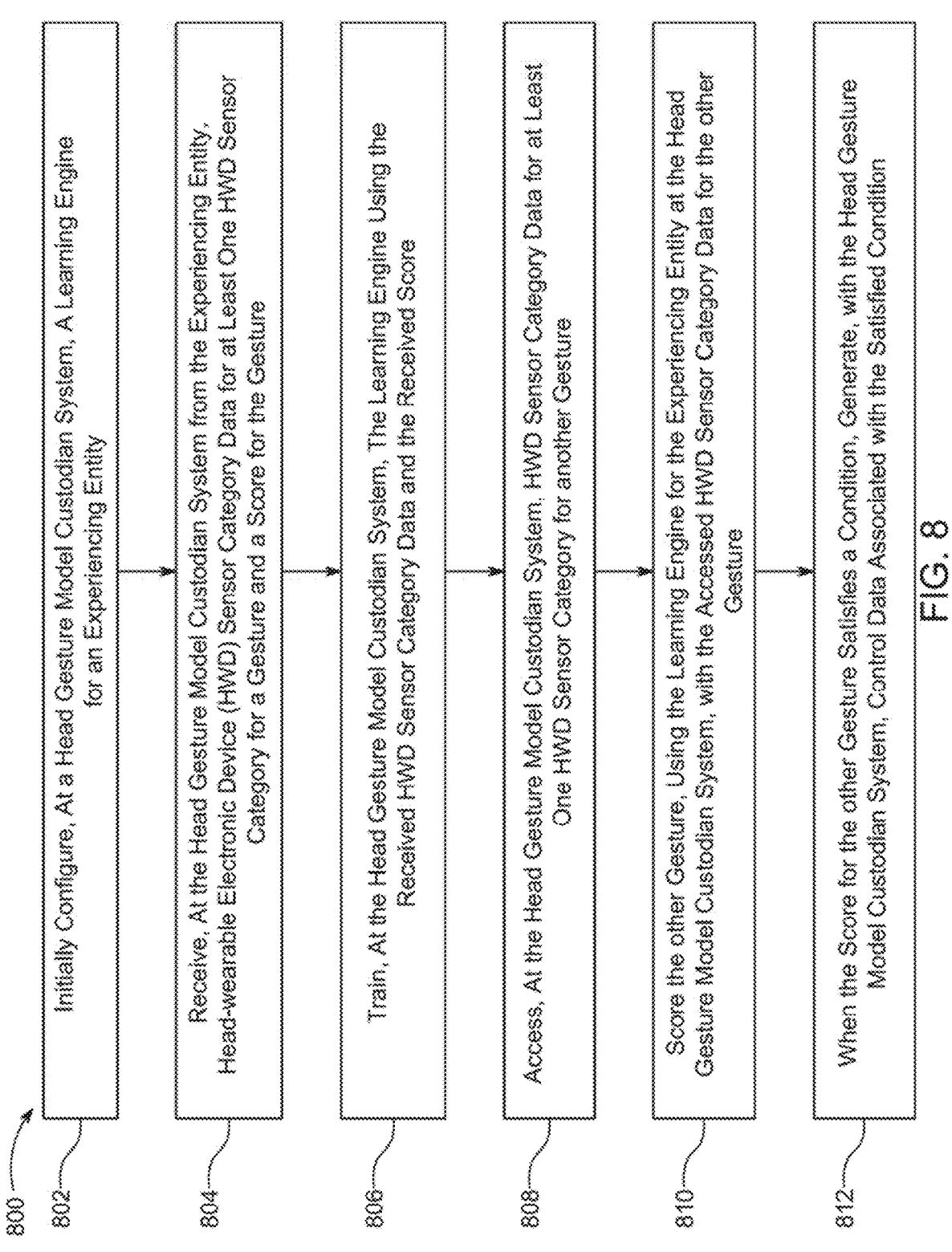

800

802 — Initially Configure, At a Head Gesture Model Custodian System, A Learning Engine for an Experiencing Entity 804 — Receive, At the Head Gesture Model Custodian System from the Experiencing Entity, Head-wearable Electronic Device (HWD) Sensor Category Data for at Least One HWD Sensor Category for a Gesture and a Score for the Gesture 806 — Train, At the Head Gesture Model Custodian System, The Learning Engine Using the Received HWD Sensor Category Data and the Received Score 808 — Access, At the Head Gesture Model Custodian System, HWD Sensor Category Data for at Least One HWD Sensor Category for another Gesture 810 — Score the other Gesture, Using the Learning Engine for the Experiencing Entity at the Head Gesture Model Custodian System, with the Accessed HWD Sensor Category Data for the other Gesture 812 — When the Score for the other Gesture Satisfies a Condition, Generate, with the Head Gesture Model Custodian System, Control Data Associated with the Satisfied Condition

FIG. 8

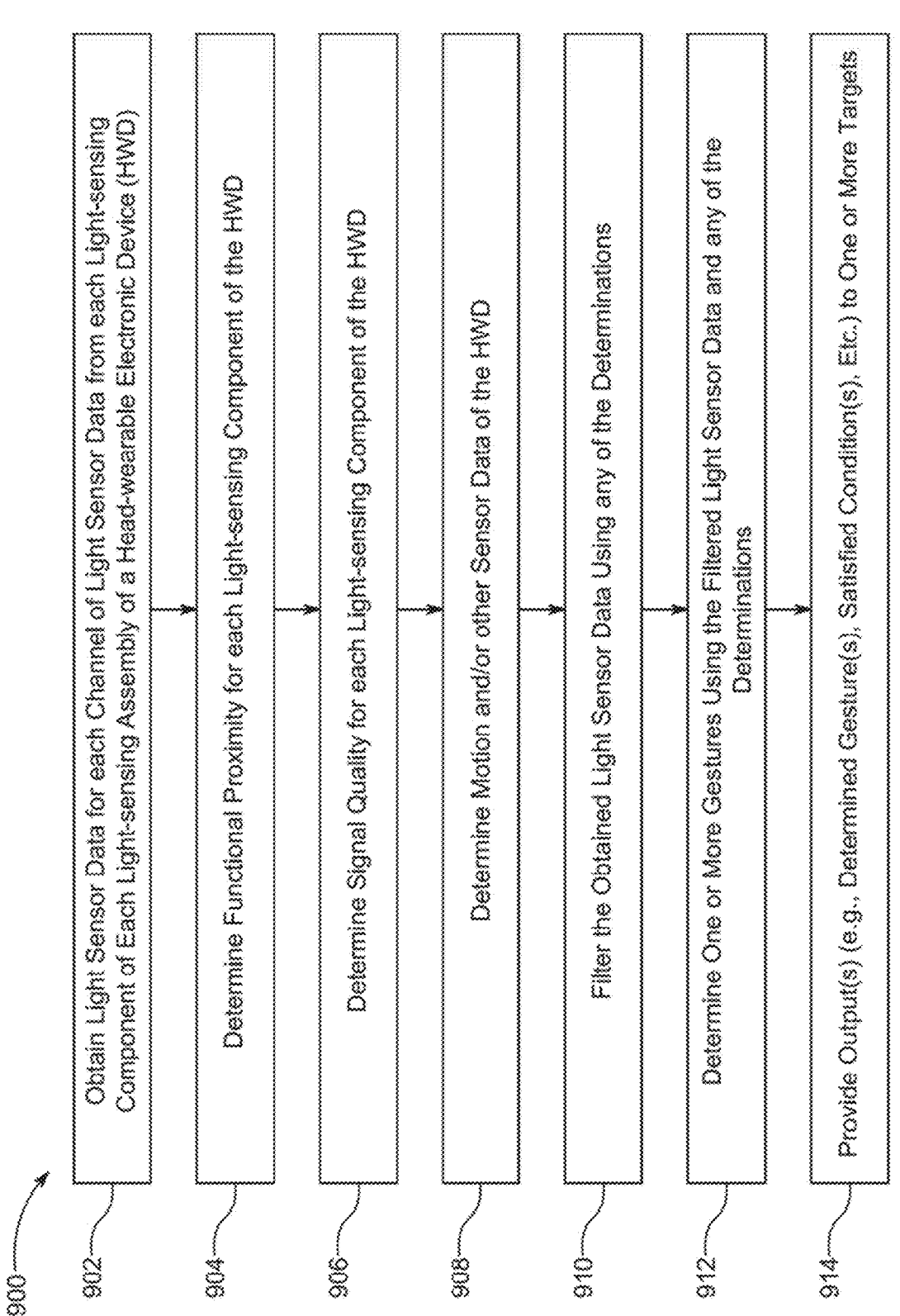

900

902 — Obtain Light Sensor Data for each Channel of Light Sensor Data from each Light-sensing Component of Each Light-sensing Assembly of a Head-wearable Electronic Device (HWD)

904 — Determine Functional Proximity for each Light-sensing Component of the HWD 906 — Determine Signal Quality for each Light-sensing Component of the HWD 908 — Determine Motion and/or other Sensor Data of the HWD 910 — Filter the Obtained Light Sensor Data Using any of the Determinations 912 — Determine One or More Gestures Using the Filtered Light Sensor Data and any of the Determinations 914 — Provide Output(s) (e.g., Determined Gesture(s), Satisfied Condition(s), Etc.) to One or More Targets

FIG. 9

MONITORING A USER OF A HEAD-WEARABLE ELECTRONIC DEVICE

CROSS-REFERENCE(S) TO RELATED APPLICATION(S)

This application is a continuation of U.S. patent application Ser. No. 18/059,347, filed Nov. 28, 2022 and published on Sep. 21, 2023 as U.S. Publication No. 2023-0297163, which is a continuation of U.S. patent application Ser. No. 17/938,596, filed Oct. 6, 2022, which is a divisional of U.S. patent application Ser. No. 17/073,936, filed Oct. 19, 2020 and published on Feb. 4, 2021 as U.S. Publication No. 2021-0034145, which is a continuation of U.S. patent application Ser. No. 16/144,485, filed Sep. 27, 2018, and issued on Oct. 20, 2020 as U.S. Pat. No. 10,809,796, which claims the benefit of prior filed U.S. Provisional Patent Application No. 62/565,272, filed Sep. 29, 2017, and prior filed U.S. Provisional Patent Application No. 62/718,937, filed Aug. 14, 2018, each of which is hereby incorporated by reference herein in its entirety for all purposes.

TECHNICAL FIELD

This disclosure relates to the monitoring of a user of a head-wearable electronic device and, more particularly, to the monitoring of a user of a head-wearable electronic device with multiple light-sensing assemblies.

BACKGROUND OF THE DISCLOSURE

A portable electronic device (e.g., a cellular telephone) may be provided with one or more sensing components (e.g., one or more touch sensors, sound sensors, etc.) that may be utilized for enabling a user to control a functionality of the electronic device. However, such control often requires the user to interact with the sensing components actively, such as via touch or speech.

SUMMARY OF THE DISCLOSURE

This document describes systems, methods, and computer-readable media for monitoring a user of a head-wearable electronic device.

For example, a method of detecting head gestures performed by a user's head wearing an electronic device including a plurality of light-sensing components is provided that may include, during a first period in which the user performs a first head gesture, collecting first sensor data from the plurality of light-sensing components, during a second period in which the user performs a second head gesture, collecting second sensor data from the plurality of light-sensing components, calculating first signal characteristics based on the first sensor data, calculating second signal characteristics based on the second sensor data, assigning some or all of the first signal characteristics to a first cluster of signal characteristics, assigning some or all of the second signal characteristics to a second cluster of signal characteristics, during a third period, collecting third sensor data from the plurality of light-sensing components, calculating third signal characteristics based on the third sensor data, determining whether the third signal characteristics belong to the first cluster, the second cluster, or a third cluster, in accordance with a determination that the third signal characteristics belong to the first cluster, determining that the user has performed the first head gesture, in accordance with a determination that the third signal characteristics belong to the second cluster, determining that the user has performed the second head gesture, and, in accordance with a determination that the third signal characteristics belong to the third cluster, determining that the user has not performed the first head gesture or the second head gesture.

As another example, a method for monitoring a user wearing a head-wearable electronic device (HWD) on the user's head using a head gesture model custodian system is provided that may include initially configuring, at the head gesture model custodian system, a learning engine, receiving, at the head gesture model custodian system from the HWD, HWD sensor category data for at least one HWD sensor category for a head gesture and a score for the head gesture, training, at the head gesture model custodian system, the learning engine using the received HWD sensor category data and the received score, accessing, at the head gesture model custodian system, HWD sensor category data for the at least one HWD sensor category for another head gesture, scoring the other head gesture, using the learning engine for the HWD at the head gesture model custodian system, with the accessed HWD sensor category data for the other head gesture, and, when the score for the other head gesture satisfies a condition, generating, with the head gesture model custodian system, control data associated with the satisfied condition.

As yet another example, a head-wearable electronic device is provided that may include a head-wearable housing structure including an eye frame, a right temple frame extending from the eye frame, and a left temple frame extending from the eye frame, wherein, when the head-wearable electronic device is worn on a head of a user, the head-wearable housing structure is configured such that the eye frame is positioned in front of at least one eye of the user's head, the right temple frame is held against a right surface of the user's head, and the left temple frame is held against a left surface of the user's head, a right light-sensing assembly supported by the right temple frame including a right light-emitting component operative to emit light into the right surface of the user's head when the head-wearable electronic device is worn on the head of the user, and a right light-sensing component operative to sense right light including at least a portion of the light emitted by the right light-emitting component, a left light-sensing assembly supported by the left temple frame including a left light-emitting component operative to emit light into the left surface of the user's head when the head-wearable electronic device is worn on the head of the user, and a left light-sensing component operative to sense left light including at least a portion of the light emitted by the left light-emitting component, and a processor operative to analyze light data indicative of at least one of the sensed right light and the sensed left light, and determine a head gesture of the user based on the analyzed light data.

As yet another example, a product is provided that may include a non-transitory computer-readable medium and computer-readable instructions, stored on the computer-readable medium, that, when executed, are effective to cause a computer to receive, from a head-wearable electronic device (HWD) worn by a user, sensor category data for at least one HWD sensor category for a head gesture of the user and a type of the head gesture, train a learning engine using the received HWD sensor category data and the received type of the head gesture, access HWD sensor category data for the at least one HWD sensor category for another head gesture of the user, and determine a type of the other head gesture, using the learning engine with the accessed HWD sensor category data for the other head gesture.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 2D shows a cross-sectional view of the head-wearable electronic device of the system of FIGS. 1-2C, taken from line IID-IID of FIG. 2B;

FIG. 2E shows a cross-sectional view of the head-wearable electronic device of the system of FIGS. 1-2D, taken from line IIE-IIE of FIG. 2B;

FIG. 2F shows a cross-sectional view of the head-wearable electronic device of the system of FIGS. 1-2E, taken from line IIF-IIF of FIG. 2B;

FIG. 2G shows a cross-sectional view of the head-wearable electronic device of the system of FIGS. 1-2F, taken from line IIG-IIG of FIG. 2B;

FIG. 2H shows a cross-sectional view of the head-wearable electronic device of the system of FIGS. 1-2G, taken from line IIH-IIH of FIG. 2B;

FIGS. 6-10 are flowcharts of illustrative processes for monitoring a user of a head-wearable electronic device.

DETAILED DESCRIPTION OF THE DISCLOSURE

Systems, methods, and computer-readable media may be provided to monitor a user of a head-wearable electronic device. Such a head-wearable electronic device may be any suitable structure that may be worn on any suitable portion of a user's head, including, but not limited to, eyeglasses (e.g., a pair of augmented reality eyeglasses, reading glasses, sunglasses, etc.), virtual reality head-mounted display, goggles (e.g., athletic goggles, welding goggles, etc.), hat, helmet, headband, or the like, and that may provide one or more light sensing assemblies operative to detect light reflected by and/or transmitted through a portion of the user's head (e.g., using photoplethysmography ("PPG")). For example, the head-wearable electronic device may include any suitable number of photodiodes or any other suitable type(s) of optical sensors, each of which may be provided at a respective different location along the structure of the head-wearable device in order to sense light at a respective different position along the head of the user when the device is worn by the user's head. Due to such positioning, the sensor data from the light sensors can capture movement of anatomical features in the tissue of the head of the user and can be used to determine any suitable gestures of the user, where such user gestures or head gestures may refer to any suitable gestures (e.g., voluntary and/or involuntary gestures of any suitable portion(s) of a user's head) and/or motions and/or actions and/or vocalizations and/or emotions and/or thoughts and/or brain functions and/or heart rate characteristics and/or other biometric characteristics of the user. Further, different light emitters of the device can emit light at different wavelengths (e.g., infrared ("IR") light, green light, etc.), which may penetrate to different depths in the tissue of the user's head before reflecting back to or otherwise being detected by the photodiodes of the device. Accordingly, sensor data from the photodiodes can capture expansion, contraction, and/or any other suitable movement in the tissue of the user during a head gesture. Various different head gestures, including, but not limited to, chewing, blinking, winking, smiling, eyebrow raising, jaw motioning (e.g., jaw protrusion, jaw retrusion, lateral jaw excursion, jaw depression, jaw elevation, etc.), mouth opening, and/or the like, may be detected by recognizing patterns in sensor data that may be characteristic of each head gesture, as head tissue may expand and contract and anatomical features in the tissue may move during such user gestures.

Figure 1:
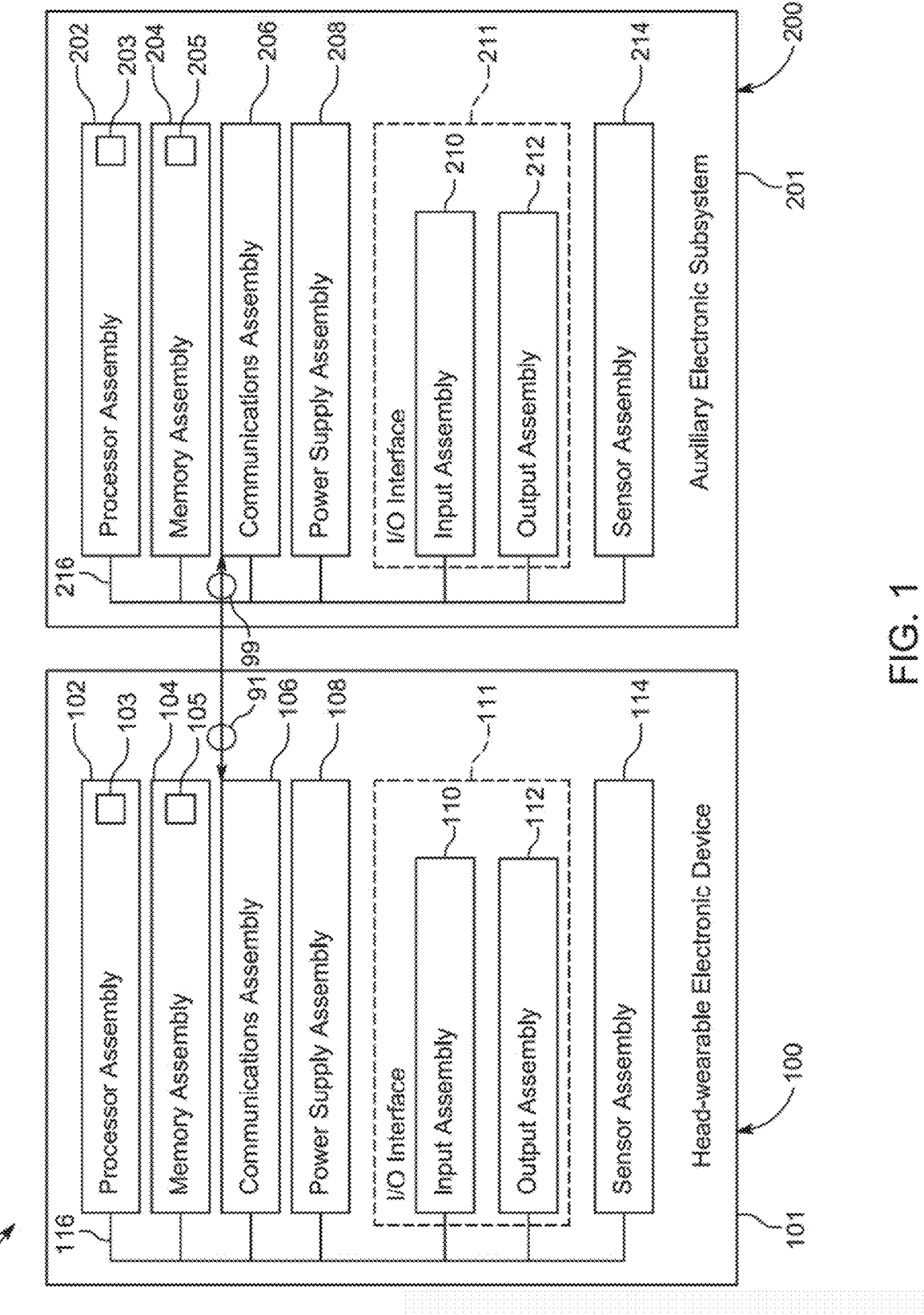
FIG. 1 is a schematic view of an illustrative system with a head-wearable electronic device for monitoring a user.

FIG. 1 is a schematic view of an illustrative system 1 that includes a head-wearable electronic device 100 for monitoring a user. Head-wearable electronic device 100 may be any suitable electronic device that may include at least one light-sensing assembly and that may be at least partially worn on any suitable portion of a user's head. For example, head-wearable electronic device 100 may include, but is not limited to, a helmet, eyeglasses (e.g., sunglasses, reading glasses, novelty glasses, augmented reality eyeglasses, etc.), a headset, headphones, earphones, over-ear speakers, in-car speakers, a head-mounted display device (e.g., any monocular or binocular or optical head-mounted display device for virtual reality applications or any other suitable use), goggles, a hat, a headband, a mask, a hood, a head chain, earrings, earmuffs, or any combination thereof that may be at least partially worn on a user's head and operative to position at least one light-sensing assembly against or facing or otherwise proximate any suitable portion of the user's head for sensing light that may be reflected thereby and/or transmitted therethrough.

As shown in FIG. 1, for example, head-wearable electronic device 100 may include a processor assembly 102, a memory assembly 104, a communications assembly 106, a power supply assembly 108, an input assembly 110, an output assembly 112, and a sensor assembly 114. Head-wearable electronic device ("HWD") 100 may also include a bus 116 that may provide one or more wired or wireless communication links or paths for transferring data and/or power to, from, or between various assemblies of HWD 100. In some embodiments, one or more assemblies of HWD 100 may be combined or omitted. Moreover, HWD 100 may include any other suitable assemblies not combined or included in FIG. 1 and/or several instances of the assemblies shown in FIG. 1. For the sake of simplicity, only one of each of the assemblies is shown in FIG. 1.

Memory assembly 104 may include one or more storage mediums, including, for example, a hard-drive, flash memory, permanent memory such as read-only memory ("ROM"), semi-permanent memory such as random access memory ("RAM"), any other suitable type of storage assembly, or any combination thereof. Memory assembly 104 may include cache memory, which may be one or more different types of memory used for temporarily storing data for electronic device applications. Memory assembly 104 may be fixedly embedded within electronic device 100 or may be incorporated onto one or more suitable types of components that may be repeatedly inserted into and removed from HWD 100 (e.g., a subscriber identity module ("SIM") card or secure digital ("SD") memory card). Memory assembly 104 may store media data (e.g., music and image files), software (e.g., for implementing functions on HWD 100), firmware, preference information (e.g., media playback preferences), lifestyle information (e.g., food preferences), exercise information (e.g., information obtained by exercise monitoring applications), sleep information (e.g., information obtained by sleep monitoring applications), mindfulness information (e.g., information obtained by mindfulness monitoring applications), transaction information (e.g., credit card information), wireless connection information (e.g., information that may enable HWD 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any suitable head gesture data of HWD 100 (e.g., as may be stored in any suitable head gesture cluster data 105 of memory assembly 104), any other suitable data, or any combination thereof.

Communications assembly 106 may be provided to allow HWD 100 to communicate with one or more other electronic devices or servers or subsystems or any other entities remote from HWD 100 (e.g., with electronic subsystem 200 of system 1 of FIG. 1) using any suitable communications protocol(s). For example, communications assembly 106 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHZ, 2.4 GHZ, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, near field communication ("NFC"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications assembly 106 may also include or may be electrically coupled to any suitable transceiver circuitry that can enable HWD 100 to be communicatively coupled to another device (e.g., a server, host computer, scanner, accessory device, subsystem, etc.) and communicate data with that other device wirelessly or via a wired connection (e.g., using a connector port). Communications assembly 106 (and/or sensor assembly 114) may be configured to determine a geographical position of HWD 100 and/or any suitable data that may be associated with that position. For example, communications assembly 106 may utilize a global positioning system ("GPS") or a regional or site-wide positioning system that may use cell tower positioning technology or Wi-Fi™ technology, or any suitable location-based service or real-time locating system, which may use a geo-fence for providing any suitable location-based data to HWD 100 (e.g., to determine a current geo-location of HWD 100 and/or any other suitable associated data (e.g., the current location is a library, the current location is outside, the current location is your home, etc.)).

Power supply assembly 108 may include any suitable circuitry for receiving and/or generating power, and for providing such power to one or more of the other assemblies of HWD 100. For example, power supply assembly 108 can be coupled to a power grid (e.g., when HWD 100 is not acting as a portable device or when a battery of the device is being charged at an electrical outlet with power generated by an electrical power plant). As another example, power supply assembly 108 may be configured to generate power from a natural source (e.g., solar power using solar cells). As another example, power supply assembly 108 can include one or more batteries for providing power (e.g., when HWD 100 is acting as a portable device).

One or more input assemblies 110 may be provided to permit a user or device environment to interact or interface with HWD 100. For example, input assembly 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to HWD 100 for authenticating a user), line-in connector for data and/or power, and combinations thereof. Each input assembly 110 can be configured to provide one or more dedicated control functions for making selections or issuing commands associated with operating HWD 100. Each input assembly 110 may be positioned at any suitable location at least partially within a space defined by a housing 101 of HWD 100 and/or at least partially on an external surface of housing 101 of HWD 100.

HWD 100 may also include one or more output assemblies 112 that may present information (e.g., graphical, audible, olfactory, and/or tactile information) to a user of HWD 100. For example, output assembly 112 of HWD 100 may take various forms, including, but not limited to, audio speakers, headphones, line-out connectors for data and/or power, visual displays (e.g., for transmitting data via visible light and/or via invisible light), infrared ports, flashes (e.g., light sources for providing artificial light for illuminating an environment of the device), tactile/haptic outputs (e.g., rumblers, vibrators, etc.), and combinations thereof. As a specific example, HWD 100 may include a display assembly output assembly as output assembly 112, where such a display assembly output assembly may include any suitable type of display or interface for presenting visual data to a user with visible light.

It is noted that one or more input assemblies and one or more output assemblies may sometimes be referred to collectively herein as an input/output ("I/O") assembly or I/O interface (e.g., input assembly 110 and output assembly 112 as I/O assembly or user interface assembly or I/O interface 111). For example, input assembly 110 and output assembly 112 may sometimes be a single I/O interface 111, such as a touch screen, that may receive input information through a user's touch of a display screen and that may also provide visual information to a user via that same display screen.

Sensor assembly 114 may include any suitable sensor or any suitable combination of sensors or sensor assemblies that may be operative to detect movements of HWD 100 and/or of a user thereof and/or any other characteristics of HWD 100 and/or of its environment (e.g., physical activity or other characteristics of a user of HWD 100, light content of the device environment, gas pollution content of the device environment, noise pollution content of the device environment, etc.). Sensor assembly 114 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like.

Sensor assembly 114 may include any suitable sensor components or subassemblies for detecting any suitable movement of HWD 100 and/or of a user thereof. For example, sensor assembly 114 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor assembly 114 may include one or more single-axis or two-axis acceleration motion sensors that may be operative to detect linear acceleration only along each of the x- or left/right direction and the y- or up/down direction, or along any other pair of directions. In some embodiments, sensor assembly 114 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor assembly 114 may be operative to directly or indirectly detect rotation, rotational movement, angular displacement, tilt, position, orientation, motion along a non-linear (e.g., arcuate) path, or any other non-linear motions. Additionally or alternatively, sensor assembly 114 may include one or more angular rate, inertial, and/or gyro-motion sensors or gyroscopes for detecting rotational movement. For example, sensor assembly 114 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor assembly 114 for detecting motion on HWD 100, such as any suitable pressure sensors, altimeters, or the like. Using sensor assembly 114, HWD 100 may be configured to determine a velocity, acceleration, orientation, and/or any other suitable motion attribute of HWD 100.

Sensor assembly 114 may include any suitable sensor components or subassemblies for detecting any suitable biometric data and/or health data and/or sleep data and/or mindfulness data and/or the like of a user of HWD 100. For example, sensor assembly 114 may include any suitable biometric sensor that may include, but is not limited to, one or more health-related optical sensors, capacitive sensors, thermal sensors, electric field ("eField") sensors, and/or ultrasound sensors, such as photoplethysmogram ("PPG") sensors, electrocardiogram sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, heart rate ("HR"), heart rate variability ("HRV"), and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as an HWD, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, HWD 100 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of HWD 100 can be used to determine a user's location (e.g., geo-location and/or address and/or location type (e.g., library, school, office, zoo, etc.) and movement, as well as a displacement of the user's motion. An accelerometer, directional sensor, and/or gyroscope can further generate activity data that can be used to determine whether a user of HWD 100 is engaging in an activity, is inactive, or is performing a gesture. Any suitable activity of a user may be tracked by sensor assembly 114, including, but not limited to, steps taken, flights of stairs climbed, calories burned, distance walked, distance run, minutes of exercise performed and exercise quality, time of sleep and sleep quality, nutritional intake (e.g., foods ingested and their nutritional value), mindfulness activities and quantity and quality thereof (e.g., reading efficiency, data retention efficiency), any suitable work accomplishments of any suitable type (e.g., as may be sensed or logged by user input information indicative of such accomplishments), and/or the like. HWD 100 can further include a timer that can be used, for example, to add time dimensions to various attributes of the detected physical activity, such as a duration of a user's physical activity or inactivity, time(s) of a day when the activity is detected or not detected, and/or the like.

Sensor assembly 114 may include any suitable sensor components or subassemblies for detecting any suitable characteristics of any suitable condition of the lighting of the environment of HWD 100. For example, sensor assembly 114 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of device 100 (e.g., in lux or lumens per square meter, etc.) and/or for determining the ambient color or white point chromaticity of ambient light in the environment of device 100 (e.g., in hue and colorfulness or in x/y parameters with respect to an x-y chromaticity space, etc.) and/or for determining the UV index or UV radiation in the environment of device 100 (e.g., in UV index units, etc.). A suitable light sensor may include, for example, a photodiode, a phototransistor, an integrated photodiode and amplifier, or any other suitable photo-sensitive device. In some embodiments, more than one light sensor may be integrated into HWD 100. For example, multiple narrowband light sensors may be integrated into HWD 100 and each light sensor may be sensitive in a different portion of the light spectrum (e.g., three narrowband light sensors may be integrated into a single sensor package: a first light sensor may be sensitive to light in the red or infrared region of the electromagnetic spectrum; a second light sensor may be sensitive in a blue region of the electromagnetic spectrum; and a third light sensor may be sensitive in the green portion of the electromagnetic spectrum). Additionally or alternatively, one or more broadband light sensors may be integrated into HWD 100. The sensing frequencies of each narrowband sensor may also partially overlap, or nearly overlap, that of another narrowband sensor. Each of the broadband light sensors may be sensitive to light throughout the spectrum of visible light and the various ranges of visible light (e.g., red, green, and blue ranges) may be filtered out so that a determination may be made as to the color of the ambient light. As used herein, "white point" may refer to coordinates in a chromaticity curve that may define the color "white." For example, a plot of a chromaticity curve from the Commission International de l'Eclairage ("CIE") may be accessible to system 1 (e.g., as a portion of data stored by memory assembly 104), wherein the circumference of the chromaticity curve may represent a range of wavelengths in nanometers of visible light and, hence, may represent true colors, whereas points contained within the area defined by the chromaticity curve may represent a mixture of colors. A Planckian curve may be defined within the area defined by the chromaticity curve and may correspond to colors of a black body when heated. The Planckian curve passes through a white region (i.e., the region that includes a combination of all the colors) and, as such, the term "white point" is sometimes generalized as a point along the Planckian curve resulting in either a bluish white point or a yellowish white point. However, "white point" may also include points that are not on the Planckian curve. For example, in some cases the white point may have a reddish hue, a greenish hue, or a hue resulting from any combination of colors. The perceived white point of light sources may vary depending on the ambient lighting conditions in which the lights source is operating. Such a chromaticity curve plot may be used in coordination with any sensed light characteristics to determine the ambient color (e.g., true color) and/or white point chromaticity of the environment of HWD 100 in any suitable manner. Any suitable UV index sensors and/or ambient color sensors and/or illuminance sensors may be provided by sensor assembly 114 in order to determine the current UV index and/or chromaticity and/or illuminance of the ambient environment of device 100.

Sensor assembly 114 may include any suitable sensor components or subassemblies for detecting any suitable characteristics of any suitable condition of the air quality of the environment of HWD 100. For example, sensor assembly 114 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of HWD 100 (e.g., in $O_2$% per liter, etc.) and/or for determining the air velocity of the ambient air in the environment of HWD 100 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of HWD 100 (e.g., in HG % per liter, etc.) and/or for determining the humidity of the ambient air in the environment of HWD 100 (e.g., in grams of water per cubic meter, etc. (e.g., using a hygrometer)) and/or for determining the temperature of the ambient air in the environment of HWD 100 (e.g., in degrees Celsius, etc. (e.g., using a thermometer)).

Sensor assembly 114 may include any suitable sensor components or subassemblies for detecting any suitable characteristics of any suitable condition of the sound quality of the environment of HWD 100. For example, sensor assembly 114 may include any suitable sound quality sensor that may include, but is not limited to, one or more microphones or the like that may determine the level of sound pollution or noise in the environment of HWD 100 (e.g., in decibels, etc.). Sensor assembly 114 may also include any other suitable sensor for determining any other suitable characteristics about a user of HWD 100 and/or otherwise about the environment of device 100 and/or any situation within which HWD 100 may be existing. For example, any suitable clock and/or position sensor(s) may be provided to determine the current time and/or time zone within which HWD 100 may be located.

One or more sensors or sensor subassemblies of sensor assembly 114 may be embedded in a structural body (e.g., housing 101) of HWD 100, such as along a bottom surface that may be operative to contact a user, or can be positioned at any other desirable location. In some examples, different sensors can be placed in different locations inside or on the surfaces of HWD 100 (e.g., some located inside housing 101 and some attached to an attachment mechanism (e.g., a wrist band coupled to a housing of a wearable device), or the like). In other examples, one or more sensors can be worn by a user separately as different parts of a single HWD 100 or as different HWDs (e.g., as a pair of earrings). In such cases, the sensors can be configured to communicate with HWD 100 using a wired and/or wireless technology (e.g., via communications assembly 106). In some examples, sensors can be configured to communicate with each other and/or share data collected from one or more sensors. In some examples, HWD 100 can be waterproof such that the sensors can detect a user's activity in water.

Processor assembly 102 of HWD 100 may include any processing circuitry that may be operative to control the operations and performance of one or more assemblies of HWD 100. For example, processor assembly 102 may receive input signals from input assembly 110 and/or drive output signals through output assembly 112. As shown in FIG. 1, processor assembly 102 may be used to run one or more applications, such as an application 103. Application 103 may include, but is not limited to, one or more operating system applications, firmware applications, media playback applications, media editing applications, pass applications, calendar applications, state determination applications, biometric feature-processing applications, compass applications, health applications, mindfulness applications, sleep applications, thermometer applications, weather applications, thermal management applications, video game applications, comfort applications, device and/or user activity applications, or any other suitable applications. For example, processor assembly 102 may load application 103 as a user interface program to determine how instructions or data received via an input assembly 110 and/or sensor assembly 114 and/or any other assembly of HWD 100 (e.g., any suitable auxiliary subsystem data 91 that may be received by HWD 100 via communications assembly 106) may manipulate the one or more ways in which information may be stored on HWD 100 and/or provided to a user via an output assembly 112 and/or provided to an auxiliary subsystem (e.g., to subsystem 200 as auxiliary subsystem data 99 via communications assembly 106).

Application 103 may be accessed by processor assembly 102 from any suitable source, such as from memory assembly 104 (e.g., via bus 116) or from another remote device or server (e.g., from subsystem 200 of system 1 via communications assembly 106). Processor assembly 102 may include a single processor or multiple processors. For example, processor assembly 102 may include at least one "general purpose" microprocessor, a combination of general and special purpose microprocessors, instruction set processors, graphics processors, video processors, and/or related chips sets, and/or special purpose microprocessors. Processor assembly 102 also may include on board memory for caching purposes.

One particular type of application available to processor assembly 102 may be an activity application 103 that may be operative to determine or predict a current or planned activity of device 100 and/or for a user thereof. Such an activity may be determined by activity application 103 based on any suitable data accessible by activity application 103 (e.g., from memory assembly 104 and/or from any suitable remote entity (e.g., any suitable auxiliary subsystem data 91 from any suitable auxiliary subsystem 200 via communications assembly 106)), such as data from any suitable activity data source, including, but not limited to, a calendar application, a gaming application, a media playback application, a health application, a social media application, an exercise monitoring application, a sleep monitoring application, a mindfulness monitoring application, transaction information, wireless connection information, subscription information, contact information, pass information, and/or the like. For example, at a particular time, such an activity application 103 may be operative to determine one or more current activities of a user wearing HWD 100, such as exercise, sleep, cat, study, read, relax, play, and/or the like. Alternatively, such an activity application 103 may request that a user indicate a current activity (e.g., via a user interface assembly).

HWD 100 may also be provided with housing 101 that may at least partially enclose at least a portion of one or more of the assemblies of HWD 100 for protection from debris and other degrading forces external to HWD 100. In some embodiments, one or more of the assemblies may be provided within its own housing (e.g., a first sensor assembly may be positioned within a frame structure housing that may be holding an eyeglass, while a second sensor assembly may be positioned in or about a strap that may be coupled to the frame structure and extend about the back of the user's head, and/or a first sensor assembly may be positioned within a first earring or earbud structure housing that may be worn by a first car of a user, while a second sensor assembly may be positioned within a second earring or earbud structure housing that may be worn by a second car of the user, and/or an input assembly 110 may be an independent keyboard or mouse within its own housing that may wirelessly or through a wire communicate with processor assembly 102, which may be provided within its own housing).

Processor assembly 102 may load any suitable application 103 as a background application program or a user-detectable application program in conjunction with any suitable head gesture cluster data 105 or any other suitable data (e.g., data 91 from subsystem 200) to determine how any suitable input assembly data received via any suitable input assembly 110 and/or any suitable sensor assembly data received via any suitable sensor assembly 114 and/or any other suitable data received via any other suitable assembly of device 100 (e.g., any suitable auxiliary subsystem data 91 received from auxiliary subsystem 200 via communications assembly 106 of HWD 100) may be used to determine any suitable user state data (e.g., user state data 322 of FIG. 3) that may be used to control or manipulate at least one functionality of HWD 100 (e.g., a performance or mode of HWD 100 that may be altered in a particular one of various ways (e.g., particular user alerts or recommendations may be provided to a user via a user interface assembly and/or particular adjustments may be made by an output assembly and/or the like)) and/or at least one functionality of subsystem 200 or otherwise of system 1.

System 1 may include one or more auxiliary electronic subsystems 200 that may include any suitable assemblies, such as assemblies that may be similar to one, some, or each of the assemblies of HWD 100. As shown in FIG. 1, for example, auxiliary electronic subsystem 200 may include a processor assembly 202, an application 203, a memory assembly 204, data 205, a communications assembly 206, a power supply assembly 208, an input assembly 210, an I/O assembly 211, an output assembly 212, a sensor assembly 214, and a bus 216. In some embodiments, one or more assemblies of auxiliary electronic subsystem 200 may be combined or omitted. Moreover, auxiliary electronic subsystem 200 may include any other suitable assemblies not combined or included in FIG. 1 and/or several instances of the assemblies shown in FIG. 1. For the sake of simplicity, only one of each of the assemblies is shown in FIG. 1. Subsystem 200 may be configured to work in conjunction with or otherwise to be paired with or be a companion to HWD 100 in any suitable manner (e.g., to share processing capabilities and/or memory storage capabilities). Subsystem 200 may be configured to communicate any suitable auxiliary subsystem data 91 to HWD 100 (e.g., via communications assembly 206 of subsystem 200 and communications assembly 106 of HWD 100), such as automatically and/or in response to an auxiliary subsystem data request of data 99 that may be communicated from HWD 100 to auxiliary subsystem 200.

Auxiliary electronic subsystem 200 can include, but is not limited to, a music player (e.g., an iPod™ available by Apple Inc. of Cupertino, California), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, wearable device (e.g., an Apple Watch™ available by Apple Inc.), personal digital assistant, remote control, pager, computer (e.g., a desktop (e.g., an iMac™ available by Apple Inc.), laptop (e.g., a MacBook™ available by Apple Inc.), tablet (e.g., an iPad™ available by Apple Inc.), server, etc.), monitor, television, stereo equipment, set up box, set-top box, gaming console, boom box, modem, router, printer, controller (e.g., game controller), or any combination thereof. In some embodiments, auxiliary electronic subsystem 200 may perform a single function (e.g., a subsystem dedicated to processing certain data from and/or for HWD 100) and, in other embodiments, auxiliary electronic subsystem 200 may perform multiple functions (e.g., a subsystem that processes data from and/or for HWD 100, plays music, and receives and transmits telephone calls). Auxiliary electronic subsystem 200 may be any portable, mobile, hand-held, or miniature electronic device that may be configured to function in cooperating with HWD 100 wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, auxiliary electronic subsystem 200 may not be portable at all, but may instead be generally stationary.

Figure 2:
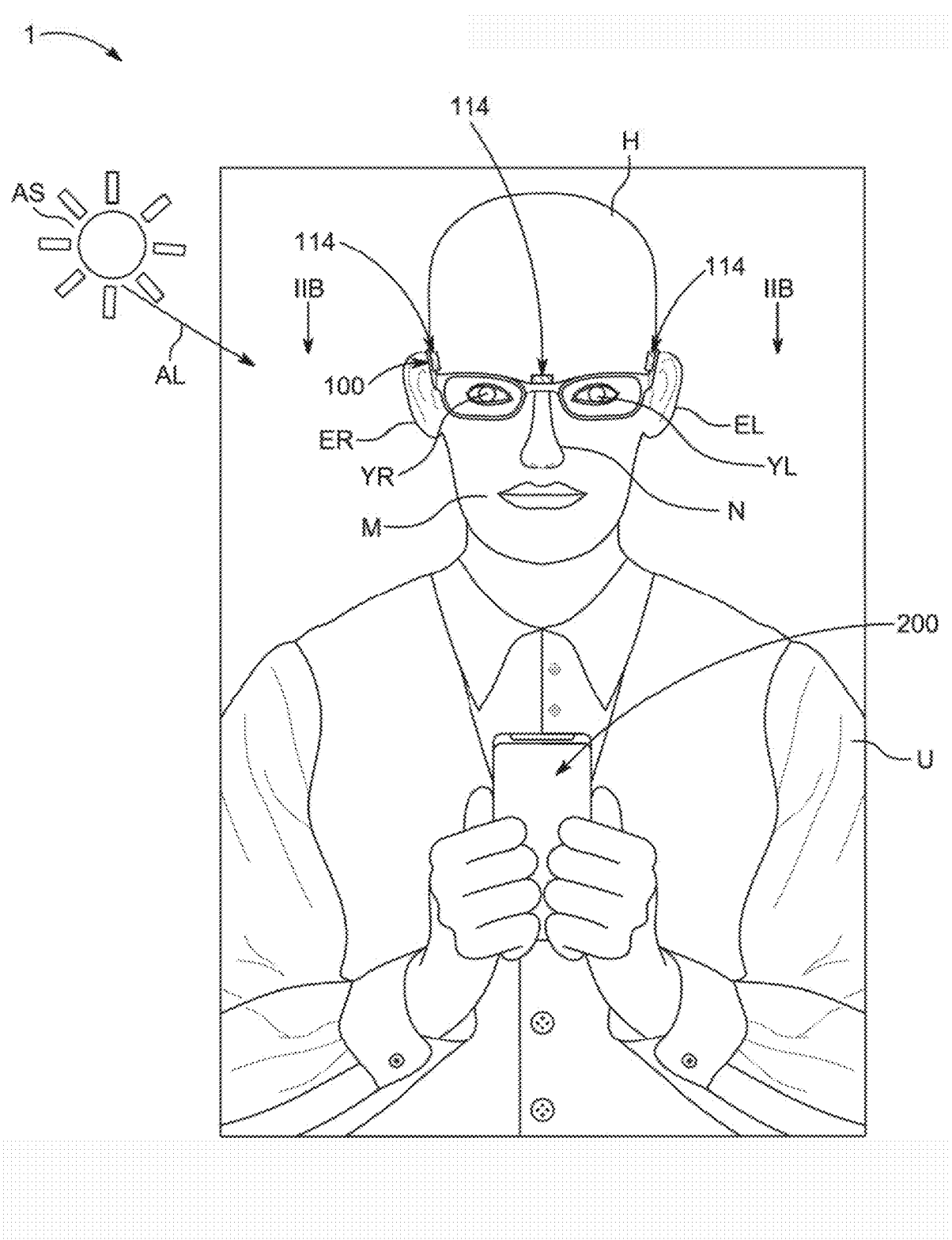
FIG. 2 shows an illustrative embodiment of the system of FIG. 1 in use by a user.
Figure 2A:
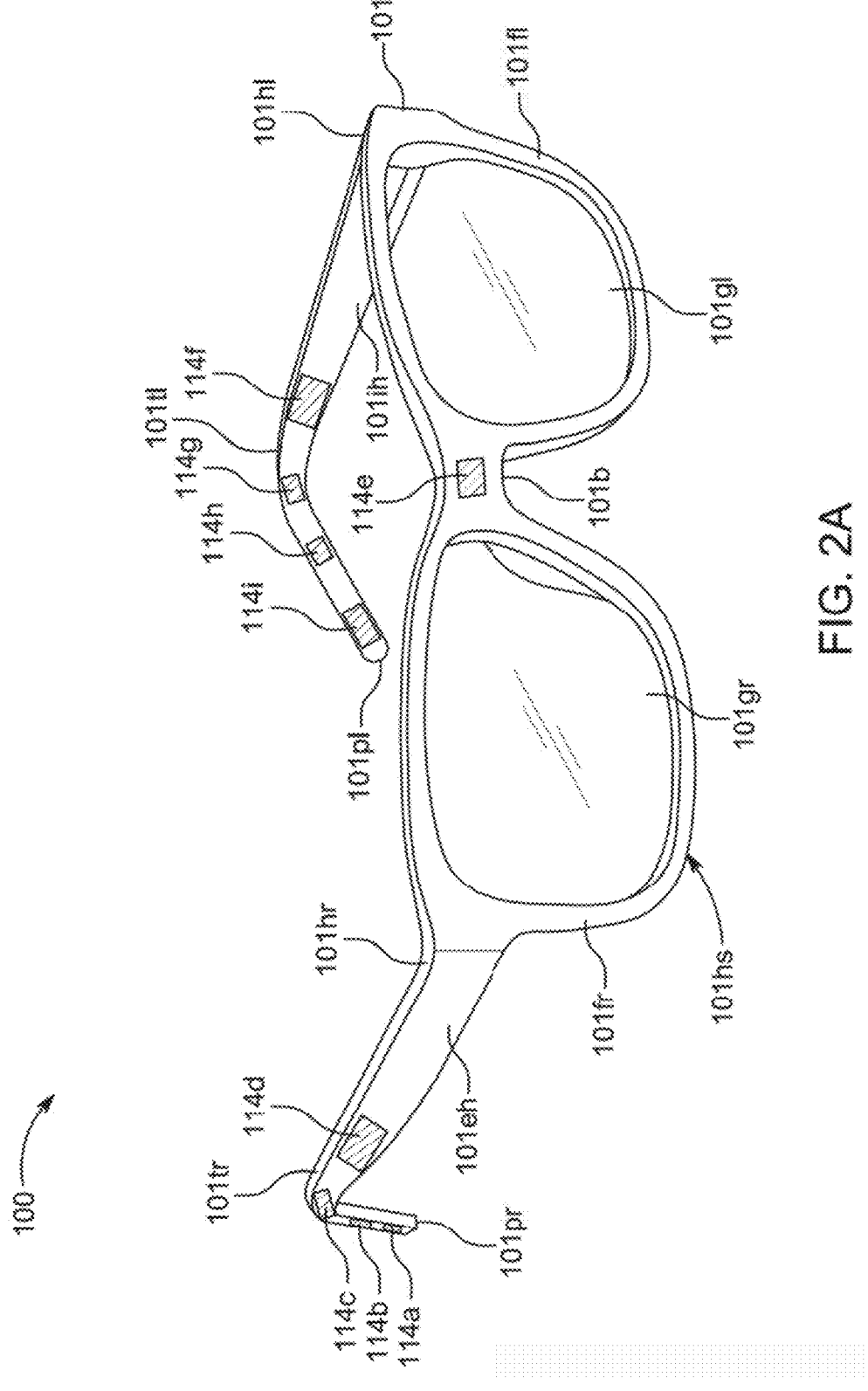
FIG. 2A shows a perspective view of the head-wearable electronic device of the system of FIGS. 1 and 2.
Figure 2B:
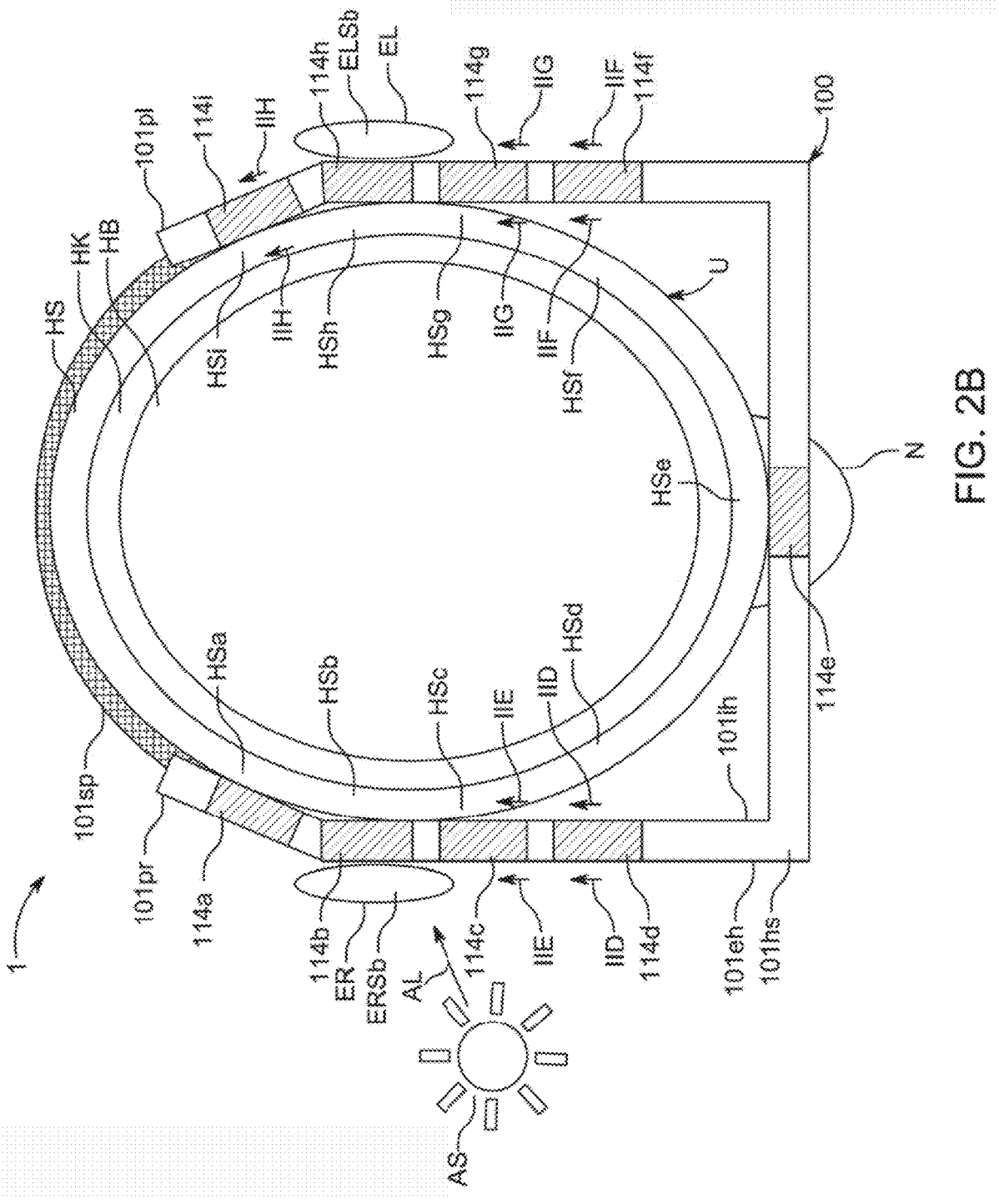
FIG. 2B shows a cross-sectional view of the head-wearable electronic device of the system of FIGS. 1-2A, taken from line IIB-IIB of FIG. 2.
Figure 2C:
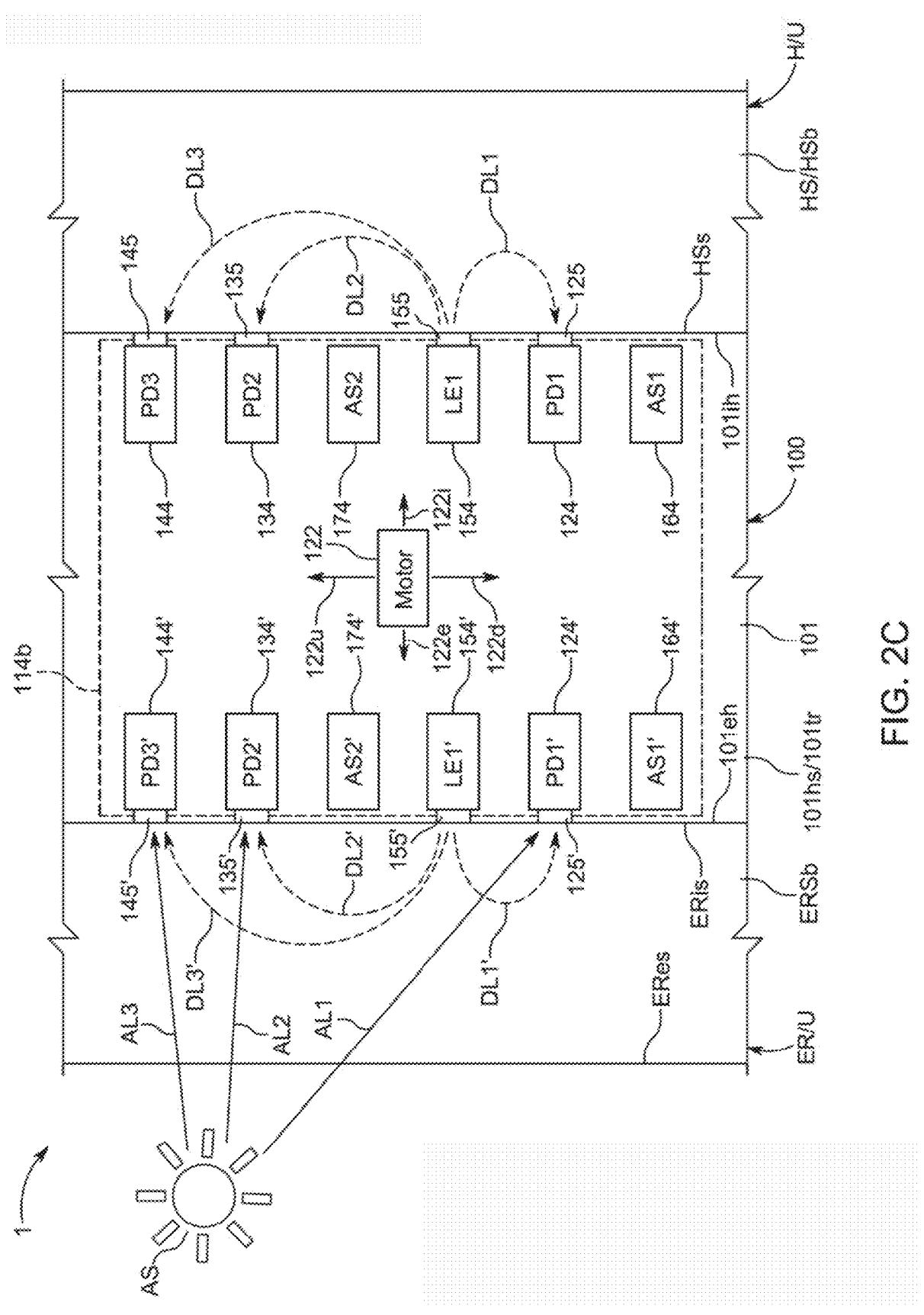
FIG. 2C shows a portion of the head-wearable electronic device of the system of FIGS. 1-2B.
Figure 2I:
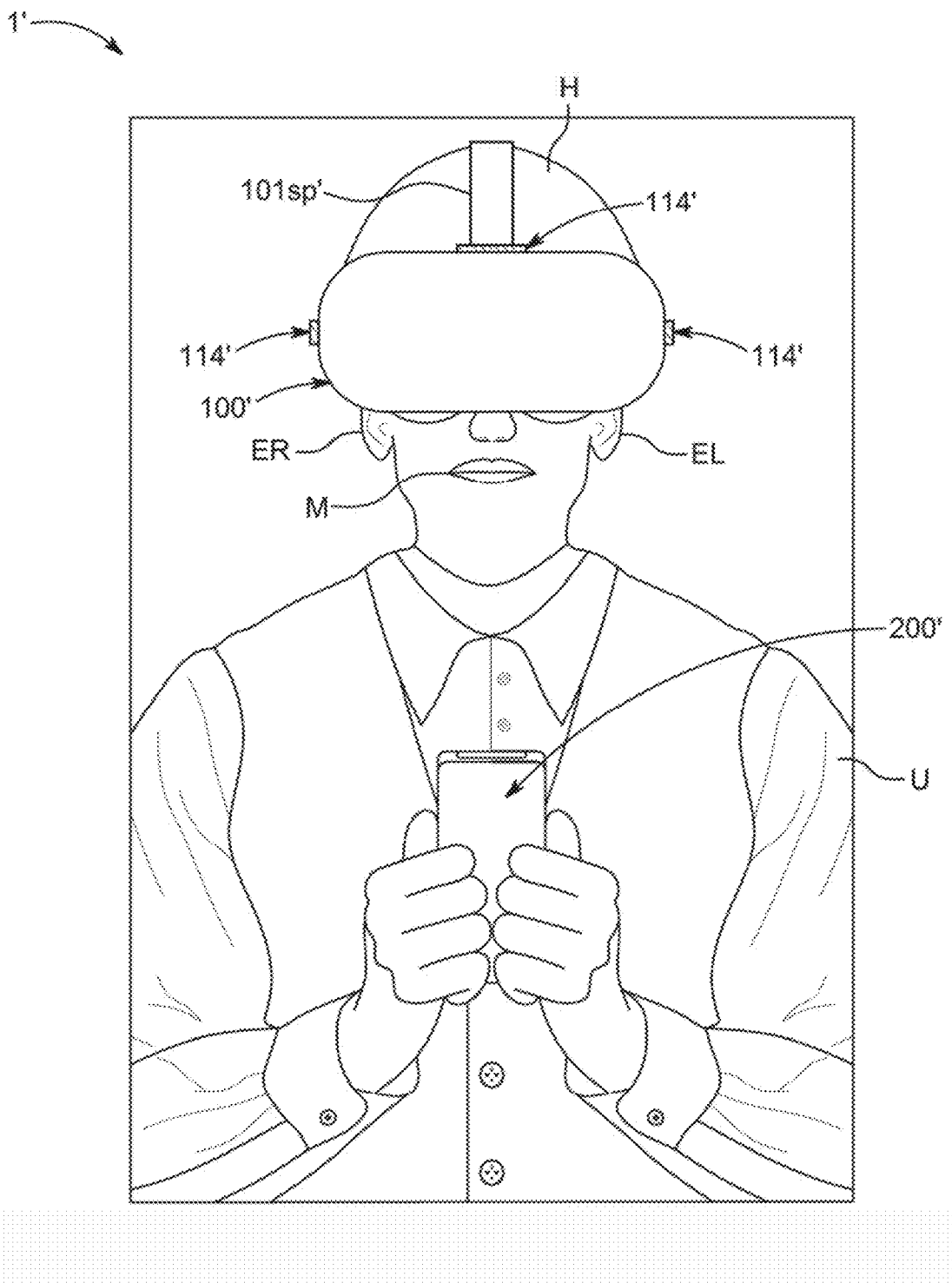
FIG. 2I shows another illustrative embodiment of the system of FIG. 1 in use by a user.

FIGS. 2-2H show system 1, where, as just one specific example, HWD 100 may be provided as any suitable set of eyeglasses worn by a user U on a head H with right ear ER, left ear EL, right eye YR, left eye YL, nose N, and mouth M, while auxiliary electronic subsystem 200 may be a hand-held or otherwise portable electronic device, such as an iPhone™, that may be carried by or otherwise brought with user U wherever it travels (FIG. 2I may show just one other illustrative system 1', where an HWD 100' may be provided as a virtual reality head-mounted display device with one or more sensor assemblies 114' for positioning a display over the eyes of user U and holding HWD 100' to the user's head with one or more straps 101sp', and where subsystem 200' may be any suitable gaming controller). As shown, eyeglasses HWD 100 of FIGS. 2-2H may include an eyeglass housing structure 101hs with an interior structure surface 101ih and an exterior structure surface 101ch, where the structure of eyeglass housing 101hs may include a right eye frame 101fr supporting a right eye glass lens 101gr, a left eye frame 101fl supporting a left eye glass lens 101gl, a bridge 101b connecting eye frames 101fr and 101fl, a right hinge 101hr coupling right eye frame 101fr to a right temple frame 101tr that extends from right hinge 101hr to a right temple tip 101pr, and a left hinge 101hl coupling left eye frame 101fl to a left temple frame 101tl that extends from left hinge 101hl to a left temple tip 101pl, such that, when worn on head H of user U, bridge 101b may rest on a portion of nose N, right temple frame 101tr may rest on a portion of right ear ER, and left temple frame 101tl may rest on a portion of left ear EL, whereby right eye glass lens 101gr may be aligned with right eye YR and left eye glass lens 101gl may be aligned with left eye YL. The structure of eyeglass housing 101hs may be configured with any suitable shape and geometry and bias for being comfortably and/or securely worn by user U's head H, such that at least a portion of housing 101hs and/or any other portion of HWD 100 may be held at least partially against skin HS (e.g., epidermis, dermis, hypodermis, and/or subcutaneous tissue with or without hair) of head H, which surrounds skull HK protecting brain HB and/or any other suitable anatomy. For example, temple frames 101tr and 101tl of eyeglass housing 101hs may be configured as spring-loaded flex hinge temples that may be coupled to flex hinges equipped with a small spring that may afford the temple arms a greater range of movement and that may not limit them to a traditional (e.g., 90 degree) angle, as skull temples that may be operative to bend down behind the ears and follow the contour of the skull and rest evenly against the skull's skin, as library temples that may be generally straight and do not bend down behind the ears but that may hold the glasses primarily through light pressure against the side of the skull's skin, as convertible temples that may be used either as library or skull temples depending on the bent structure, as riding bow temples that may curve around the ear and extend down to the level of the ear lobe (e.g., as may be commonly used on athletic, children's, and industrial safety frames), as comfort cable temples that may be similar to a riding bow but constructed from coiled, metal, flexible cable, and/or as any other suitable temples. Any suitable materials, such as any suitable plastic, metal, wood, bone, ivory, leather, stone, or any combination thereof, may be used to provide various portions of eyeglass housing 101hs. As shown in FIG. 2B, for example, a strap 101sp (e.g., an elastic strap (e.g., a stretch fabric)) or any other suitable mechanism may be provided to extend about the back side of head H, such as between tips 101pr and 101pl, for further securing HWD 100 against head H during use. As also shown, at least one ambient light source AS may exist in the environment of HWD 100 that may be emitting ambient light AL (e.g., towards the right side of head H with right ear ER).

HWD 100 may include one or more light-sensing assemblies, such as light-sensing assemblies 114a-114i, positioned along eyeglass housing 101hs, each of which may be operative to detect light reflected by and/or transmitted through a portion of the head H (e.g., a portion of skin user's head skin HS, a portion of right ear ER, a portion of left ear EL, etc.). For example, as shown, light-sensing assemblies 114a-114d may be provided at different locations along the length of right temple frame 101tr between right temple tip 101pr and right hinge 101hr for potentially interfacing with different respective skin portions HSa-HSd along the right side of the face of user U and/or with right ear ER, light-sensing assembly 114c may be provided at bridge 101b for potentially interfacing with respective skin portion HSe along the forehead or bridge of the nose of the face of user U and/or with nose N, and light-sensing assemblies 114f-114i may be provided at different locations along the length of left temple frame 101tl between left hinge 101hl and left temple tip 101pl for potentially interfacing with different respective skin portions HSf-HSi along the left side of the face of user U and/or with left ear EL (and, although not shown, one or more light-sensing assemblies may be positioned at any other suitable location along HWD 100, including along any suitable portion(s) of strap 101*sp* for potentially interfacing with any suitable portion(s) of a user's neck or rear skull or the like). Each light-sensing assembly may include at least one light-sensing component (e.g., a photodiode) and each light-sensing assembly may be provided about a portion of eyeglass housing 101*hs*, within a portion of eyeglass housing 101*hs*, and/or through a portion of eyeglass housing 101*hs* such that, when eyeglass housing 101*hs* is worn on user's head H, at least one, some, or each light-sensing component of at least one, some, or each light-sensing assembly may be operative to face, contact, or otherwise be positioned relative to a respective tissue or skin portion of the user's head (e.g., skin portions HSa-HSi) in order to detect light that may be reflected by and/or transmitted through the skin portion, and such that HWD 100 (e.g., processor assembly 102) may utilize the sensor data detected by the light sensing component(s) to determine any suitable head gestures of user U and/or any suitable biological and/or physiological characteristics (e.g., heart rate characteristics) of user U. Therefore, each light-sensing assembly 114 may be operative to detect light sensor data that may vary according to the periodic motion of blood through human head tissue, which may be used to detect a volumetric measurement of a blood vessel or any suitable optically obtained plethysmogram for use in photoplethysmography ("PPG") that may be used to detect any suitable heart rate or other physiological data of the user and/or to determine a head gesture of the user. Detected light sensor data may be sensitive to blood volume variations (e.g., blood flow variations) at the portion of the user's head that may be reflecting the detected light that may be at least partially defining the light sensor data.

As shown in more detail in FIG. 2C, light-sensing assembly 114*b* may include any number of various sensor components, such as a first light-sensing component 124 (e.g., a first photodiode ("PD1")), a second light-sensing component 134 (e.g., a second photodiode ("PD2")), a third light-sensing component 144 (e.g., a third photodiode ("PD3")), one, some, or each of which may be positioned within a portion of eyeglass housing 101*hs* (e.g., within a portion of right temple frame 101*tr*) but may be exposed to a portion of skin HS (e.g., a portion of skin surface HSs along skin portion HSb), such as directly or via a light-transmissive opening or element. For example, first light-sensing component 124 may be exposed to and operative to detect a first device light DL1 that may be emitted from skin surface HSs of skin portion HSb of skin HS via a first light-transmissive element 125 that may extend at least between first light-sensing component 124 and interior structure surface 101*ih* of eyeglass housing 101*hs*, second light-sensing component 134 may be exposed to and operative to detect a second device light DL2 that may be emitted from skin surface HSs of skin portion HSb of skin HS via a second light-transmissive element 135 that may extend at least between second light-sensing component 134 and interior structure surface 101*ih* of eyeglass housing 101*hs*, and/or third light-sensing component 144 may be exposed to and operative to detect a third device light DL3 that may be emitted from skin surface HSs of skin portion HSb of skin HS via a third light-transmissive element 145 that may extend at least between third light-sensing component 144 and interior structure surface 101*ih* of eyeglass housing 101*hs*. Light-sensing assembly 114*b* may also include any number of various light-emitting components, including a first light-emitting component 154 (e.g., a first light emitting diode ("LE1")), which may be positioned within a portion of eyeglass housing 101*hs* (e.g., within a portion of right temple frame 101*tr*) but exposed to a portion of skin HS (e.g., a portion of skin surface HSs of skin portion HSb) directly or via a light-transmissive opening or element. For example, light-emitting component 154 may be operative to transmit each one of first device light DL1, second device light DL2, and third device light DL3 from HWD 100 and into skin HS through skin surface HSs of skin portion HSb via one or more light-transmissive elements 155 (e.g., a single light-transmissive element or respective different light-transmissive elements for the different emitted lights) that may extend at least between light-emitting component 154 and interior structure surface 101*ih* of eyeglass housing 101*hs*. Additionally or alternatively, light-sensing assembly 114*b* may include any number of various other sensor components, such as first additional-sensing component 164 (e.g., "AS1", which may be a sound sensor (e.g., piezo or other microphone) or any other suitable sensor) and a second additional-sensing component 174 (e.g., "AS2", which may be a force or contact or pressure sensor or any other suitable sensor), each of which may be provided along with components 124, 134, 144, and 154 along a particular portion of eyeglass housing 101*hs*. As also shown, in some embodiments, light-sensing assembly 114*b* may also include any suitable movement output assembly 122 (e.g., a "MOTOR", such as any suitable piezo motor) that may be operative to adjust the position of light-sensing assembly 114*b* along eyeglass housing 101*hs* (e.g., movement output assembly 122 may be operative to move at least a portion or the entirety of light-sensing assembly 114*b* in the direction of arrow 122*u* along right temple frame 101*tr* towards right temple tip 101*pr* and/or in the direction of arrow 122*d* along right temple frame 101*tr* towards right hinge 101*hr* and/or in the direction of arrow 122*i* towards skin HS and/or in the direction of arrow 122*e* towards right car ER and/or in any other direction or rotation (e.g., about an axis of right temple frame 101*tr* (e.g., about an axis of arrow 122*u*) or about an axis of arrow 122*e* or about or along an axis perpendicular to each one of arrows 122*u* and 122*e*). Any suitable geometry may be used between components of a light-sensing assembly. For example, a length of an array of sensor components of a light-sensing assembly (e.g., a distance between AS1 and PD3 of assembly 114*b*) may be any suitable distance, such as between 10 millimeters and 50 millimeters, while a spacing between any two components (e.g., a distance between PD1 and LE1 of assembly 114*b*) may be any suitable distance, such as between 1 millimeter and 7 millimeters.

As also shown in more detail in FIG. 2C, because light-sensing assembly 114*b* may not only interface with skin portion HSb of skin HS but also skin portion ERSb of right ear ER, light-sensing assembly 114*b* may include any number of various other sensor components, including a first other light-sensing component 124' (e.g., a first other photodiode ("PD1")), a second other light-sensing component 134' (e.g., a second other photodiode ("PD2")), a third other light-sensing component 144' (e.g., a third other photodiode ("PD3")), each of which may be positioned within a portion of eyeglass housing 101*hs* (e.g., within a portion of right temple frame 101*tr*) but exposed to a portion of skin portion ERSb of right ear ER directly or via a light-transmissive opening or element. For example, first other light-sensing component 124' may be exposed to and operative to detect each one of a first other device light DL1' and a first ambient light AL1 that may be emitted from skin surface ERis of skin portion ERSb of right car ER via a first other light-transmissive element 125' that may extend at least between first other light-sensing component 124' and exterior structure surface 101ch of eyeglass housing 101hs, second other light-sensing component 134' may be exposed to and operative to detect each one of a second other device light DL2' and a second ambient light AL2 that may be emitted from skin surface ERis of skin portion ERSb of right ear ER via a second other light-transmissive element 135' that may extend at least between second other light-sensing component 134' and exterior structure surface 101ch of eyeglass housing 101hs, and/or third other light-sensing component 144' may be exposed to and operative to detect each one of a third other device light DL3' and a third ambient light AL3 that may be emitted from skin surface ERis of skin portion ERSb of right ear ER via a third other light-transmissive element 145' that may extend at least between third other light-sensing component 144' and exterior structure surface 101ch of eyeglass housing 101hs. Light-sensing assembly 114b may also include any number of other various light-emitting components, including a first other light-emitting component 154' (e.g., a first light emitting diode ("LE1")), which may be positioned within a portion of eyeglass housing 101hs (e.g., within a portion of right temple frame 101tr) but exposed to a portion of skin surface ERis of skin portion ERSb of right ear ER directly or via another light-transmissive opening or element. For example, other light-emitting component 154' may be operative to transmit each one of first other device light DL1', second other device light DL2', and third other device light DL3' from HWD 100 and into skin portion ERSb of right ear ER through skin surface ERis via one or more other light-transmissive elements 155' (e.g., a single light-transmissive element or respective different light-transmissive elements for the different emitted lights) that may extend at least between other light-emitting component 154' and exterior structure surface 101ch of eyeglass housing 101hs. Additionally or alternatively, light-sensing assembly 114b may include any number of various other sensor components, such as first other additional-sensing component 164' (e.g., "AS1", which may be a sound sensor (e.g., piezo or other microphone) or any other suitable sensor) and a second other additional-sensing component 174' (e.g., "AS2", which may be a force or contact or pressure sensor or any other suitable sensor), each of which may be provided along with components 124', 134', 144', and 154' along a particular portion of eyeglass housing 101hs.

Each light-sensing assembly may be provided about a portion of eyeglass housing 101hs, within a portion of eyeglass housing 101hs, and/or through a portion of eyeglass housing 101hs such that, when eyeglass housing 101hs is worn on user's head H, at least one, some, or each light-sensing component of at least one, some, or each light-sensing assembly may be operative to face, contact, or otherwise be positioned relative to a respective tissue or skin portion of the user's head in order to detect light that may be reflected by and/or transmitted through the skin portion. As shown in FIG. 2C, for example, light-sensing assembly 114b may be positioned within a portion of right temple frame 101tr of eyeglass housing 101hs and between exterior structure surface 101ch of eyeglass housing 101hs and interior structure surface 101ih of eyeglass housing 101hs. As shown in FIG. 2D, for example, light-sensing assembly 114d may be provided in a form factor that may be provided about a portion of eyeglass housing 101hs, such as a clip-on form factor with a structure that may include a hinge 114dp about which other portions of the structure about an opening

114do may rotate or otherwise deflect (e.g., in the direction of arrow OP) for adjusting the size of opening 114do for enabling a portion of eyeglass housing 101hs (e.g., a portion of right temple frame 101tr) to be positioned within a space defined by the structure of light-sensing assembly 114d, such that assembly 114d may be removably coupled (e.g., clipped onto) and/or slid along a portion of eyeglass housing 101hs. Such a dynamic form factor may enable light-sensing assembly 114d to be placed in an optimized (e.g., comfortable and/or effective) location. Moreover, as shown, light-sensing assembly 114d or any other suitable light-sensing assembly may include any suitable deformable mechanism 114db (e.g., a spring and/or a foam element and/or any other suitable biasing component) that may be operative to deform (e.g., contract in the direction of arrows CNT) to reduce a dimension DST between a portion of eyeglass housing 101hs and an external surface 114di of assembly 114d and/or to deform (e.g., expand in the direction of arrows EXP) to increase a dimension DST between a portion of eyeglass housing 101hs and external surface 114di of assembly 114d, which may enable external surface 114di to be biased against a surface of head skin HS. As shown in FIG. 2E, for example, light-sensing assembly 114c may be positioned with an external surface 114ci flush with interior structure surface 101ih of eyeglass housing 101hs. As shown in FIG. 2F, for example, light-sensing assembly 114f may be positioned with an external surface 114fi that is spaced outwardly from interior structure surface 101ih of eyeglass housing 101hs, which may enable improved contact with head skin HS and/or increased localized pressure on the user. As shown in FIG. 2G, for example, light-sensing assembly 114g may be positioned at least partially within a foam or otherwise suitably compliant component 115g that may extend outwardly at an angle away from interior structure surface 101ih of eyeglass housing 101hs, which may enable improved contact with head skin HS and/or increased localized pressure on the user while maintaining user comfort. As shown in FIG. 2H, for example, light-sensing assembly 114h may be positioned at least partially within and/or include a foam or otherwise suitably compliant component 115h that may extend outwardly away from interior structure surface 101ih of eyeglass housing 101hs, which may enable improved contact with head skin HS and/or increased localized pressure on the user while maintaining user comfort. Therefore, various structures, relationships, and/or materials may be used to position a light-sensing assembly with respect to a housing of an HWD so that pressure may be applied against head skin HS for facilitating better light-sensing therefrom without compromising user comfort and/or so that a contact point of the HWD to a user's head skin is close to or includes a light-sensing assembly with one or more light-sensing components.

Different light-sensing components of a light-sensing assembly 114 of HWD 100 (e.g., different ones of light-sensing components 124, 124', 134, 134', 144, and 144' of light-sensing assembly 114b) may be configured to sense light at a respective different position on a skin surface of head H of user U when HWD 100 may be worn on head H. Due to this positioning, the sensor data from each light-sensing component may be operative to capture movement of anatomical features in the tissue of the head skin of the user during any suitable head gesture. In some embodiments, a single light-emitting component or different light-emitting components of a light-sensing assembly 114 of HWD 100 (e.g., each one of light-emitting components 154 and 154' of light-sensing assembly 114b) may be configured to emit light at one or more different wavelengths, which may penetrate to different depths in the head tissue of the user before reflecting back to one or more light-sensing components of HWD 100 (e.g., light-emitting component 154 may be operative to emit first light DL1 as infrared or red light via a first emitter to at least PD1, to emit second light DL2 as green light via a second emitter to at least PD2, and to emit third light DL3 as blue light via a third emitter to at least PD3). In some examples, each possible photodiode-emitter combination can be considered a separate channel of light sensor data. For example, in a device with three light emitters and three photodiodes (e.g., three light emitters of light-emitting component 154 and three light-sensing components 124, 134, and 144 of light-sensing assembly 114b with respect to skin portion HSb of skin HS of head H), there can be nine channels of light sensor data. When a first light emitter of light-emitting component 154 emits light, the first, second, and third light-sensing components 124, 134, and 144 may sense first, second, and third channels of light sensor data, respectively. When a second light emitter of light-emitting component 154 emits light, the first, second, and third light-sensing components 124, 134, and 144 may sense fourth, fifth, and sixth channels of light sensor data, respectively. When a third light emitter of light-emitting component 154 emits light, the first, second, and third light-sensing components 124, 134, and 144 may sense seventh, eighth, and ninth channels of light sensor data, respectively. Each light-sensing assembly may also include additional sensor types that may be operative to provide additional channels of sensor data. For example, first additional-sensing component 164 of light-sensing assembly 114b may be a force sensor that may be operative to detect force (e.g., of the head) against HWD 100 and may provide a first additional channel of sensor data, while second additional sensing-component 174 of light-sensing assembly 114b may be an accelerometer that may be operative to sense acceleration of HWD 100 in each one of X-, Y-, and Z-directions and may provide second, third, and fourth additional channels of sensor data, respectively. In some examples, additional channels of sensor data can include data from a barometer, a magnetometer, a GPS receiver, a microphone, and/or numerous other possibilities of sensors. In some examples, other light sensors may be used in place of or in addition to photodiodes. In some examples, a force sensor can be spatially discretized, sensing force independently at multiple positions of the surface of the device that may contact or otherwise interface with a head of a user, in which case the force sensor can provide multiple (e.g., 4) channels of pressure information.

Figures 4A, 4B, 4C, 4D, 4E:
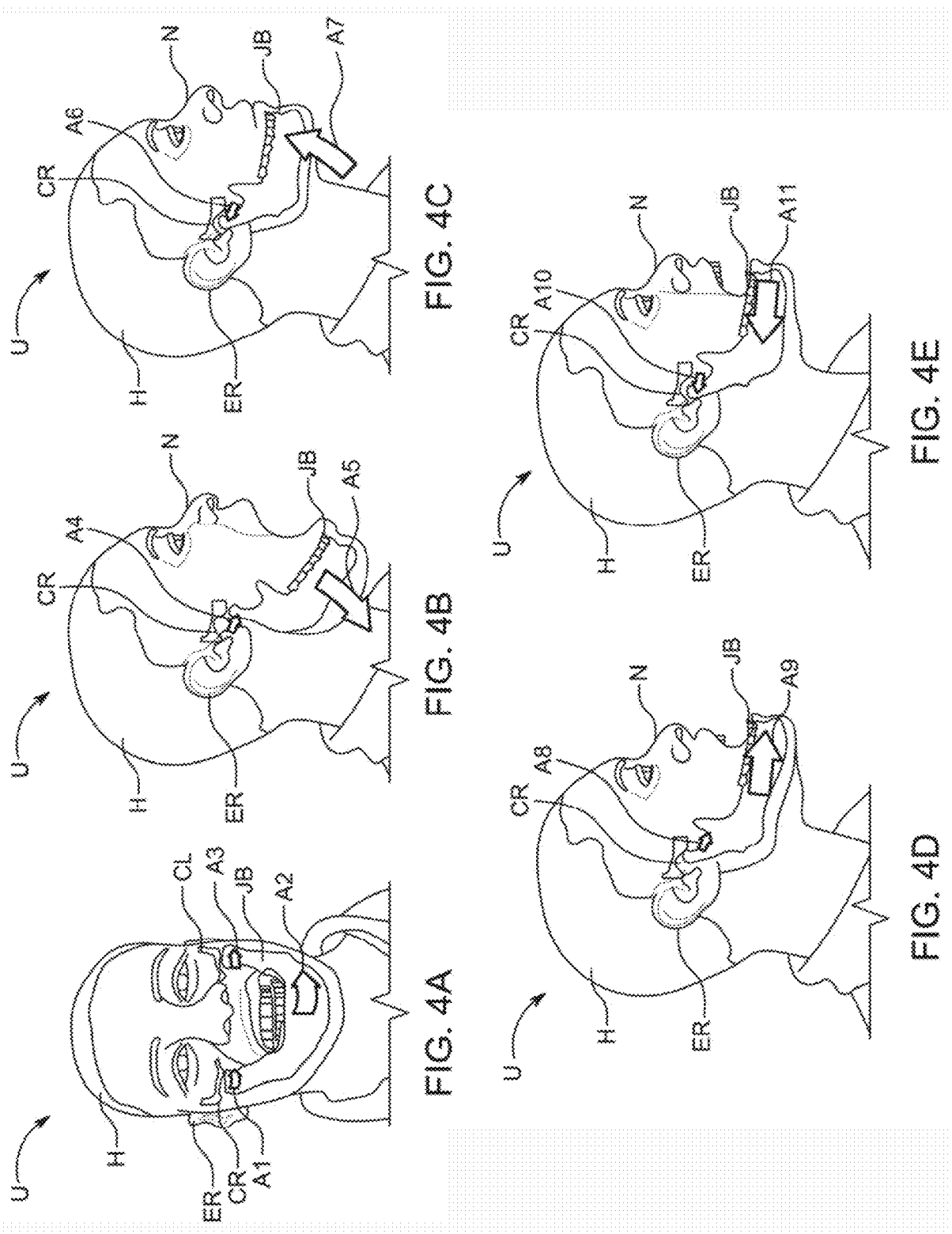
FIGS. 4A-4E illustrate exemplary head gestures in accordance with examples of the disclosure.

FIGS. 2 and 4A-4E illustrate just some exemplary head gestures that may be detected by one or more light-sensing assemblies 114 of HWD 100 in accordance with examples of the disclosure. In some examples, head U can be expressionless (e.g., stationary in a resting position), as illustrated in FIG. 2. As just one other example, different portions of a jawbone JB may be moved in the respective direction of arrows A1, A2, and A3 with respect to a right check bone CR and a left check bone CL for providing a leftward lateral jaw excursion, as illustrated in FIG. 4A. As just one other example, different portions of jawbone JB may be moved in the respective direction of arrows A4 and A5 with respect to check bone CR for providing a jaw depression, as illustrated in FIG. 4B. As just one other example, different portions of jawbone JB may be moved in the respective direction of arrows A6 and A7 with respect to check bone CR for providing a jaw elevation, as illustrated in FIG. 4C. As just one other example, different portions of jawbone JB may be moved in the respective direction of arrows A8 and A9 with respect to check bone CR for providing a jaw protrusion, as illustrated in FIG. 4D. As just one other example, different portions of jawbone JB may be moved in the respective direction of arrows A10 and A11 with respect to check bone CR for providing a jaw retrusion, as illustrated in FIG. 4E. The example head gestures of FIGS. 2 and 4A-4E are just exemplary and by no means exhaustive. Various other head gestures, including, but not limited to, chewing, blinking, winking, smiling, eyebrow raising, eyes widening or eyes rolling or eyes squinting or the like, humming or other internal vocalizations (e.g., "mmm-hmm", "uh-huh", etc.), inaudible cues, jaw motions, flaring nostrils, speaking or other external explicit language vocalization, mouth opening (e.g., full mouth opening, left-side mouth opening, right-side mouth opening, etc.), ear wiggling or other ear movement, smirking, frowning, grimacing, check motioning, emotions and/or thoughts and/or brain functions and/or heart rate characteristics and/or respiratory rate and/or blood pressure and/or heart rate ("HR") and/or heart rate variability ("HRV") and/or oxygen saturation and/or other biometric characteristics and/or any other voluntary gestures and/or any other involuntary gestures (e.g., reactions and/or reactive gestures) or countenance of the user and/or the like may be detected by one or more light-sensing assemblies 114 of HWD 100. Variations of these gestures and other gestures entirely may be trained on and detected in accordance with examples of the disclosure.

Figure 5:
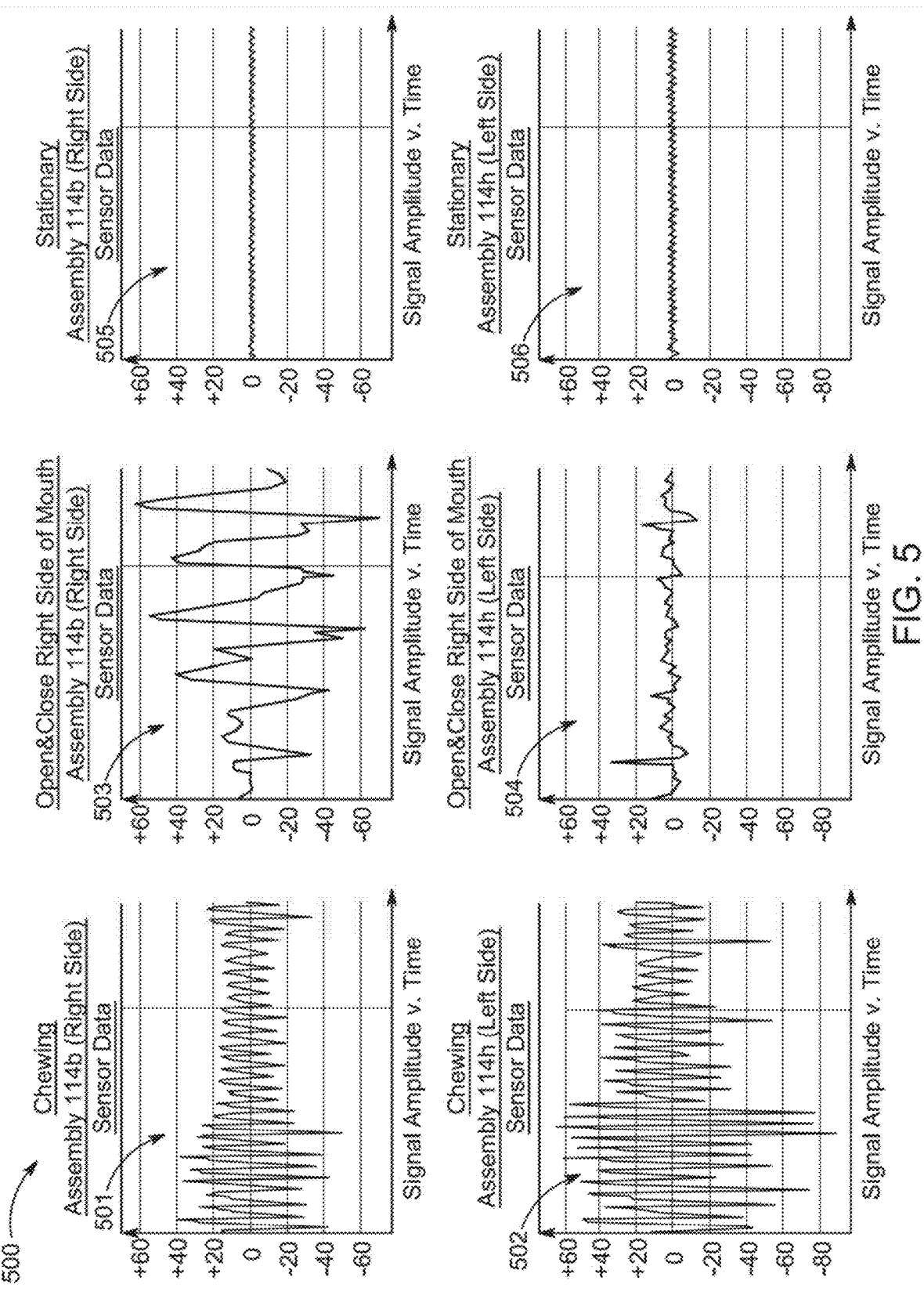
FIG. 5 illustrates exemplary charts of sensor data in accordance with examples of the disclosure.

FIG. 5 illustrates collection 500 of exemplary charts of sensor data 501-506 in accordance with examples of the disclosure. For example, charted sensor data 501 may represent a particular channel of light sensor data of light-sensing assembly 114b (e.g., the light sensor channel between a particular emitter of light-emitting component 154 and light-sensing component 124 of light-sensing assembly 114b for first device light DL1 with respect to skin portion HSb of skin HS of the right side of head H) during a chewing head gesture (e.g., a period of time during which the user may repeatedly move between the states of FIG. 4B and FIG. 4C), while charted sensor data 502 may represent a particular channel of light sensor data of light-sensing assembly 114h (e.g., the light sensor channel between a particular emitter of a light-emitting component and a light-sensing component of light-sensing assembly 114h for a device light with respect to skin portion HSh of skin HS of the left side of head H) during a chewing head gesture (e.g., a period of time during which the user may repeatedly move between the states of FIG. 4B and FIG. 4C). As another example, charted sensor data 503 may represent a particular channel of light sensor data of light-sensing assembly 114b (e.g., the light sensor channel between a particular emitter of light-emitting component 154 and light-sensing component 124 of light-sensing assembly 114b for first device light DL1 with respect to skin portion HSb of skin HS of the right side of head H) during an opening and closing of the right side of mouth M head gesture (e.g., a period of time during which the user may repeatedly open and close only the right side of mouth M), while charted sensor data 504 may represent a particular channel of light sensor data of light-sensing assembly 114h (e.g., the light sensor channel between a particular emitter of a light-emitting component and a light-sensing component of light-sensing assembly 114h for a device light with respect to skin portion HSh of skin HS of the left side of head H) during an opening and closing of the right side of mouth M head gesture (e.g., a period of time during which the user may repeatedly open and close only the right side of mouth M). As another example, charted sensor data 505 may represent a particular channel of light sensor data of light-sensing assembly 114*b* (e.g., the light sensor channel between a particular emitter of light-emitting component 154 and light-sensing component 124 of light-sensing assembly 114*b* for first device light DL1 with respect to skin portion HSb of skin HS of the right side of head H) during a stationary head gesture (e.g., a period of time during which the user may remain in the state of FIG. 2), while charted sensor data 506 may represent a particular channel of light sensor data of light-sensing assembly 114*h* (e.g., the light sensor channel between a particular emitter of a light-emitting component and a light-sensing component of light-sensing assembly 114*h* for a device light with respect to skin portion HSh of skin HS of the left side of head H) during a stationary head gesture (e.g., a period of time during which the user may remain in the state of FIG. 2). As just one example, each light sensor data channel may be provided by an IR light emitter and each charted sensor data may be band pass filtered. As can be observed, during the chewing head gesture, charted sensor data 501 of the light sensor data channel of assembly 114*b* of the right side of head H and charted sensor data 502 of the light sensor data channel of assembly 114*h* of the left side of head H may exhibit somewhat similar signal characteristics (e.g., as the left side channel and the right side channel may be similarly affected by a chewing head gesture). Additionally, as can be observed, during the opening and closing of the right side of mouth M head gesture, charted sensor data 503 of the light sensor data channel of assembly 114*b* of the right side of head H may exhibit significantly different signal characteristics (e.g., significantly larger amplitude difference between an adjacent peak and trough) than the signal characteristics exhibited by charted sensor data 504 of the light sensor data channel of assembly 114*h* of the left side of head H (e.g., as the right side of the head and, thus, the right side channel, may be more significantly affected by an opening and closing of the right side of mouth M head gesture than may be the left side of the head, and thus, the left side channel). Additionally, as can be observed, during the stationary head gesture, charted sensor data 505 of the light sensor data channel of assembly 114*b* of the right side of head H and charted sensor data 506 of the light sensor data channel of assembly 114*h* of the left side of head H may exhibit somewhat similar signal characteristics (e.g., as the left side channel and the right side channel may be similarly affected (e.g., existing in a resting pulsatile state) by a stationary head gesture).

Whereas certain visual signal characteristics may be observed in the exemplary sensor data of FIG. 5, a number of quantitative signal characteristics may be calculated based on the sensor data before clustering. For example, an amplitude difference can be calculated between a peak and a trough of the sensor data, with sign indicating whether the peak comes before the trough or vice versa, a time difference can be calculated between a peak and a trough of the sensor data, a maximum amplitude can be calculated, a period between peaks of the sensor data can be calculated, and/or a phase can be detected in the sensor data (e.g., use phase difference of right and left sensors (e.g., arrival time difference of pulse in left and right sensors) for physiological data), among other possibilities. In some examples, signal characteristics can be observed in a frequency domain. For example, one or more frames of sensor data may be analyzed (e.g., by a Fourier transform) to extract frequency information as additional signal characteristics. These and other signal characteristics can be extracted from any or all of the channels of sensor data, including the channels of light sensor data, any channels of force sensor data, any channels of accelerometer sensor data, and/or any channels of any other suitable type of sensor data of system 1.

Figures 5A, 5B, 5C, 5D:
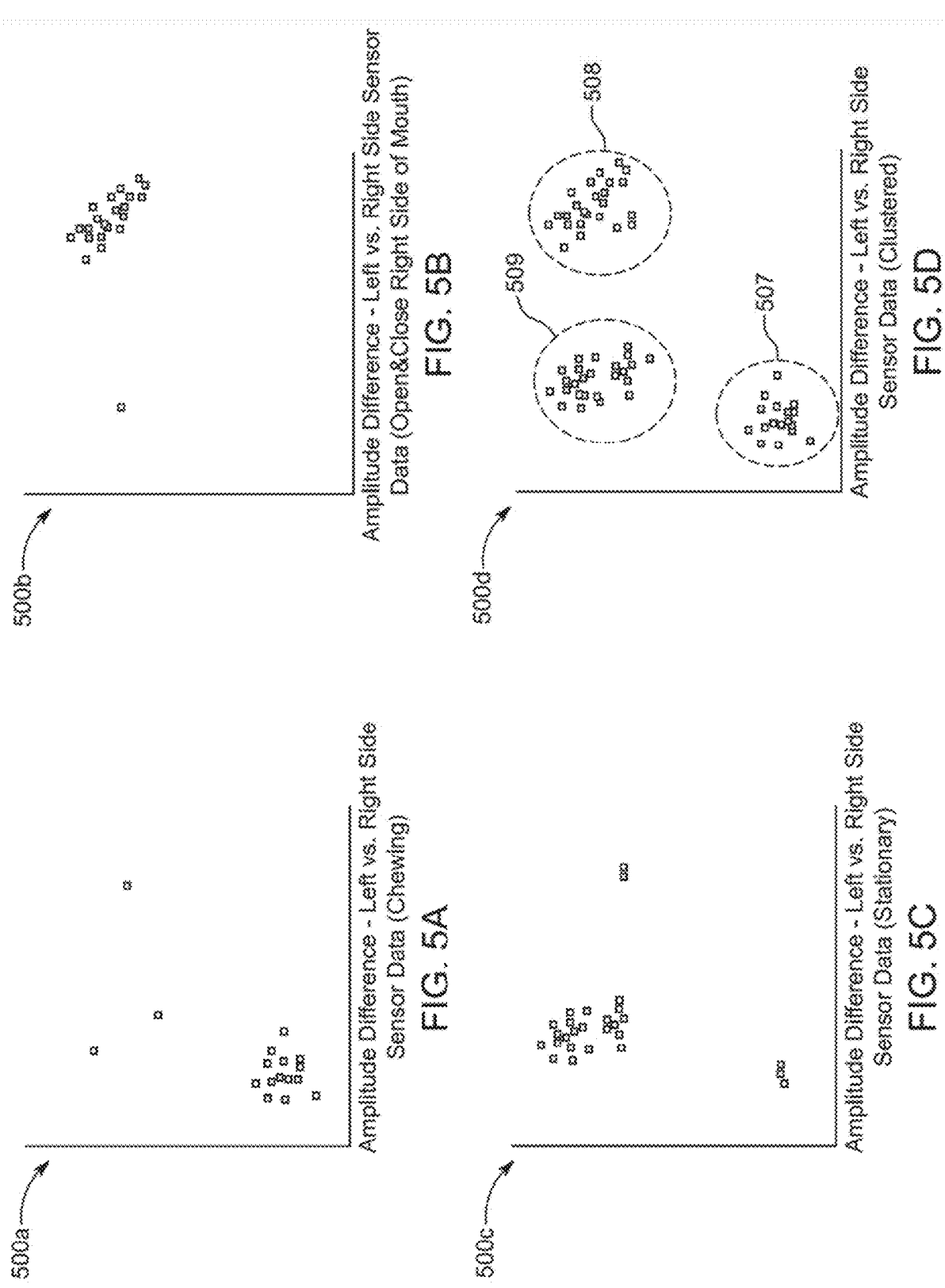
FIGS. 5A-5D illustrate two-dimensional clustering examples in accordance with examples of the disclosure.

FIGS. 5A-5D illustrate two-dimensional clustering examples in accordance with examples of the disclosure. In some examples, each frame in sensor data collection can be considered a point in multi-dimensional space, where each calculated signal characteristic for that frame may be a coordinate in the multi-dimensional space. For example, sensor data can be collected during a first period in which a first gesture may be performed by the user. The sensor data can be divided into a number of frames, and each frame can correspond to a set of coordinates that may be defined by the signal characteristics calculated for that time frame. The data illustrated in FIGS. 5A-5D may represent data collected with two signal characteristics: (1) amplitude difference between peak and trough for the right side light sensor data channel (e.g., the channel of each one of charted sensor data 501, 503, and 505) and (2) amplitude difference between peak and trough for the left side light sensor data channel (e.g., the channel of each one of charted sensor data 502, 504, and 506), for example, as discussed with respect to FIG. 5. Although FIGS. 5A-5D may only show two signal characteristics, examples of the disclosure are not so limited and contemplate using multiple kinds of signal characteristics from multiple channels, including light sensor data, force sensor data, sound sensor data, and/or accelerometer data, among various other possibilities. FIG. 5A may illustrate sensor data 500*a* collected during a first period in which a chewing head gesture may be performed (e.g., multiple times in succession). FIG. 5B may illustrate sensor data 500*b* collected during a second period in which an opening and closing of the right side of a user's mouth head gesture may be being performed (e.g., multiple times in succession). FIG. 5C may illustrate sensor data 500*c* collected during a third period in which a stationary head gesture may be performed. FIG. 5D may illustrate the sensor data 500*d* collected during all three periods and clustered into three clusters: first cluster 507, second cluster 508, and third cluster 509. As may be shown in FIGS. 5A-5D together, most of the points corresponding to the first period may belong to the first cluster, most of the points corresponding to the second period may belong to the second cluster, and most of the points corresponding to the third period may belong to the third cluster. Accordingly, it may be inferred that any point that belongs to the first cluster 507 was collected during performance of a chewing head gesture, and any point that belongs to the second cluster 508 was collected during performance of an opening and closing of a right side of mouth head gesture, and any point that belongs to the third cluster 509 was collected during performance of a stationary head gesture, and that any point that does not belong to the first cluster 507 or the second cluster 508 or the third cluster 509 was not collected during performance of a chewing head gesture or an opening and closing of a right side of mouth head gesture or a stationary head gesture.

Figure 6:
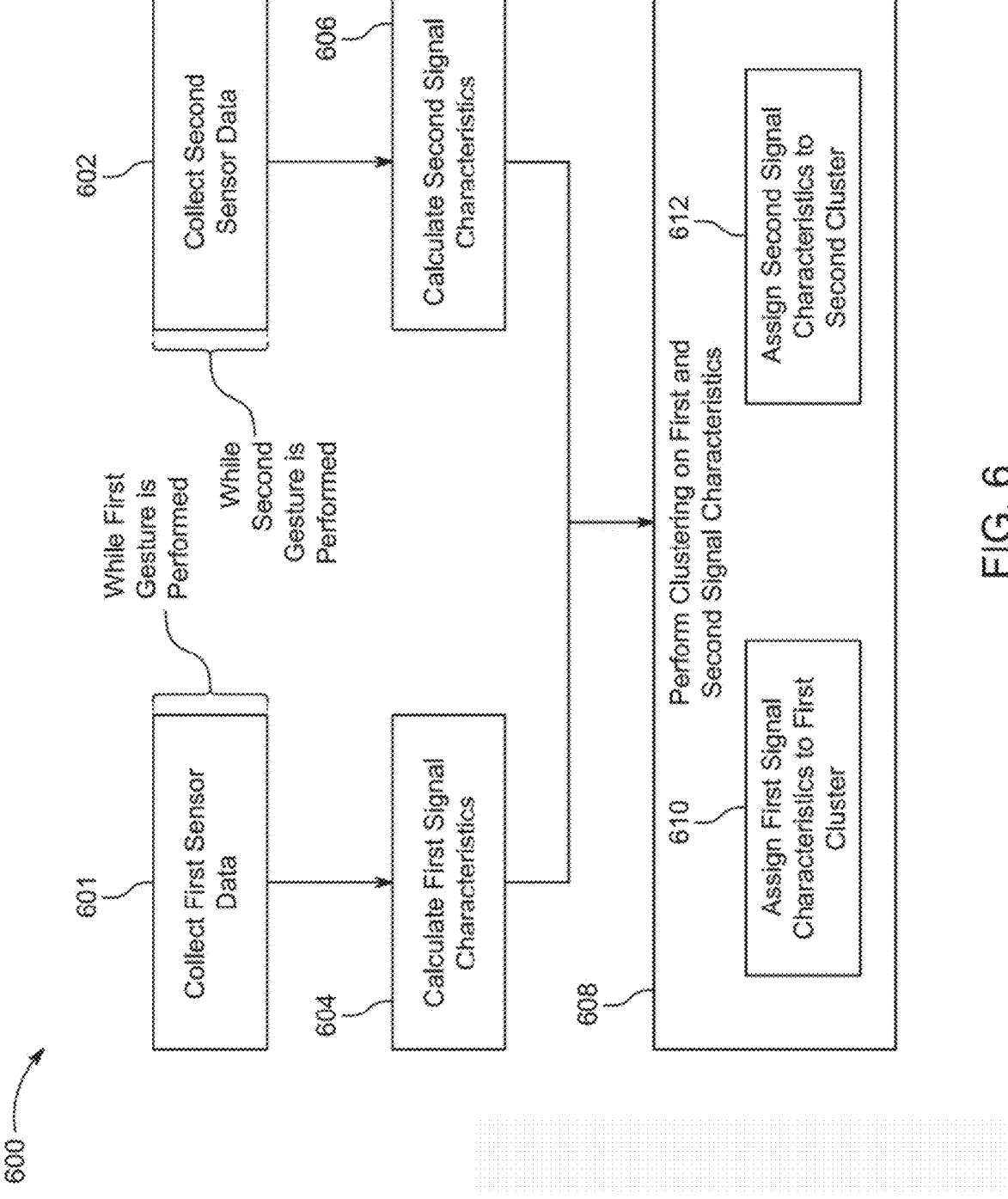

FIG. 6 is a flowchart of an illustrative process 600 for monitoring a user of a head-wearable electronic device by training a system for head gesture detection. Any suitable user interface information may be presented to a user of system 1 (e.g., user U wearing HWD 100) in order to prompt the user to perform a particular head gesture. For example, a user interface requesting performance of a chewing head gesture may be presented to the user during a first period of time (e.g., visually and/or audibly and/or tactilely) and sensor data may be collected during the first period while the user interface is presented and/or during another period after the user interface is presented while the user may perform the requested gesture. Additional user interfaces may be presented to prompt a user to perform additional head gestures during additional periods of time to train for detection of the additional gestures. For example, sensor data, including light sensor data, can be collected while the user performs various head gestures, for example, to train a gesture detection algorithm. At operation 601 of process 600, during a first period in which a user performs a first head gesture (e.g., when prompted by any suitable user interface), system 1 (e.g., HWD 100 and/or subsystem 200) may collect any suitable first sensor data (e.g., light sensor data from one, some, or each light-sensing component (e.g., photodiode) of one, some, or each light-sensing assembly 114 of HWD 100 and/or any other suitable sensor data from any other suitable sensor component of any sensor assembly of HWD 100 and/or of subsystem 200 (e.g., any pressure sensor and/or accelerometer sensor and/or microphone sensor and/or the like)). At operation 602, during a second period in which a user performs a second head gesture (e.g., when prompted by any suitable user interface), system 1 (e.g., HWD 100 and/or subsystem 200) may collect any suitable second sensor data (e.g., light sensor data from one, some, or each light-sensing component (e.g., photodiode) of one, some, or each light-sensing assembly 114 of HWD 100 and/or any other suitable sensor data from any other suitable sensor component of any sensor assembly of HWD 100 and/or of subsystem 200 (e.g., any pressure sensor and/or accelerometer sensor and/or microphone sensor and/or the like)). At operation 604 of process 600, any suitable first signal characteristic(s) may be extracted from the first sensor data collected at operation 601 (e.g., as mentioned with respect to FIG. 5). At operation 606 of process 600, any suitable second signal characteristic(s) may be extracted from the second sensor data collected at operation 602 (e.g., as mentioned with respect to FIG. 5). At operation 608 of process 600, any suitable clustering may be performed on the first signal characteristic(s) calculated at operation 604 and on the second signal characteristic(s) calculated at operation 606 (e.g., a k-means clustering algorithm or any other suitable clustering algorithm). For example, at operation 610 of process 600, the clustering algorithm may assign one, some, or each first signal characteristic to a first cluster of signal characteristics, and, at operation 612 of process 600, the clustering algorithm may assign one, some, or each second signal characteristic to a second cluster of signal characteristics.

It is understood that the operations shown in process 600 of FIG. 6 are only illustrative and that existing operations may be modified or omitted, additional operations may be added, and the order of certain operations may be altered. In some examples, system 1 (e.g., HWD 100 and/or subsystem 200) can assign each cluster to one of the head gestures as part of the training process. For example, the system may be operative to compare the first cluster to the second cluster. Then, based on comparing the first cluster to the second cluster, the system may be operative to determine that there are more of the first signal characteristics assigned to the first cluster than to the second cluster. In accordance with such a determination that there are more of the first signal characteristics assigned to the first cluster than to the second cluster, the system may be operative to assign the first cluster to the first head gesture. Similarly, based on comparing the first cluster to the second cluster, the system may be operative to determine that there are more of the second signal characteristics assigned to the second cluster than to the first cluster. In accordance with such a determination that there are more of the second signal characteristics assigned to the second cluster than to the first cluster, the system may be operative to assign the second cluster to the second head gesture. In some examples, the clustering process can be seeded by initially clustering the signal characteristics based on the time period in which the data was collected. For example, the first cluster can be initially assigned all the signal characteristics corresponding to the first period during which the first head gesture was performed, and the second cluster can be initially assigned all the signal characteristics corresponding to the second period during which the second head gesture was performed. Following this initial assignment, a clustering algorithm (e.g., k-means clustering) can be performed to optimize the clusters, potentially moving some points from the first cluster to the second cluster, moving some points from the second cluster to the first cluster, and/or moving some points from the first and second clusters to other clusters. In some examples, the system may be operative to generate a template for each of the first and second head gestures to aid in the gesture detection process. For example, the system may be operative to calculate first mean signal characteristics for the first cluster (e.g., as part of a k-means clustering process), and the first mean signal characteristics may be used as a template for the first cluster. Similarly, the system may be operative to calculate second mean signal characteristics for the second cluster (e.g., as part of a k-means clustering process), and the second mean signal characteristics may be used as a template for the second cluster. In another example, some or all of the first sensor data may be stored as the first template for the first cluster, and some or all of the second sensor data may be stored as the second template for the second cluster. In some examples, a generic template for each gesture may be stored and used as a starting point for the training process before any user-specific data has been collected. Then, each template can be adjusted based on user-specific data collected during training. Any such template and/or cluster data may be stored by system 1 (e.g., as head gesture cluster data 105 of memory assembly 104). In some examples, additional training can be conducted to train the system to detect when the user is not performing either the first or second gesture. The system may be operative to collect additional sensor data during a period in which the user does not perform the first or second head gesture. Signal characteristics can be calculated based on the additional sensor data, and these signal characteristics can be assigned to a third cluster. The third cluster can be a cluster that is associated with some third gesture (e.g., if the user performed a third gesture during the training period) or it can be a cluster that is not associated with any gesture. This process may be at least partially repeated for any number of gestures during any suitable time periods during which various external/ambient attributes/conditions may be varied, such as a position of any ambient light source AS with respect to the user and/or a strength of any emitted ambient light AL, such that operation 608 may be effective for clustering signal characteristics for different gestures no matter the external conditions.

Figure 7:
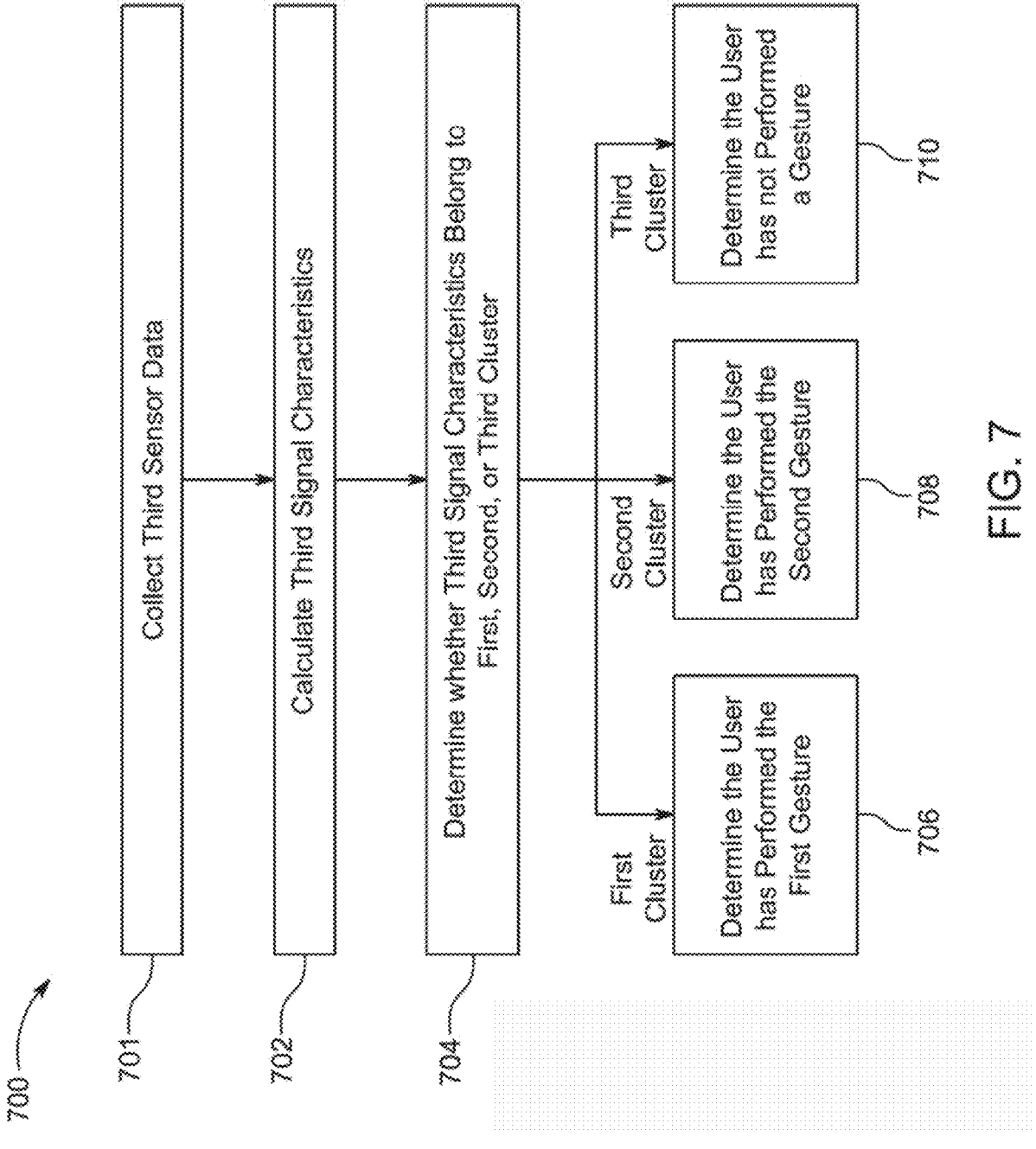

FIG. 7 is a flowchart of an illustrative process 700 for monitoring a user of a head-wearable electronic device by detecting a head gesture. For example, after any suitable training or other suitable process for generating and/or acquiring any suitable head gesture template and/or cluster data (e.g., head gesture cluster data 105), one or more head gestures can be detected by collecting new sensor data and then using the clusters associated with each gesture to determine if one of the gestures has been performed. For example, at operation 701 of process 700, during a third period (e.g., during use of a system after process 600 has been performed (e.g., after head gesture cluster data has been made accessible)), system 1 (e.g., HWD 100 and/or subsystem 200) may collect third sensor data from one, some, or each available sensor assembly (e.g., any suitable third sensor data (e.g., light sensor data from one, some, or each light-sensing component (e.g., photodiode) of one, some, or each light-sensing assembly 114 of HWD 100 and/or any other suitable sensor data from any other suitable sensor component of any sensor assembly of HWD 100 and/or of subsystem 200 (e.g., any pressure sensor and/or accelerometer sensor and/or microphone sensor and/or the like))). At operation 704 of process 700, any suitable third signal characteristic(s) may be extracted from the third sensor data collected at operation 701 (e.g., as mentioned with respect to FIG. 5). At operation 704 of process 700, to perform gesture detection, system 1 may determine whether the third signal characteristics calculated at operation 702 belong to a first cluster (e.g., as may be defined by any accessible first cluster data (e.g., as may be defined at operation 610)), a second cluster (e.g., as may be defined by any accessible second cluster data (e.g., as may be defined at operation 612)), or a third cluster or any other cluster that may have previously been clustered (e.g., at operation 608). The third cluster can be a cluster that is associated with some third gesture, different from the first gesture associated with the first cluster and different from the second gesture associated with the second cluster, or it can be a cluster that is not associated with any gesture. Based on determining which cluster the third signal characteristics belong to, system 1 may detect the first gesture, the second gesture, or no gesture. For example, in accordance with a determination at operation 704 that the third signal characteristics belong to the first cluster (e.g., a cluster associated with a first head gesture), system 1 may determine at operation 706 that the user has performed the first head gesture. In accordance with a determination at operation 704 that the third signal characteristics belong to the second cluster (e.g., a cluster associated with a second head gesture), system 1 may determine at operation 708 that the user has performed the second head gesture. In accordance with a determination at operation 704 that the third signal characteristics belong to the third cluster (e.g., a cluster associated with some third gesture or no gesture whatsoever), system 1 may determine at operation 710 that the user has not performed either the first head gesture or the second head gesture.

It is understood that the operations shown in process 700 of FIG. 7 are only illustrative and that existing operations may be modified or omitted, additional operations may be added, and the order of certain operations may be altered. In some examples, determining whether the third signal characteristics belong to the first cluster, the second cluster, or the third cluster may include performing clustering (e.g., a k-means clustering algorithm, or other clustering algorithm) on the third signal characteristics with respect to the first, second, and third clusters. The cluster membership of the third signal characteristics may be determined by the results of the clustering. In some examples, determining whether the third signal characteristics belong to the first cluster, the second cluster, or the third cluster may include comparing the third signal characteristics to first, second, and/or third templates corresponding to the first, second, and third clusters, respectively. The system may thereby be operative to determine whether the third signal characteristics are closer to the first cluster or the second cluster based on the templates. For example, if each template includes mean signal characteristics, then the system may be operative to calculate a first distance from the third signal characteristics to the first template (e.g., the first mean signal characteristics of the first cluster) and calculate a second distance from the third signal characteristics to the second template (e.g., the second mean signal characteristics of the second cluster). As just one example, the distance calculation can be a Euclidean distance calculation between two points in multi-dimensional space. In accordance with a determination that the first distance is shorter than the second distance, the system may be operative to determine that the third signal characteristics belong to the first cluster. In accordance with a determination that the second distance is shorter than the first distance, the system may be operative to determine that the third signal characteristics belong to the second cluster. In some examples, the system may also be operative to compare the third signal characteristics to a third template in the same manner, or, if both the first and second distances are longer than a predetermined threshold distance, the system may be operative to determine that the third signal characteristics belong to a third cluster by default. Based on determining which cluster the third signal characteristics belong to, the system may then be operative to detect the first gesture, the second gesture, or no gesture (e.g., at operations 706, 708, and/or 710). After detecting the first gesture or the second gesture, the system may be operative to perform an operation associated with the detected gesture. For example, if the system detects the first gesture, the system may be operative to perform an operation in response, such as opening an application, closing an application, returning to a home screen, messaging a contact, adjusting an audio output volume, and/or any other suitable functionality (e.g., system 1 may determine and share a determined head gesture as at least a portion of sensor mode data 324 with at least one managed element 390 of system 1 (e.g., of device 100 and/or of any suitable subsystem 200 of system 1) at least partially based on the received sensor state data 322 (e.g., third signal characteristics), where such sensor mode data 324 may be received by managed element 390 for controlling at least one characteristic of managed element 390). In some examples, sensor data (e.g., the first, second, or third sensor data described above) can be further processed before extracting signal characteristics (e.g., the first, second, or third signal characteristics described above). For example, a band pass filter may be applied to sensor data to filter out heart rate frequencies from the sensor data. As light sensor data may vary according to the periodic motion of blood through human head tissue, it may be beneficial to filter out these frequencies to better isolate the contribution of head gesture motion to the signal characteristics for detecting a particular head gesture (although, such periodic blood motion frequencies may be used for detecting any suitable heart rate characteristic(s) of the user).

The above provides just a few examples as to how head gesture template and/or cluster data (e.g., head gesture cluster data 105) may be obtained and/or used to determine an appropriate head gesture of a user wearing an HWD using light sensor data. For example, a head gesture model may be developed and/or generated (e.g., as head gesture data 105) for use in evaluating and/or predicting and/or estimating and/or determining a particular head gesture for a particular type of HWD on a general and/or a particular head (e.g., for an experiencing entity (e.g., a particular user or a particular subset or type of user or all users generally (e.g., using a particular type of HWD)). For example, a head gesture model may be a learning engine for any experiencing entity, such as for a particular HWD type and for any general user and/or for a particular user (e.g., with a particular head shape and/or particular gesture mannerisms), where the learning engine may be operative to use any suitable machine learning to use certain sensor data (e.g., one or more various types or categories of sensor data that may be detected by any suitable sensor assembly(ies) of the HWD and/or of any suitable paired subassembly(ies) (e.g., one, some, or each light sensor channel data of one, some, or each of light-sensing 114a-114i, any other suitable sensor channel data of one, some, or each of light-sensing assemblies 114a-114i and/or of subsystem 200)) in order to predict, estimate, and/or otherwise determine a current head gesture of the user. For example, the learning engine may include any suitable neural network (e.g., an artificial neural network) that may be initially configured, trained on one or more sets of sensor data that may be generated during the performance of one or more known head gestures, and then used to predict a particular head gesture based on another set of sensor data. A neural network or neuronal network or artificial neural network may be hardware-based, software-based, or any combination thereof, such as any suitable model (e.g., an analytical model, a computational model, etc.), which, in some embodiments, may include one or more sets or matrices of weights (e.g., adaptive weights, which may be numerical parameters that may be tuned by one or more learning algorithms or training methods or other suitable processes) and/or may be capable of approximating one or more functions (e.g., non-linear functions or transfer functions) of its inputs. The weights may be connection strengths between neurons of the network, which may be activated during training and/or prediction. A neural network may generally be a system of interconnected neurons that can compute values from inputs and/or that may be capable of machine learning and/or pattern recognition (e.g., due to an adaptive nature). A neural network may use any suitable machine learning techniques to optimize a training process. The neural network may be used to estimate or approximate functions that can depend on a large number of inputs and that may be generally unknown. The neural network may generally be a system of interconnected "neurons" that may exchange messages between each other, where the connections may have numeric weights (e.g., initially configured with initial weight values) that can be tuned based on experience, making the neural network adaptive to inputs and capable of learning (e.g., learning pattern recognition). A suitable optimization or training process may be operative to modify a set of initially configured weights assigned to the output of one, some, or all neurons from the input(s) and/or hidden layer(s). A non-linear transfer function may be used to couple any two portions of any two layers of neurons, including an input layer, one or more hidden layers, and an output (e.g., an input to a hidden layer, a hidden layer to an output, etc.). Different input neurons of the neural network may be associated with respective different types of sensor data categories and may be activated by sensor data of the respective sensor data categories (e.g., light sensor channel data for each possible light sensor channel of each light-sensing assembly of the HWD, additional sensor channel data for each possible additional sensor channel of the HWD (e.g., sound data, motion data, force data, temperature data, ambient color/white point chromaticity data, geo-location data, time data, location type, time of day, day of week, week of month, week of year, month of year, season, holiday, time zone, and/or the like), any suitable data indicative of an activity of the user (e.g., exercising, gaming/viewing (e.g., current status of a currently played media), sleeping, working, reading, etc.), and/or the like may be associated with one or more particular respective input neurons of the neural network and sensor category data for the particular sensor category may be operative to activate the associated input neuron(s)). The weight assigned to the output of each neuron may be initially configured (e.g., at operation 802 of process 800 of FIG. 8) using any suitable determinations that may be made by a custodian or processor (e.g., device 100 and/or auxiliary subsystem 200) of the head gesture or sensor model (e.g., head gesture data 105) based on the data available to that custodian.

The initial configuring of the learning engine or head gesture model for the experiencing entity (e.g., the initial weighting and arranging of neurons of a neural network of the learning engine) may be done using any suitable data accessible to a custodian of the head gesture model (e.g., a manufacturer of device 100 or of a portion thereof (e.g., a model 105m of head gesture data 105), any suitable maintenance entity that manages auxiliary subsystem 200, and/or the like), such as data associated with the configuration of other learning engines of system 1 (e.g., learning engines or head gesture models for similar experiencing entities), data associated with the experiencing entity (e.g., initial background data accessible by the model custodian about the experiencing entity's composition, size, shape, age, any suitable biometric information, background, interests, goals, past experiences, and/or the like), data assumed or inferred by the model custodian using any suitable guidance, and/or the like. For example, a model custodian may be operative to capture any suitable initial background data about the experiencing entity in any suitable manner, which may be enabled by any suitable user interface provided to an appropriate subsystem or device accessible to one, some, or each experiencing entity (e.g., a model app or website). The model custodian may provide a data collection portal for enabling any suitable entity to provide initial background data for the experiencing entity. The data may be uploaded in bulk or manually entered in any suitable manner. In a particular embodiment where the experiencing entity is a particular user or a group of users, the following is a list of just some of the one or more potential types of data that may be collected by a model custodian (e.g., for use in initially configuring the model): sample questions for which answers may be collected may include, but are not limited to, questions related to an experiencing entity's age, head shape, comfort level while wearing an HWD, evaluation of perceived or otherwise measured gesture (e.g., gesture and/or motion and/or action and/or vocalization and/or emotion and/or thought and/or brain function and/or heart rate characteristic and/or other biometric characteristic (e.g., as predicted by the model using detected by HWD sensor data)) with respect to a particular previously intended and/or conducted and/or performed gesture (e.g., gesture and/or motion and/or action and/or vocalization and/or emotion and/or thought and/or brain function and/or heart rate characteristic and/or other biometric characteristic (e.g., as indicated by the experiencing entity through selection of one gesture from a list of gestures provided for selection (e.g., in a survey))), and/or the like.

A head gesture model custodian may receive from the experiencing entity (e.g., at operation 804 of process 800 of FIG. 8) not only HWD sensor category data for at least one HWD sensor category for a gesture that the experiencing entity is currently experiencing conducting or carrying out or undergoing or has previously experienced or conducted or carried out or undergone, but also a score for that gesture experience (e.g., a score that the experiencing entity and/or a non-HWD sensor (e.g., sensor assembly 214 of subsystem 200) may supply as an indication of the gesture that the experiencing entity experienced from experiencing the gesture). This may be enabled by any suitable user interface provided to any suitable experiencing entity by any suitable head gesture model custodian (e.g., a user interface app or website that may be accessed by the experiencing entity). The head gesture model custodian may provide a data collection portal for enabling any suitable entity to provide such data. The score (e.g., head gesture score) for the gesture may be received and may be derived from the experiencing entity in any suitable manner. For example, a single questionnaire or survey may be provided by the model custodian for deriving not only experiencing entity responses with respect to HWD sensor category data for a gesture, but also an experiencing entity score for the gesture. The model custodian may be configured to provide best practices and standardize much of the evaluation, which may be determined based on the experiencing entity's goals and/or objectives as captured before the gesture may have been experienced. In some embodiments, in order to train one or more models, a user may manually or actively provide information to the system that is indicative of one or more gestures known by the user to have been carried out by the user, where such information may be used to define one or more outputs of one or more models (e.g., information indicative of a particular gesture that the user intentionally carried out while HWD sensor data was collected by the system, such as chewing, blinking, winking, smiling, eyebrow raising, humming or other internal vocalizations (e.g., "mmm-hmm", "uh-huh", etc.), inaudible cues, jaw motions, speaking or other external explicit language vocalization, mouth opening (e.g., full mouth opening, left-side mouth opening, right-side mouth opening, etc.), car wiggling, smirking, smiling, frowning, grimacing, check motioning, removing the HWD from the user's head, adorning the user's head with the HWD, and/or the like). Additionally or alternatively, in order to train one or more models, one or more non-HWD sensing components may be used to provide information to the system that is indicative of one or more gestures known to have been carried out by the user, where such information may be used to define one or more outputs of one or more models (e.g., information indicative of a particular gesture carried out while HWD sensor data was collected by the system, such as one or more particular biometric characteristic gestures of the user as may be detected by any suitable sensing component(s) of sensor assembly 214 of any suitable subsystem 200 (e.g., a dedicated biometric sensing subsystem (e.g., a dedicated PPG, fNIR spectroscope, EEG machine, etc.))).

A learning engine or head gesture model for an experiencing entity may be trained (e.g., at operation 806 of process 800 of FIG. 8) using the received HWD sensor category data for the gesture (e.g., as inputs of a neural network of the learning engine) and using the received score for the gesture (e.g., as an output of the neural network of the learning engine). Any suitable training methods or algorithms (e.g., learning algorithms) may be used to train the neural network of the learning engine, including, but not limited to, Back Propagation, Resilient Propagation, Genetic Algorithms, Simulated Annealing, Levenberg, Nelder-Meade, and/or the like. Such training methods may be used individually and/or in different combinations to get the best performance from a neural network. A loop (e.g., a receipt and train loop) of receiving HWD sensor category data and a score for a gesture and then training the head gesture model using the received HWD sensor category data and score (e.g., a loop of operation 804 and operation 806 of process 800 of FIG. 8) may be repeated any suitable number of times for the same experiencing entity and the same learning engine for more effectively training the learning engine for the experiencing entity, where the received HWD sensor category data and the received score received of different receipt and train loops may be for different gestures or for the same gesture (e.g., at different times) and/or may be received from the same source or from different sources of the experiencing entity (e.g., from different users of the same or a similar HWD) (e.g., a first receipt and train loop may include receiving HWD sensor category data and a score from a first user of a first age with respect to that user's experience with a first (e.g., intended) gesture, while a second receipt and train loop may include receiving HWD sensor category data and a score from a second user of a second age with respect to that user's experience with the first (e.g., intended) gesture, while a third receipt and train loop may include receiving HWD sensor category data and a score from a third user of the first age with respect to that user's experience with a second (e.g., intended) gesture, and/or the like), while the training of different receipt and train loops may be done for the same learning engine using whatever HWD sensor category data and score was received for the particular receipt and train loop. The number and/or type(s) of the one or more HWD sensor categories for which HWD sensor category data may be received for one receipt and train loop may be the same or different in any way(s) than the number and/or type(s) of the one or more HWD sensor categories for which HWD sensor category data may be received for a second receipt and train loop.

A head gesture model custodian may access (e.g., at operation 808 of process 800 of FIG. 8) HWD sensor category data for at least one HWD sensor category for another gesture (e.g., another intended gesture) that is different than any intended gesture considered at any HWD sensor category data receipt of a receipt and train loop for training the learning engine for the experiencing entity). In some embodiments, this other gesture may be a gesture that has not been specifically experienced by any experiencing entity prior to use of the gesture model in an end user use case. Although, it is to be understood that this other gesture may be any suitable gesture. The HWD sensor category data for this other gesture may be accessed from or otherwise provided by any suitable source(s) using any suitable methods (e.g., from one or more sensor assemblies and/or input assemblies of any suitable device(s) 100 and/or subsystem (s) 200 that may be associated with (e.g., worn by the user carrying out) the particular gesture at the particular time) for use by the gesture model custodian (e.g., processor assembly 102 of device 100).

This other gesture (e.g., gesture of interest) may then be scored (e.g., at operation 810 of process 800 of FIG. 8) using the learning engine or gesture model for the experiencing entity with the HWD sensor category data accessed for such another gesture. For example, the HWD sensor category data accessed for the gesture of interest may be utilized as input(s) to the neural network of the learning engine (e.g., at operation 810 of process 800 of FIG. 8) similarly to how the HWD sensor category data accessed at a receipt portion of a receipt and train loop may be utilized as input(s) to the neural network of the learning engine at a training portion of the receipt and train loop, and such utilization of the learning engine with respect to the HWD sensor category data accessed for the gesture of interest may result in the neural network providing an output indicative of a gesture score or gesture level or gesture state that may represent the learning engine's predicted or estimated gesture to have been experienced by the experiencing entity.

Figure 3:
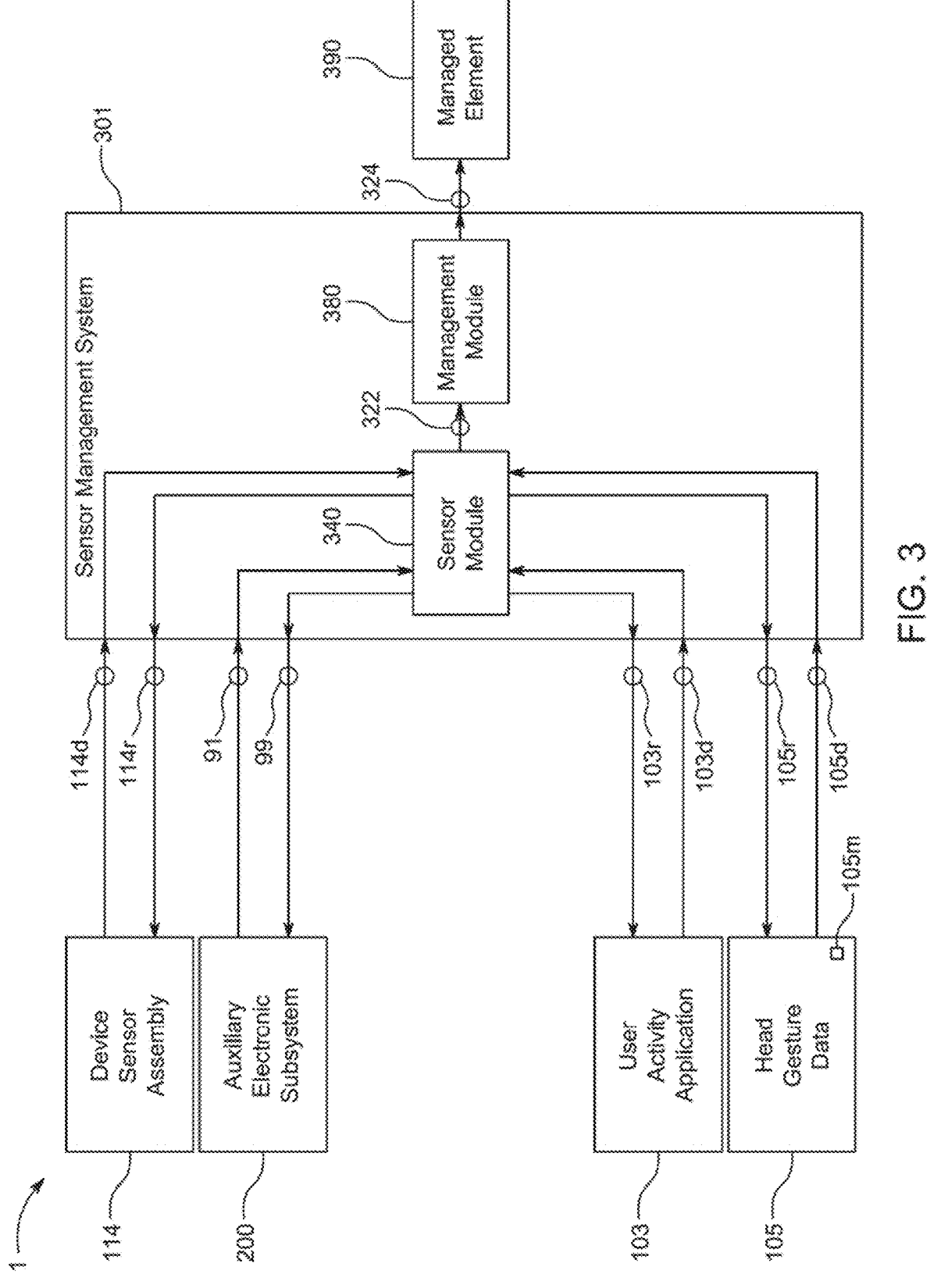
FIG. 3 is a schematic view of an illustrative portion of the head-wearable electronic device of FIGS. 1-2H.

After a gesture score (e.g., any suitable gesture state data (e.g., gesture state data or user state data or sensor state data 322 of FIG. 3)) is determined (e.g., estimated or predicted by the model) for a gesture of interest (e.g., for a current gesture being experienced by an experiencing entity (e.g., for a particular time and/or during a particular activity)), it may be determined (e.g., at operation 812 of process 800 of FIG. 8) whether the realized gesture score satisfies a particular condition of any suitable number of potential conditions, and, if so, the model custodian or any other suitable processor assembly or otherwise (e.g., of device 100) may generate any suitable control data (e.g., sensor mode data (e.g., sensor mode data 324 of system 301 of FIG. 3)) that may be associated with that satisfied condition for controlling any suitable functionality of any suitable assembly of device 100 or of device 200 or otherwise (e.g., for adjusting a user interface presentation to a user (e.g., to present an indication of the user's heart rate to the user when the satisfied condition is indicative of a heart rate above a certain threshold) and/or for activating a camera functionality (e.g., to capture the environment of the user when the satisfied condition is indicative of the user being scared (e.g., when the satisfied condition is indicative of the user having gasped)) and/or for controlling any suitable functionality of any suitable sensor assembly of device 100 or otherwise (e.g., for turning on or off a particular type of sensor and/or for adjusting the functionality (e.g., the accuracy) of a particular type of sensor (e.g., to gather any additional suitable sensor data)), and/or the like). A gesture score may be indicative of a probability of one or more gestures having been intended or carried out (e.g., voluntarily and/or involuntarily) or endured by the experiencing entity and/or of a characteristic of one or more gestures. For example, a score may be indicative of 90% likelihood that the user gasped and indicative of a heart rate between X and Y or a heart rate of Z. As just one other example, a score may be indicative of 83% likelihood that the user smiled and indicative of a heart rate variability between G and H or a heart rate variability of I. In some embodiments, a first model may be trained and later used to score a first type of gesture (e.g., likelihood of a gasp) while a second model may be trained and later used to score a second type of gesture (e.g., value or range of a heart rate). Certain types or all types of HWD sensor data for a particular moment may be provided as inputs to certain ones or to each available gesture model, such that various models may each provide a respective output score for that moment, where each output score may be analyzed with respect to one or more different respective conditions depending on the type of model providing the output score. For example, all various HWD sensor data generated when a user acts a certain way during a certain moment may be provided as inputs to one or more different models, each of which may generate a different output score, each of which may be compared to one or more different conditions, for determining one or more gestures or gesture conditions most likely to have been carried out or endured or experienced by the user during that moment. A certain condition may be defined by a certain threshold (e.g., a determined likelihood of a gasping gesture being at least 90% or a determined heart rate being at least a value X, etc.) above which the predicted gesture score ought to result in a warning or other suitable instruction or adjusted functionality being provided to the experiencing entity. A threshold score or condition may be defined or otherwise determined (e.g., dynamically) in any suitable manner and may vary between different experiencing entities and/or between different gestures of interest and/or between different combinations of such experiencing entities and gestures and/or in any other suitable manner.

If a gesture of interest is experienced by the experiencing entity, then any suitable gesture behavior data (e.g., any suitable user behavior information), which may include an experiencing entity provided gesture score (e.g., I 100% gasped), may be detected during that experience and may be stored (e.g., along with any suitable gesture characteristic information of that gesture) as gesture behavior data and/or may be used in an additional receipt and train loop for further training the learning engine. Moreover, in some embodiments, a gesture model custodian may be operative to compare a predicted gesture score for a particular gesture of interest with an actual experiencing entity provided gesture score for the particular gesture of interest that may be received after or while the experiencing entity may be actually experiencing the gesture of interest and enabled to actually score the gesture of interest (e.g., using any suitable user behavior information, which may or may not include an actual user provided score feedback). Such a comparison may be used in any suitable manner to further train the learning engine and/or to specifically update certain features (e.g., weights) of the learning engine. For example, any algorithm or portion thereof that may be utilized to determine a gesture score may be adjusted based on the comparison. A user (e.g., experiencing entity (e.g., an end user of device 100)) may be enabled by the gesture model custodian to adjust one or more filters, such as a profile of gestures they prefer to or often experience and/or any other suitable preferences or user profile characteristics (e.g., age, weight, seeing ability, etc.) in order to achieve such results. This capability may be useful based on changes in an experiencing entity's capabilities and/or objectives as well as the gesture score results. For example, if a user loses its ability to hear or see color, this information may be provided to the model custodian, whereby one or more weights of the model may be adjusted such that the model may provide appropriate scores in the future.

Therefore, any suitable gesture model custodian may be operative to generate and/or manage any suitable gesture model or gesture learning engine that may utilize any suitable machine learning, such as one or more artificial neural networks, to analyze certain gesture data (e.g., HWD sensor data) of a performed or detected gesture to predict/estimate the gesture score or intended gesture of that performed gesture for a particular user (e.g., generally, and/or at a particular time, and/or with respect to one or more planned activities), which may enable intelligent suggestions be provided to the user and/or intelligent system functionality adjustments be made for improving the user's experiences. For example, a gesture engine may be initially configured or otherwise developed for an experiencing entity based on information provided to a model custodian by the experiencing entity that may be indicative of the experiencing entity's specific preferences for different gestures and/or gesture types (e.g., generally and/or for particular times and/or for particular planned activities) and/or of the experiencing entity's specific experience with one or more specific gestures. An initial version of the gesture engine for the experiencing entity may be generated by the model custodian based on certain assumptions made by the model custodian, perhaps in combination with some limited experiencing entity-specific information that may be acquired by the model custodian from the experiencing entity prior to using the gesture engine, such as the experiencing entity's age, language(s) spoken, hair color, any suitable biometric characteristics, and/or the like. The initial configuration of the gesture engine may be based on data for several HWD sensor categories, each of which may include one or more specific HWD sensor category data values, each of which may have any suitable initial weight associated therewith, based on the information available to the model custodian at the time of initial configuration of the engine (e.g., at operation 802 of process 800 of FIG. 8). As an example, an HWD sensor category may be force detected by a force sensor (e.g., AS1 component 164), and the various specific HWD sensor category data values for that HWD sensor category may include any force less than A force, any force between B force and C force, any force between C force and D force, and/or the like, each of which may have a particular initial weight associated with it. As another example, an HWD sensor category may be amount of light type XYZ detected by a specific light-sensing component of a specific HWD (e.g., an amount of IR light detected by PD2 component 134 of device 100 (e.g., the total amount of IR light detected by that PD2 component 134, a ratio of the total amount of IR light detected by that PD2 component 134 compared to the total amount of IR light emitted by LE1 component 154 for potential detection by PD2 component 134, or the like)). For example, each channel of light sensor data available to the HWD may be represented by its own HWD sensor category, and the amount of light detected by that channel may be used to define the HWD sensor category data for that channel's HWD sensor category.

Once an initial gesture engine has been created for an experiencing entity, the model custodian may provide a survey to the experiencing entity that asks for specific information with respect to a particular gesture that the experiencing entity has experienced in the past or which the experiencing entity is currently experiencing. Not only may a survey ask a user for or otherwise (e.g., automatically) obtain objective information about a particular gesture, such as an identification of the location at which the gesture was performed, the time at which the gesture was experienced, the current sleep level of the experiencing entity, the current nutrition level of the experiencing entity, the current mindfulness level of the experiencing entity, an activity performed by the experiencing entity while experiencing the gesture (e.g., playing a video game, reading a book, talking on the telephone, watching a sporting event, etc.), the heart rate or other biometric characteristic of the user (e.g., as determined by a non-HWD sensor), and/or the like, but also for subjective information about the gesture, such as the experiencing entity's intended or known to be performed gesture (e.g., I 100% yawned, I 100% gasped, I was 80% scared and 20% happy, etc.) and/or the like. Each completed experiencing entity survey for one or more gestures (e.g., one or more gestures generally and/or for one or more times and/or for one or more concurrent activities) by one or more particular experiencing entity respondents of the experiencing entity may then be received by the model custodian and used to train the gesture engine. By training the gesture engine with such experiencing entity feedback on one or more prior and/or current gesture experiences, the gesture engine may be more customized to the experiencing entity by adjusting the weights of one or more category options to an updated set of weights for providing an updated gesture engine.

It is to be understood that device 100 and/or any other device or subsystem available to system 1 (e.g., any remote subsystem via the internet or any other suitable network) may be a model custodian for at least a portion or all of one or more gesture models (e.g., of gesture data 105). A particular model (e.g., a particular one of one or more gesture models 105*m* of gesture data 105) may be for one or more particular users and/or one or more particular HWDs and/or one or more particular gestures.

To accurately determine a head gesture of a user of HWD 100, any suitable portion of system 1, such as device 100, may be configured to use various information sources in combination with any available head gesture data 105 (e.g., any suitable one or more gesture models) in order to classify or predict a current head gesture of the user. For example, any suitable processing circuitry or assembly (e.g., a sensor module) of device 100 may be configured to gather and to process various types of sensor data, in conjunction with head gesture data 105, to determine what type of head gesture has been performed or is being performed by the user. For example, any suitable sensor data from one or more of any or each sensor assembly 114 of device 100, with or without any suitable sensor data from auxiliary environment subsystem 200, and any application data of any application 103 being run by device 100 may be utilized in conjunction with any suitable head gesture data, such as with a gesture model 105*m* of head gesture data 105, to determine a head gesture of the user efficiently and/or effectively.

FIG. 3 shows a schematic view of a sensor management system 301 of HWD 100 that may be provided to manage sensor states of HWD 100 (e.g., to determine a head gesture of a user wearing HWD 100 and to manage a mode of operation of HWD 100 and/or of any other suitable subsystem (e.g., subsystem 200) of system 1 based on the determined sensor state). In addition to or as an alternative to using any device sensor data 114*d* that may be generated by any suitable sensor data channel(s) of any suitable sensing assemblies 114 (e.g., as may be automatically transmitted to sensor management system 301 and/or received by sensor management system 301 in response to device sensor request data 114*r*), sensor management system 301 may use various other types of data accessible to device 100 in order to determine a current sensor state of system 1 (e.g., in conjunction with one or more gesture models 105*m* of head gesture data 105), such as any suitable data provided by one or more of auxiliary subsystems 200 (e.g., data 91 from one or more assemblies of auxiliary subsystem 200), an activity application 103 of device 100 (e.g., data 103*d* that may be provided by an activity application 103 (e.g., automatically and/or in response to request data 103*r*) and that may be indicative of one or more current activities of the user (e.g., current state of a video game being played by the user, type of movie being watched by the user, type of book being read by user, etc.). In response to determining the current sensor state (e.g., at least a recent head gesture performed by the user), sensor management system 301 may apply at least one sensor-based mode of operation to at least one managed element 390 (e.g., any suitable assembly of device 100 and/or any suitable assembly of subsystem 200 or otherwise of system 1) based on the determined sensor state (e.g., to suggest certain user behavior and/or to control the functionality of one or more system assemblies) for improving a user's experience. For example, as shown in FIG. 3, sensor management system 301 may include a sensor module 340 and a management module 380.

Sensor module 340 of sensor management system 301 may be configured to use various types of data accessible to HWD 100 in order to determine (e.g., characterize) a sensor state (e.g., a current head gesture of a user of HWD 100 with or without any other characteristic(s) (e.g., heart rate, etc.)). As shown, sensor module 340 may be configured to receive any suitable device sensor data 114*d* that may be generated and shared by any suitable device sensor assembly 114 when HWD 100 is worn on head H of user U (e.g., automatically or in response to any suitable request type of device sensor request data 114*r* that may be provided to any sensor assembly 114), any suitable auxiliary subsystem data 91 that may be generated and shared by any suitable auxiliary subsystem assembly(ies) based on any sensed data or any suitable auxiliary subsystem assembly characteristics (e.g., automatically or in response to any suitable request type of auxiliary subsystem data 99 that may be provided to auxiliary subsystem 200), any suitable activity application status data 103*d* that may be generated and shared by any suitable activity application 103 that may be indicative of one or more user activities (e.g., automatically or in response to any suitable request type of activity application request data 103*r* that may be provided to activity application 103), and sensor module 340 may be operative to use such received data in any suitable manner in conjunction with any suitable head gesture model data and/or any suitable head gesture cluster data (e.g., any suitable gesture model(s) 105*m* of head gesture data 105) to determine any suitable sensor state (e.g., with head gesture data 105*d* that may be any suitable portion or the entirety of head gesture data 105, which may be accessed automatically and/or in response to any suitable request type of head gesture request data 105*r* that may be provided to a provider of head gesture data 105 (e.g., memory assembly 104 or a memory assembly of auxiliary subsystem 200)). Any suitable portions of one or more of data 114*d*, data 91, and data 103*d* may be used as category data inputs for one or more models of data 105*d*.

Once sensor module 340 has determined a current sensor state for a user of HWD 100 (e.g., based on any suitable combination of one or more of any suitable received data 114*d*, 91, 103*d*, and 105*d*), sensor module 340 may be configured to generate and transmit sensor state data 322 to management module 380, where sensor state data 322 may be indicative of at least one determined sensor state for the user of HWD 100 (e.g., one or more of a current head gesture, current heart rate, current speed, current location, current emotion, etc.). In response to determining a sensor state or one or more gestures of a user of HWD 100 by receiving sensor state data 322, management module 380 may be configured to apply at least one sensor-based mode of operation to at least one managed element 390 of system 1 based on the determined sensor state. For example, as shown in FIG. 3, sensor management system 301 may include management module 380, which may be configured to receive sensor state data 322 from sensor module 340, as well as to generate and share sensor mode data 324 with at least one managed element 390 of system 1 (e.g., of HWD 100 and/or of any other suitable subsystem 200) at least partially based on the received sensor state data 322, where such sensor mode data 324 may be received by managed element 390 for controlling at least one characteristic of managed element 390. Managed element 390 may be any suitable assembly of device 100 (e.g., any processor assembly 102, any memory assembly 104 and/or any data stored thereon, any communications assembly 106, any power supply assembly 108, any input assembly 110, any output assembly 112, any sensor assembly 114, etc.) and/or any suitable assembly of any suitable auxiliary environment subsystem 200 of system 1, and sensor mode data 324 may control managed element 390 in any suitable way, such as by enhancing, enabling, disabling, restricting, and/or limiting one or more certain functionalities associated with such a managed element (e.g., controlling motor 122 to better position light-sensing assembly 114*b* for more effective sensing (e.g., due to ambient light, insufficient strength of contact with user's head, etc.), turning on a video recording capability of device 100 or subsystem 200 (e.g., due to detecting a user gasp gesture and/or a user scared gesture), and/or the like).

Sensor mode data 324 may be any suitable device control data for controlling any suitable functionality of any suitable assembly of HWD 100 as a managed element 390 (e.g., any suitable device output control data for controlling any suitable functionality of any suitable output assembly 112 of device 100 (e.g., for adjusting a user interface presentation to user U (e.g., to provide a suggestion or an indication of any suitable sensor data (e.g., heart rate))), and/or any suitable device sensor control data (e.g., a control type of device sensor request data 114*r*) for controlling any suitable functionality of any suitable sensor assembly 114 of device 100 (e.g., for turning on or off a particular type of sensor and/or for adjusting the functionality (e.g., the accuracy) of a particular type of sensor (e.g., to gather any additional suitable sensor data)), and/or any suitable activity application control data (e.g., a control type of activity application request data 103*r*) for updating or supplementing any input data available to activity application 103 that may be used to determine a current activity, and/or the like). Additionally or alternatively, sensor mode data 324 may be any suitable auxiliary subsystem data 99 for controlling any suitable functionality of any suitable auxiliary subsystem 200 as a managed element 390 (e.g., capture a photograph or turn on a video recording functionality of subsystem 200 in response to detecting a particular gesture (e.g., in response to detection of a user gasping or an increase in heart rate (e.g., for security purposes))). Additionally or alternatively, sensor mode data 324 may be any suitable head gesture update data (e.g., an update type of head gesture request data 105*r*) for providing any suitable data to head gesture data 105 as a managed element 390 (e.g., any suitable head gesture update data for updating a model or cluster of head gesture data 105 (e.g., a model 105*m*) in any suitable manner).

FIG. 8 is a flowchart of an illustrative process 800 for monitoring a user of a head-wearable electronic device. At operation 802 of process 800, a head gesture model custodian (e.g., a gesture model custodian system) may initially configure a learning engine (e.g., gesture model 105*m*) for an experiencing entity. At operation 804 of process 800, the head gesture model custodian may receive, from the experiencing entity, HWD sensor category data for at least one HWD sensor category for a gesture and a score for the gesture. At operation 806 of process 800, the head gesture model custodian may train the learning engine using the received HWD sensor category data and the received score. At operation 808 of process 800, the head gesture model custodian may access HWD sensor category data for the at least one HWD sensor category for another gesture. At operation 810 of process 800, the head gesture model custodian may score the other gesture, using the learning engine, with the accessed HWD sensor category data for the other gesture. At operation 812 of process 800, when the score for the other gesture satisfies a condition, the head gesture model custodian may generate control data associated with the satisfied condition.

It is understood that the operations shown in process 800 of FIG. 8 are only illustrative and that existing operations may be modified or omitted, additional operations may be added, and the order of certain operations may be altered.

An output score of a model for a particular gesture type or any other suitable determination or estimation of the likelihood of a particular gesture being detected based on certain types or all types of HWD sensor data for a particular moment (e.g., a score of operation 810 and/or a determination of one of operations 706 or 708 and/or a sensor state of sensor state data 322) may be combined with such a determination or estimation of the likelihood of one, some, or each other particular gesture being detected based on certain types or all types of HWD sensor data for a particular moment (e.g., another score of another iteration of operation 810 and/or a determination of one of another iteration of operations 706 or 708 and/or another sensor state of other sensor state data 322), and the combination of such determinations or estimations of likelihood for any suitable number of gestures for a particular moment (e.g., concurrently detected or immediately sequentially detected gestures or likelihoods thereof) may be used to make any suitable combined determination, such as a determination or estimation as to the user's state of being, which may then be used to control managed element 390 in any suitable manner. For example, such various determinations or estimations of likelihood for any suitable number of gestures themselves may be inputs to one or more secondary models and/or may be used to perform clustering or otherwise to provide an output score of a model for a particular user's state of being or any other suitable determination or estimation of the likelihood of a particular user's state of being based on such inputs. These inputs can be cross-referenced with respect to any suitable machine learning superset and tied to best a fit profile based on similar or baseline users. Any suitable particular types of user's state of being may be determined, including, but not limited to, a determination of one's physical and/or psychological state with regard to attentiveness, receptiveness, alertness, drowsiness, boredom, stimulation, confidence, deception (e.g., a user is lying), anxiety, depression, worry, serenity, degree of relaxation, degree of stimulation, mental state, and/or the like. For example, a combination of 80% likelihood of smiling and a 90% chance of a regular heart rate may result in a 90% likelihood of a serenity state of being. As another example, a combination of 80% likelihood of a wide open mouth and a 75% likelihood of raised eyebrows and a 90% chance of a high heart rate may result in a 90% likelihood of an anxious state of being.

The system may be configured to use sequential signals to differentiate between different states of being. For example, the system may be configured to use sequential signals to differentiate between scared or happy or surprised. For example, in a scenario where a user comes home to a dark house and turns on the lights and then (1) the user's eyes widen involuntarily, the eyebrows move up, the ears move back, and then (2a) the user either smiles (e.g., when the user spots his dog on the couch) or (2b) the user gasps (e.g., when the user sees a burglar) for potentially determining happy or scared or surprised. The system may be configured to monitor a series of rich facial gestures including any suitable numerous involuntary, unnoticed, facial movements that may be tracked to determine any suitable state(s) of being, which may be used to control the system in any suitable way(s). For example, in response to detecting a likelihood of a deception state of being where the user may be lying, the system may be operative to communicate this to any suitable entity (e.g., as a lie detector test). For example, in response to detecting a likelihood of a drowsiness state of being where the user may be falling asleep, the system may be operative to generate haptic feedback for attempting to stimulate the user (e.g., for encouraging a user to focus if becoming drowsy or daydreaming while in class or for instructing the user to memorialize a thought if the user is determined to be daydreaming. For example, in response to detecting a likelihood of a frowning state of being where the user may be expressing signs of displeasure, the system may be operative to generate haptic feedback for attempting to notify the user (e.g., discreet feedback for notifying the user to look more cheerful if determined to be displeased at an inopportune situation (e.g., during a job interview)).

FIG. 9 is a flowchart of an illustrative process 900 for monitoring a user of a head-wearable electronic device. At operation 902 of process 900, light sensor data may be obtained for one, some, or each channel of light sensor data from one, some, or each light-sensing component of one, some, or each light-sensing assembly of a head-wearable electronic device (e.g., light sensor data from each channel of each light-sensing component 124/134/144 of each light-sensing 114 of HWD 100 (e.g., at a particular moment in time or for a particular duration of time)).

At operation 904 of process 900, a functional proximity for one, some, or each light-sensing component of the HWD may be determined (e.g., using at least one additional-sensing component associated with the light-sensing component). For example, at least one of additional-sensing components 164 and 174 of sensing assembly 114*b* may be associated with (e.g., positioned adjacent or otherwise close to) one, some, or each of light-sensing components 124, 134, and/or 144, and such an additional-sensing component may be operative to provide sensor data indicative of the proximity of that additional-sensing component (and, thereby, of its associated light-sensing component(s)) to a surface (e.g., skin surface HSs) against which the light-sensing component(s) may function. As just one example, additional-sensing component 174 may be a force or contact or pressure sensor or any other suitable sensor that may be operative to provide functional proximity data that may be indicative of the proximity of its associated light-sensing component(s) to a functional surface of the user's head, where such functional proximity data may be used (e.g., by any suitable processor of system 1) to determine whether or not the associated light-sensing component(s) are functionally proximate the functional surface in order to determine whether the associated light sensor data may be relied upon (e.g., at all or with a particular weight) or whether the associated light sensor data ought to be disregarded (e.g., at operation 910). For example, a light-sensing component held against a user's skin surface with a particular force or pressure or within a particular range thereof may provide more reliable light sensor data than a light-sensing component determined to be held at a distance away from a user's skin surface. As just one other example, only ambient light may be exposed to each light-sensing component (e.g., no light may be generated by any HWD-internal components) and the more ambient light detected may be correlated with a greater distance between the light sensing component and the user's body (e.g., to detect different user head shapes and/or different interface fits between the HWD and the user's head). Any suitable monitoring may be carried out to monitor the proximity and/or contact of one, some, or each light-sensing component, such as any suitable technique, including, but not limited to, providing an IR signal and loop back, or enabling only ambient (non-HWD generated light) to be detected by a light-sensing component, or using force or pressure sensors, and/or the like to identify or rank the most reliable light-sensing components with respect to functional proximity to a user, where each light-sensing component may be weighted or ranked or scored for functional proximity and light sensor data from only one or some or all the light-sensing components may be used based on the weighting or ranking (e.g., only use data from top ranked (e.g., sensors whose score passes a functionally viable proximity threshold), or weight the data from each sensor based on proximity functionality rank, etc.). Based on such determined functional proximity viability, sensor data from a first set of one or more light sensor components may be used to determine a first gesture while a second set of one or more light sensor components different from the first set may be used to determine a second gesture different from the first gesture (e.g., using different gesture models).

At operation 906 of process 900, a signal quality for the output of one, some, or each light-sensing component of the HWD may be determined. For example, any suitable noise analysis and/or band pass filter may be used to determine if at least an appropriate amount of signal remains and/or peak exists for the particular channel (e.g., to make sure a signal has most of its energy within an appropriate band of energy and/or harmonics (e.g., to make sure it is not white noise)). Various tests and/or calibration techniques may be applied to improve the signal(s) from one or more particular channels during one or more iterations of operation 906, such as by adjusting the output strength of at least one light-emitting component associated with the channel, periodically monitoring each channel to determine if the channel's light-sensing component(s) have been saturated by ambient light (e.g., the sun) (e.g., whereby ambient light and/or HWD light-emitting components may be used for different sides of the HWD), turning off each HWD light-emitting component for a channel and taking a dark sample and then taking a light sample with one or each HWD light-emitting component turned on (e.g., to determine what dynamic range the channel may be in and/or to determine if a current or strength of any component(s) of the channel ought to be adjusted for obtaining useful data from the channel), and/or the like. Different signal qualities may be required for different applications or for determinations of different gestures. Based on such determined signal quality, sensor data from a first set of one or more light sensor components may be used to determine a first gesture while a second set of one or more light sensor components different from the first set may be used to determine a second gesture different from the first gesture (e.g., using different gesture models).

At operation 908 of process 900, motion sensor data and/or any other suitable additional-sensor data of the HWD may be determined (e.g., using at least one additional-sensing component of a light-sensing assembly of the HWD or otherwise). For example, at least one sensor (e.g., an accelerometer) of the HWD may be operative to provide data indicative of the motion of the HWD. Any suitable processing of the HWD's system may be used to determine whether or not the associated light-sensing component(s) are functionally proximate the functional surface in order to determine whether the associated light sensor data may be relied upon (e.g., at all or with a particular weight) or whether the associated light sensor data ought to be disregarded (e.g., at operation 910). For example, a light-sensing component held against a user's skin surface with a particular force or pressure or within a particular range thereof may provide more reliable light sensor data than a light-sensing component determined to be held at a distance away from a user's skin surface. Any suitable processing of system 1 may be used to identify the type of motion being experienced by the HWD and used to determine whether or not to ignore or selectively filter light sensor data detected during a particular type of motion (e.g., at operation 910). For example, if the HWD is determined to be moving in a car (e.g., on a bumpy road) that motion may be determined to result in untrustworthy light sensor data and any data detected during that motion may be disregarded. Any other suitable non-light sensing data may also be determined at operation 908 from one, some, or each additional sensor available to the HWD device (e.g., any suitable sound sensor, temperature sensor, etc.).

At operation 910 of process 900, any light sensor data obtained at operation 902 may be filtered (e.g., removed, weighted, conditioned, combined, averaged, etc.) using one, some, or each determination made at one, some, or each of operations 904, 906, and 908 (e.g., certain light sensor data may be ignored or weighted based on a determined functional proximity of its light-sensing component, and/or based on a determined signal quality of the data and/or of its light-sensing component, and/or based on a determined motion of the HWD, and/or based on any other sensed data from any other sensing component of the HWD's system). Any suitable techniques may be used to provide any suitable filtering for improving any suitable gesture determination, including, but not limited to, combining different channels and/or averaging them into a newly defined channel (e.g., dual sensors (e.g., like sensors positioned on opposite sides of the head of a user) may be averaged for noise removal (e.g., constructive interference may exist for certain biometric characteristic gestures (e.g., as detectable heart rate may be the same on each side of the head) but noise may be destructive interference so an averaging may work)), weighting and/or scoring certain channels based on functional proximity and/or movement and/or signal quality and/or the like and then ignoring or devaluing channels based on that weighting or scoring, and/or providing different band pass filters and providing different signals for different type of gesture determinations (e.g., a first band pass filter may be used to provide signals to be used for determining heart rate gesture and a second different band pass filter may be used to provide signals to be used for determining a breathing rate gesture and a third different band pass filter may be used to provide signals to be used for determining a soft vocalization gesture). Additionally or alternatively, filtering may include adjusting a functionality of one or more light-sensing components and/or light-emitting components and/or additional-sensing components of the HWD to improve signal quality for certain gesture determination, such as by increasing a sampling frequency of a light-sensing component and/or increasing the brightness of a light-emitting component if a higher signal-to-noise ratio (SNR) is sought (e.g., for determining the movement or velocity of a user's blood stream (e.g., for providing a tachogram)).

At operation 912 of process 900, at least one gesture may be determined using one, some, or each channel of light sensor data as may be obtained and filtered by operations 902-910 and using any of the determinations of operations 904-908. For example, at operation 912, any suitable gesture model may use any suitable channels of light sensor data, which may be filtered in any suitable manner, alone or in combination with any suitable other sensor data for determining (e.g., estimating) one or more particular gestures (e.g., as described with respect to operation 810 of process 800). Therefore, different channels of data may be selected for use or not used based on various ones or more of operations 902-910 for determination of different gestures. Gestures may be learned through any suitable learning process (e.g., of process 800), where the system (e.g., with an HWD user) may train the system to learn several different gestures. Feedback may be provided to the user to inform the user if two or more gestures are similar to one another (e.g., based on confidence metrics of one or more models). Different gestures can be combined (e.g., a chewing gesture or a particular heart rate gesture may be combined with interpreted internal voicing (e.g., inaudible, intentional internal voicings) or other sound cues by the user. Biomarkers for different experiences or gestures may be monitored and may yield and event-reaction (e.g., an anticipation during a sporting event may lead to a gasp and/or an adrenaline rise and/or an increase in heart rate). Then, at operation 914 of process 900, any gesture(s) determined at operation 912 may then be used (e.g., alone or in combination with any suitable conditions or thresholds or the like) to provide one or more outputs that may be used to control the functionality of the system in any suitable manner(s).

It is understood that the operations shown in process 900 of FIG. 9 are only illustrative and that existing operations may be modified or omitted, additional operations may be added, and the order of certain operations may be altered.

Figure 10:
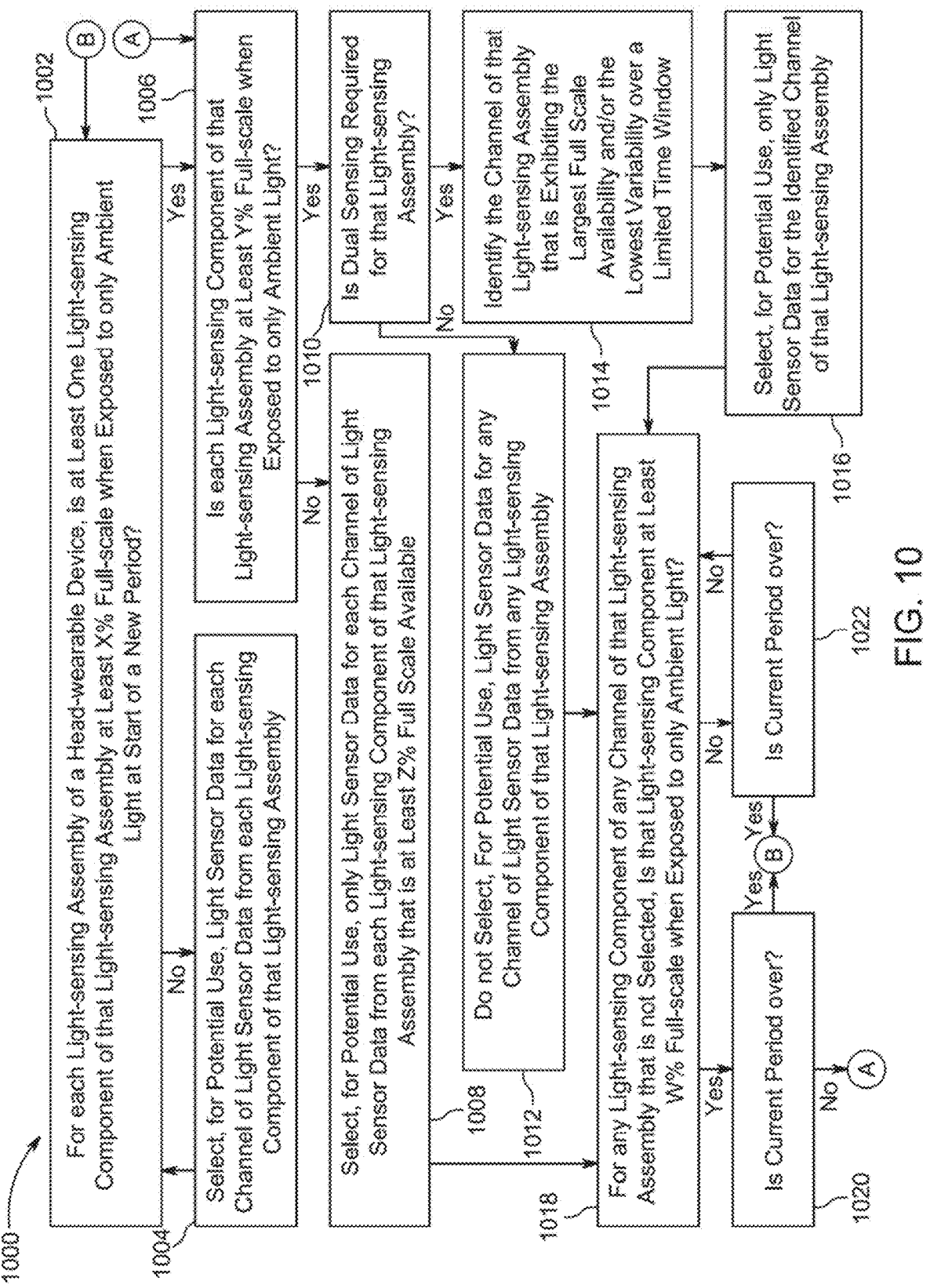

FIG. 10 is a flowchart of an illustrative process 1000 for dynamically selecting light sensor data channels for potential use in gesture detection based on ambient light exposure. At operation 1002 of process 1000, at the start of a new period (e.g., of any suitable length of time), for a particular light-sensing assembly of a head-wearable device, it may be determined if at least one light-sensing component of that light-sensing assembly is at least X % full scale when exposed to only ambient light. For example, with respect to light-sensing assembly 114*b* of HWD 100, it may be determined if at least one of light-sensing component (e.g., of light-sensing components 124, 134, and 144 of just side 101*ih* of assembly 114*b* or of light-sensing components 124', 134', and 144' of just side 101*ch* of assembly 114*b* or of light-sensing components 124, 124', 134, 134', 144, and 144' of the entirety of assembly 114*b*) is at least X % full scale when exposed to only ambient light (e.g., ambient light of source AS) and not to any internally generated light of HWD 100 (e.g., light of any light-emitting component 154 or 154' of HWD 100). The value of threshold X may be any suitable threshold, such as any suitable value between 65% and 85% or a value of 75%. If none of the light-sensing components of the particular light-sensing assembly satisfy the requirement of operation 1002 for the current period (e.g., no light-sensing component of the assembly is saturated or nearly saturated), then process 1000 may proceed to operation 1004, where light sensor data for each channel of light sensor data from each light-sensing component of the particular light-sensing assembly may be selected for potential use (e.g., in determining one or more user gestures (e.g., at operation 810 of process 800 and/or at operation 912 of process 900)) (e.g., no channel of light sensor data of the particular light-sensing assembly may be filtered out and excluded from potential use due to ambient light saturation), and then process 1000 may return from operation 1004 to operation 1002. However, if at least one of the light-sensing components of the particular light-sensing assembly satisfy the requirement of operation 1002 for the current period (e.g., at least one light-sensing component of the assembly is saturated or nearly saturated), then process 1000 may proceed to operation 1006, where it may be determined if each light-sensing component of that light-sensing assembly is at least Y % full scale when exposed to only ambient light. The value of threshold Y may be any suitable threshold, such as any suitable value between 65% and 85% or a value of 75%, where Y may be greater than, equal to, or less than the value of threshold X. If not all of the light-sensing components of the particular light-sensing assembly satisfy the requirement of operation 1006 (e.g., if at least one light-sensing component of the assembly is not saturated or not nearly saturated), then process 1000 may proceed to operation 1008, where only light sensor data for each channel of light sensor data from each light-sensing component of the particular light-sensing assembly that is at least Z % full scale available after ambient light is taken into account may be selected for potential use (e.g., in determining one or more user gestures (e.g., at operation 810 of process 800 and/or at operation 912 of process 900)) (e.g., certain channels of light sensor data of the particular light-sensing assembly may be filtered out and excluded from potential use due to ambient light saturation (e.g., a channel may be filtered out if channel is greater than 100%-Z % full scale when exposed only to ambient light)), and then process 1000 may advance to operation 1018. The value of threshold Z may be any suitable threshold, such as any suitable value between 40% and 80% or a value of 50% or 60% or 70% or 80%. For example, where the value of threshold Z may be defined to be 80, operation 1008 may select, for potential use, only light sensor data for each channel of light sensor data from each light-sensing component of the light-sensing assembly that is less than 20% full scale when exposed to only ambient light (i.e., light sensor data for each channel of light sensor data from each light-sensing component of the light-sensing assembly that is at least 80% full scale available). Because operation 1008 may occur when at least one but not all light-sensing components of the light-sensing assembly is at or near a saturation (e.g., as defined by the value of threshold X at operation 1002 and/or by the value of threshold Y at operation 1006), there may be a higher likelihood that other light-sensing components of the light-sensing assembly, although not currently saturated, may instantaneously move into and/or be specifically prone to saturation (e.g., when (i) the user tilts or moves its head and, thus, the head-wearable device in a specific orientation relative to an ambient light source, (ii) the head-wearable device moves its position in any other manner with respect to an ambient light source, etc.), such that the value of threshold Z at operation 1008 may be operative to provide a conservative constraint on the type of light-sensor data that may be selected for potential use during process 1000. However, if each light-sensing component of the particular light-sensing assembly satisfy the requirement of operation 1006 (e.g., each light-sensing component of the assembly is saturated or nearly saturated), then process 1000 may proceed to operation 1010, where it may be determined if the light-sensing assembly is required or at least desired for dual sensing (e.g., differential signaling where light sensor data from different sides of the user's head may be utilized for better gesture determination). If it is determined at operation 1010 that the light-sensing assembly is not to be used for dual sensing, then process 1000 may proceed to operation 1012, where no light sensor data for any channel of light sensor data from any light-sensing component of the particular light-sensing assembly may be selected for potential use (e.g., in determining one or more user gestures (e.g., at operation 810 of process 800 and/or at operation 912 of process 900)) (e.g., all channels of light sensor data of the particular light-sensing assembly may be filtered out and excluded from potential use due to ambient light saturation), and then process 1000 may return from operation 1012 to operation 1018. However, if it is determined at operation 1010 that the light-sensing assembly is to be used for dual sensing, then process 1000 may proceed to operation 1014, where a particular channel of the light-sensing assembly that is exhibiting the largest full scale availability and/or the lowest variability over a limited time window (e.g., a sub-period length of time of the current period) may be identified. Then, process 1000 may proceed to operation 1014, where only light sensor data for the identified channel of the particular light-sensing assembly may be selected for potential use (e.g., in determining one or more user gestures (e.g., at operation 810 of process 800 and/or at operation 912 of process 900)) (e.g., all but a particular identified channel of the particular light-sensing assembly may be filtered out and excluded from potential use due to ambient light saturation), and then process 1000 may advance to operation 1018. At operation 1018, for any light-sensing component of any channel of the light-sensing assembly that has not been selected for potential use for the current period (e.g., at one of operations 1008, 1012, and 1016), it may be determined whether that light-sensing component is at least W % full-scale when exposed to only ambient light. The value of threshold W may be any suitable threshold, such as any suitable value between 65% and 85% or a value of 75%, which may be greater than or less than or equal to value X and/or greater than or less than or equal to value Y. If at least one of the non-selected light-sensing components of the particular light-sensing assembly satisfy the requirement of operation 1018, then process 1000 may proceed to operation 1020, where it may be determined if the current period has ended, and, if so, process 1000 may return to operation 1002, otherwise process 1000 may return to operation 1006. However, if none of the non-selected light-sensing components of the particular light-sensing assembly satisfy the requirement of operation 1018, then process 1000 may proceed to operation 1022, where it may be determined if the current period has ended, and, if so, process 1000 may return to operation 1002, otherwise process 1000 may return to operation 1018. Process 1000 may be carried out after any suitable gain options have been exhausted (e.g., no more gain options are available for improving the dynamic range of a light-sensing component without saturating that light-sensing component). Saturation detected by process 1000 if for ambient light saturation and not due to any light emitted by the HWD device itself, in which case a magnitude of one or more light-emitting components of the HWD may be reduced to avoid such saturation (or, if not possible, a non-human surface would be assumed for reflecting the light causing such saturation and may be ignored altogether). Similar determinations to those made at one or more of operations 1002, 1006, 1008, 1014, and 1018 with respect to saturation and/or full scale availability may be made with respect to signal quality (e.g., as an alternative to or in addition to channel selection for high ambient light situations, but for high signal quality situations), which can be based on any suitable metric(s), such as standard deviation (e.g., to avoid channels with random impulses due to contact modulation), correlation (e.g., with other channels), phase difference (e.g., with other channels), and/or the like. In some embodiments, where sufficient ambient light is detected but saturation is sufficiently avoided, such ambient light may be used as the light source operative to enable one or more channels of light sensor data (e.g., without relying on one or more light-emitting components of the HWD). For example, at least for light-sensing components 124', 134', and 144' of car side 101$ch$ of assembly 114$b$ that may be more susceptible to ambient light (e.g., through a user's car) as opposed to skull side 101$ih$ of assembly 114$b$, those light-sensing components may be operative to detect ambient light rather than light from light-emitting component 154' (e.g., during a low power mode where powering light-emitting component 154' may not be desired and/or when significant ambient light may be detected by those light-sensing components). Therefore, a passive transmission mode may be used when ambient light is sufficiently detected by the HWD via a portion of the user (e.g., modulated by physiological changes (e.g., blood due to motion) within that user portion and/or due to contact and/or pressure variability between that user portion and the HWD during any suitable user gestures). Alternatively, a reflectance mode may be used when HWD-generated light is launched from the HWD into the user's body and is scattered within and is reflected back from the user's body to the HWD for detection, where such scattered and reflected light may be modulated by physiological changes (e.g., blood due to motion) within that user body portion and/or due to contact and/or pressure variability between that user body portion and the HWD during any suitable user gestures. Any one or more of light-transmissive elements 125, 125', 135, 135', 145, and 145' at any suitable light-sensing component of the HWD may be provided with any suitable directional preference component that may be operative to enable the light-sensing component to avoid a direct light source (e.g., sunlight, above lit office lighting, etc.) in order to avoid saturation (e.g., by preferentially collecting light incident to the light-sensing component and not at any other angles).

It is understood that the operations shown in process 1000 of FIG. 10 are only illustrative and that existing operations may be modified or omitted, additional operations may be added, and the order of certain operations may be altered.

Further, although examples of the disclosure may be described herein primarily in terms of devices with multiple assemblies and/or multiple of light-sensing components (e.g., multiple photodiodes), it should be understood that examples of the disclosure are not so limited, but include devices with only a single sensor assembly and/or a single light-sensing component (e.g., a single photodiode). A channel of sensor data can correspond to each unique light sensor/emitter pair, whether there is one or multiple sensors, one or multiple emitters, and/or the like.

HWD 100 may include any suitable number of light-sensing assemblies, each with any suitable number of light-sensing components, arranged in any suitable manner, such as strategically placed for sensing one or more suitable types of physiological signals or movements of a user with respect to HWD 100 (e.g., movement of a user's skin with respect to HWD 100 (e.g., during a detectable chewing or vocalization or facial or other suitable gesture (e.g., when an HWD is put on or removed from a user's head)) and/or movement of a user's blood with respect to HWD 100 (e.g., during a detectable change in a heart rate or breathing rate or other biometric characteristic gesture)). Dual placement of light-sensing assemblies, one on each side of a user's head when the HWD is properly worn, may enable sensing of highly differential signals for improving the accuracy of one or more types of gesture determination. Differential signaling may take advantage of multiple locations of sensors of the HWD with respect to a user's body (e.g., opposite sides of a user's head, above each ear, above each temple, etc.), which may allow the HWD to capture a lot more information (e.g., more reliable vital signs) than if one sensor positioned at one location and/or information with less noise (e.g., less noise than if a sensor is only positioned on a user's wrist or at one of the user's cars, which may be susceptible to a lot of motion artifacts (e.g., wind/etc.), which various HWDs of this disclosure may avoid). Moreover, the vasculature is different and simpler in a user's head than in a user's wrist, which may provide significant advantages to the efficiency and effectiveness of the HWDs of this disclosure. An HWD may be biased against a user's head and may provide a stable and/or reliable interface with a user as compared to a sensing device that may be worn on a user's wrist or ear, which may be more exposed to wind, air, ambient light, internal movements, ligaments, and/or the like than a user's head may be. The placement of and/or distance between sensors that may be specifically afforded by an HWD may be used to enhance the signal to noise ratio. For example, a contour of an HWD may be provided to exert a pressure on a user's head for maintaining an interface between the user and a sensing assembly. A distance between a light-sensing component and a light-emitting component may be optimized to the geometry of a surface of a head, such as based on bone or structure of a skull. The wavelengths of light emitted by one or more light-emitting components may be chosen depending on the location of assumed contact of the head and/or level of motion. For example, emitted light at IR wavelength(s) may be preferred in regions of the HWD that may make better contact with the user and/or that have less motion with respect to the user during use, while emitted light at green wavelength(s) may be preferred in regions of the HWD that may regularly move more with respect to the user or otherwise during use. In regions of the HWD where it may be assumed that there will be contact modulation between the HWD and the user, a source-to-detector spacing (e.g., between light-transmissive element 155 of LE1 154 and light-transmissive element 125 of PD1 124) may be chosen to yield a proximity curve that may be relatively flat (e.g., in a range of contact to 4.0 millimeters). This may reduce the impact of motion artifacts. A fresnel lens may be used to collimate or steer a beam to achieve a desired proximity curve. Multiple sets of light-sensing components and light-emitting components may be provided along the length of one or each arms of a glasses-type or other suitable type of HWD for accommodating various user head geometries while maintaining an effective sensor/user interface. Additionally, an HWD may be configured with one or more sensors to be positioned between a user's eyebrows (e.g., at a bridge of the nose) and/or behind the user's cars, which may be helpful for detecting any suitable gestures related to any electrical activity of the brain (e.g., as appropriate for enabling effective electroencephalography (EEG) (e.g., for predicting or diagnosing or otherwise utilizing the detection of potential user epilepsy, sleep disorder(s), encephalopathy, tumor, stroke, and/or the like)). Ambient light may be used to detect any suitable gestures. The HWD need not just look at an internally-emitted light channel (e.g., light channel) subtracting an ambient-emitted light channel (e.g., dark channel), but could be operative to use the dark channel itself as a signature for input to a template bank for comparison or to any suitable gesture model. Additionally or alternatively, the HWD may be operative such that any suitable light-sensing component may be enabled to only detect ambient light, while such detection may be used to adjust a brightness of a display output component or any other functionality of the HWD system.

For mitigating certain possible ambient light issues (e.g., degradation of HWD effectiveness due to ambient light, at least in embodiments that may leverage IR wavelength(s), an IR-transparent (but opaque to visible light) ink may be provided over one, some, or each one of the light-sensing components (e.g., light-transmissive element 125 of PD1 124 may be provided with any suitable IR-transparent ink or other suitable material). In some embodiments, an IR-transparent but visible light opaque ink may be provided along an exterior surface of a majority or the entirety of the HWD (e.g., for cosmetic purposes). However, if some estimate of ambient light may be useful (e.g., to estimate contact to skin, etc.), some of the light-sensing components can be covered by the ink, while other light-sensing components may not be covered by the ink, where the uncovered light-sensing components may be used at least for ambient light detection while the covered light-sensing components may be used for IR detection. If a mix of visible (e.g., Red and/or Green) light and IR light are to be used, then the IR-transparent ink may be used to cover IR LED die (e.g., cosmetics) and light-sensing components that may be used primarily for IR light collection (e.g., due to their proximity with the IR LED dic, etc.). During certain activities or usage cases, the number of sampled optical channels can be reduced for power savings. The usage cases can include determining "still" from any gesture (e.g., where very limited accuracy on which gesture was performed may be acceptable) or a very small subset of the complete list of gestures. Besides monitoring the ambient light mean level, the HWD system may be configured to monitor the ambient light noise (i.e., dark channel noise) to make sure that it is sufficiently small compared to the signatures being searched for in the gesture detection. If the ambient light noise is too high in some of the receive channels, then this may also be cause to drop these channels from the decision making process (e.g., this could essentially be baked into the signal quality check for each optical channel (e.g., before allowing that optical channel to be counted towards gesture detection)).

The sensing capabilities of such an HWD may enable the ability to measure various suitable biometric characteristic gestures, such as heart rate (HR) and heart rate variability (HRV), where HRV may typically be associated with stress. Vital sign detection may be enabled by the various arrangements and uses of light-sensing and light-emitting components along various portions of various HWDs of this disclosure. For example, an average biometric characteristic (e.g., HR) value over 8-10 second window (e.g., using fast Fourier transform (FFT)) may be determined to report that biometric characteristic every 5 or 10 seconds. Alternatively, a beat-to-beat determination of heart rate may be determined to provide a record (e.g., a tachogram) of the movement and/or velocity of the bloodstream (e.g., as may be made by a tachometer), where a quick change in heart rate beat to beat (e.g., a gasp) and/or based on any other suitable gestures (e.g., based on what situation a user may be in), may enable significant advantages. For example, an HWD may be operative to turn on any suitable process (e.g., a tachogram algorithm) for certain situations (e.g., to increase current to one or more light-emitting components (e.g., to increase SNR) and/or to increase sampling frequency of one or more light-sensing components), such as when user-initiated or when a gasp gesture is detected (e.g., opportunistically (monitoring accelerometer or IR channel, but notice gesture occurred that may trigger the new mode (e.g., for a minute, etc.))) or when application activated (e.g., during a certain game mode where it may be useful to specifically measure a user's beat-to-beat response (e.g., heart rate and/or heart rate turbulence (HRT) and/or breathing rate) to something that happens during that game mode).

The sensing capabilities of such an HWD may enable the ability to measure various suitable intentional user gestures, including, but not limited to, a stationary gesture, a detectable chewing gesture, an opening mouth gesture, a closing mouth gesture, a gasping gesture, any vocalization gesture (e.g., any soft vocalization gesture (e.g., a user saying aloud or internally or under breath, "yeah" or "do that" or "mmm hmmm" or "uh huh" or "nuh uh" or the like)), any suitable brain function (e.g., using functional near-infrared spectroscopy (fNIR or fNIRS)) for detecting whether a user is reading or alert or glazed or anxious or the like (e.g., using differential signaling (e.g., with one or more light channels between 700 and 900 nanometers or the like)), any facial movement gesture, any gesture for removal of the HWD from the user's head, any gesture for positioning of the HWD on the user's head, and/or the like. Synergy between light sensing and other data sensing methods (e.g., sound and/or pressure sensing) may yield accurate bio markers of a user's gestures (e.g., any combination of detected light-sensing signals and detected audio information and/or detected pressure information or force information and/or detected temperature information and/or detected location information and/or the like may be used to more effective and/or efficiently attempt to determine or estimate one or more user gestures. While a user is gaming (e.g., playing a video game) while wearing an HWD, the HWD may measure HR & HR fluctuations to monitor the user (e.g., for them to see live feedback of their vitals during highly intense moments of game play), which may enable a more immersive experience for the user. Even during everyday tasks of a user wearing an HWD, the HWD may detect various motions that may enable a hands-free method to perform various tasks (e.g., automatically record a user's environment in response to detection of any suitable user gesture) and/or enable additional accessibility options for users with limited mobility. An HWD may provide experience enhancement and simplification, such as by monitoring any suitable gesture cues from a user for event driven actions (e.g., capture the moment when any suitable biomarker suggests it is an important event, and record the date/time/location (e.g., while a user is wearing the HWD at sporting events, gaming, special moments, all with limited need for user interaction (e.g., no need to pull out your phone, for taking picture, etc.))). For example, when a user wearing an HWD cats breakfast in the morning, the HWD may be operative to detect the user's chewing to monitor how frequently the user is eating and the duration thereof and/or detect a chewing intensity to gain insight into the types of food the user may be eating, which may be used by the HWD system to recommend healthier eating frequency and/or foods. As another example, when a user wearing an HWD goes to work and becomes stressed out, the HWD may be operative to detect increases in the user's heart rate and/or respiration rate and/or changes in any other suitable user gestures (e.g., teeth grinding, vocalizations of "ugh", etc.), which may be used by the HWD system to recommend that the user meditate and/or rest, which may be confirmed by the HWD detecting that the user has closed its eyes. As another example, when a user wearing an HWD gets home from work and plays a video game, the HWD may be operative to detect facial and ocular gestures (e.g., squinting and/or blinking) to augment any other video game input controller functionality (e.g., instruct the user's gaming character to jump every time a squint gesture is detected) and/or to detect increases in the user's heart rate and/or respiration rate and/or changes in any other suitable user gestures to adjust a gaming experience (e.g., to present detected user biometric characteristics to the gaming user and/or to adjust a difficulty level of the game responsive to such HWD detections). As another example, when a user wearing an HWD goes to a bar to watch a sporting event with friends, the HWD may be operative to detect facial and ocular gestures (e.g., smiling and other arousal), which may be used to automatically capture a photograph or video during moments of heightened user excitement (e.g., to automatically capture an important moment of the user).

Therefore, this disclosure relates to detecting head gestures using an electronic device, such as a head wearable device held against any suitable portion(s) of a user's head. The device can have multiple light-sensing components (e.g., photodiodes), each sensing light at a different position on a surface of the device that faces skin of a user (as well as, optionally, one or more surfaces of the device that may face one or more ambient light sources). Due to this positioning, the sensor data from the light-sensing components can capture movement of anatomical features in the tissue of the user during a head gesture. Further, different light-emitting components on the device can emit light at different wavelengths (e.g., infrared light, green light, etc.), which may penetrate to different depths in the tissue of the user's head before reflecting back to the light-sensing components on the device. Accordingly, sensor data from the light-sensing components can capture expansion and contraction in the tissue of the user's head during a head gesture. Examples of the disclosure may detect head gestures by recognizing patterns in sensor data that may be characteristic of each head gesture, as the tissue expands and contracts and anatomical features in the tissue move during the gesture. Although examples of the disclosure may be described herein primarily in terms of wearable devices strapped to a head and head gestures, particularly biometric characteristic gestures and intentional and/or involuntary facial and brain gestures, it should be understood that examples of the disclosure are not so limited, but include wearable devices attached to other body parts, such as a neck and/or upper arms or legs, and gestures that can result therefrom. FIGS. 2-2I may illustrate exemplary HWDs with a plurality of sensors in accordance with examples of the disclosure. Each HWD can include a plurality of light-sensing components and any suitable number of light-emitting components. When an HWD is in use, the light-sensing components and the light-emitting component(s) may face the tissue of a user's head. Each light-sensing component can sense light at a different position on a surface of the device that faces the tissue of the user's head. Due to this positioning, the sensor data from the light-sensing components can capture movement of anatomical features in the tissue of the user during one or more head gestures. Different light-emitting components on an HWD can emit light at different wavelengths (e.g., infrared light, green light, etc.), which may penetrate to different depths in the tissue of the user's head before reflecting back to the light-sensing components on the device. Accordingly, sensor data from the light-sensing components can capture expansion and contraction in the tissue of the user's head during a head gesture. In some examples, sensor data (e.g., the first, second, or third light sensor channel data) can be further processed before extracting signal characteristics. For example, a band pass filter may be applied to sensor data to filter out heart rate frequencies from the sensor data. As light sensor data may vary according to the periodic motion of blood through human tissue, it may be beneficial to filter out these frequencies to better isolate the contribution of head gesture motion to the signal characteristics.

This disclosure relates to a data processing system (e.g., system 1) for extracting a desired vital signal of a user wearing an HWD of the system, where the vital signal may contain a physiological information component pertaining to a subject of interest, from photoplethysmography data. It also relates to a photoplethysmography system, to a data processing method for extracting a desired vital signal, which may contain a physiological information component pertaining to a subject of interest, from photoplethysmography data, and to a computer program. Information about cardiovascular status, such as blood oxygen saturation, heart and respiratory rates, and/or the like can be unobtrusively acquired by photoplethysmography (PPG) using sensors, such as light-sensing components on the HWD and/or any suitable additional-sensing components (e.g., sound sensing components and/or force sensing components and/or the like). PPG may be used for an estimation of cardiovascular parameters. This technique has been preferred over other techniques such as a chest belt for electrocardiography an electronic stethoscope because the latter two are often considered as a reduction in comfort and usability. However, a motion of the subject of interest (e.g., a wearer of an HWD of this disclosure) during a PPG measurement may generate motion artifacts in measured PPG signals, which may lead to erroneous interpretation and degrade the accuracy and reliability of estimation of cardiovascular parameters if such artifacts are not reduced or fully removed by the system. PPG data is data may be obtained by a PPG measurement before it is provided to a data processing device. The PPG data may for instance be provided in the form of sensor data generated by one or more light-sensing components on the device (e.g., one or more photodiodes or cameras), and may indicate a detected amount of light emitted by one or more light-emitting components (e.g., one or more LEDs or laser diodes) and reflected from or, depending on the measurement setup, transmitted through a sensed region of a subject of interest as a function of time. The sensed region may be a region of the skin of the subject of interest's head when wearing the HWD.

Moreover, one, some, or all of the processes described with respect to FIGS. 1-10 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory assembly 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications assembly 106 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of sensor management system 301 may be provided as a software construct, firmware construct, one or more hardware components, or a combination thereof. For example, any or each module of sensor management system 301 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of sensor management system 301 are only illustrative, and that the number, configuration, functionality, and interconnection of existing modules may be modified or omitted, additional modules may be added, and the interconnection of certain modules may be altered.

At least a portion of one or more of the modules of sensor management system 301 may be stored in or otherwise accessible to device 100 in any suitable manner (e.g., in memory assembly 104 of device 100 (e.g., as at least a portion of application 103)). Any or each module of sensor management system 301 may be implemented using any suitable technologies (e.g., as one or more integrated circuit devices), and different modules may or may not be identical in structure, capabilities, and operation. Any or all of the modules or other components of sensor management system 301 may be mounted on an expansion card, mounted directly on a system motherboard, or integrated into a system chipset component (e.g., into a "north bridge" chip).

Any or each module of sensor management system 301 may be a dedicated system implemented using one or more expansion cards adapted for various bus standards. For example, all of the modules may be mounted on different interconnected expansion cards or all of the modules may be mounted on one expansion card. With respect to sensor management system 301, by way of example only, the modules of sensor management system 301 may interface with a motherboard or processor assembly 102 of device 100 through an expansion slot (e.g., a peripheral component interconnect ("PCI") slot or a PCI express slot). Alternatively, sensor management system 301 need not be removable but may include one or more dedicated modules that may include memory (e.g., RAM) dedicated to the utilization of the module. In other embodiments, sensor management system 301 may be at least partially integrated into device 100. For example, a module of sensor management system 301 may utilize a portion of device memory assembly 104 of device 100. Any or each module of sensor management system 301 may include its own processing circuitry and/or memory. Alternatively, any or each module of sensor management system 301 may share processing circuitry and/or memory with any other module of sensor management system 301 and/or processor assembly 102 and/or memory assembly 104 of device 100.

As described above, one aspect of the present technology is the gathering and use of data available from various sources to determine one or more head gestures of a user (e.g., a wearer of an HWD). The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.) and/or mindfulness, date of birth, or any other identifying or personal information.

The present disclosure recognizes that the use of such personal information data, in the present technology, can be used to the benefit of users. For example, the personal information data can be used to improve the determination of sensor states of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the determination of sensor states of a user of an electronic device can be made based on non-personal information data or a bare minimum amount of personal information, such as the content being requested by the device associated with a user, other non-personal information available to the device, or publicly available information.

While there have been described systems, methods, and computer-readable media for monitoring a user of a head-wearable electronic device with multiple light-sensing assemblies, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "back," "top" and "bottom" and "side," "above" and "below," "length" and "width" and "thickness" and "diameter" and "cross-section" and "longitudinal," "X-" and "Y-" and "Z-," and the like, may be used herein only for convenience, and that no fixed or absolute directional or orientational limitations are intended by the use of these terms. For example, the components of an HWD can have any desired orientation. If reoriented, different directional or orientational terms may need to be used in their description, but that will not alter their fundamental nature as within the scope and spirit of the subject matter described herein in any way.

Therefore, those skilled in the art will appreciate that the concepts of the disclosure can be practiced by other than the described embodiments, which are presented for purposes of illustration rather than of limitation.

The invention claimed is:

1. A method of detecting gestures of a user at an electronic device including one or more light-sensing assemblies, the method comprising:

collecting light sensor data from one or more light-sensing components of a first light-sensing assembly during a sensing period; and detecting a level of ambient light received by one or more light-sensing components of the first light-sensing assembly;

in accordance with a determination that one or more first criteria are satisfied, including a criterion that is satisfied when a level of ambient light received by each of the one or more light-sensing components of the first light-sensing assembly is below a first threshold of saturation, selecting each channel of light sensor data corresponding to each of the one or more light-sensing components; and in accordance with a determination that the one or more first criteria are not satisfied, selecting one or more channels of light sensor data corresponding to a portion of the one or more light-sensing components of the first light-sensing assembly or forgoing selecting a channel of light sensor data.

2. The method of claim 1, further comprising:

in accordance with a determination that the one or more first criteria are not satisfied:

determining whether each of the one or more light-sensing components satisfies one or more second criteria, including a criterion that is satisfied when the level of ambient light received by each of the one or more light-sensing components of the first light-sensing assembly is below a second threshold of saturation.

3. The method of claim 2, wherein the second threshold of saturation is greater than the first threshold of saturation.

4. The method of claim 2, further comprising:

in accordance with a determination that each of the one or more light-sensing components satisfies the one or more second criteria:

selecting the one or more channels of light sensor data corresponding to a first subset of the one or more light-sensing components that satisfy one or more third criteria, including a criterion that is satisfied when the level of ambient light received by each of the first subset of the one or more light-sensing components is below a third threshold of saturation.

5. The method of claim 4, wherein the third threshold of saturation is greater than the second threshold of saturation.

6. The method of claim 4, further comprising:

identifying a second subset of the one or more light-sensing components, wherein each of the second subset of the one or more light-sensing components fails to satisfy the one or more third criteria; and in accordance with a determination that one or more of the second subset of the one or more light-sensing components fail to satisfy one or more fourth criteria, including a criterion that is satisfied when the level of ambient light received by each of one or more each of light-sensing components of the second subset is below a fourth threshold of saturation, terminating the sensing period.

7. The method of claim 6, wherein in accordance with a determination that one or more of the second subset of the one or more light-sensing components satisfy the one or more fourth criteria, continuing the sensing period.

8. The method of claim 6, wherein the fourth threshold of saturation is greater than the third threshold of saturation.

9. An electronic device, comprising:

one or more processors;

memory; and one or more programs, wherein the one or more programs are stored in the memory and configured to be executed by the one or more processors, the one or more programs including instructions for:

collecting light sensor data from one or more light-sensing components of a first light-sensing assembly during a sensing period; and detecting a level of ambient light received by one or more light-sensing components of the first light-sensing assembly;

in accordance with a determination that one or more first criteria are satisfied, including a criterion that is satisfied when a level of ambient light received by each of the one or more light-sensing components of the first light-sensing assembly is below a first threshold of saturation, selecting each channel of light sensor data corresponding to each of the one or more light-sensing components; and in accordance with a determination that the one or more first criteria are not satisfied, selecting one or more channels of light sensor data corresponding to a portion of the one or more light-sensing components of the first light-sensing assembly or forgoing selecting a channel of light sensor data.

10. The electronic device of claim 9, the one or more programs further comprising instructions for:

in accordance with a determination that the one or more first criteria are not satisfied: determining whether each of the one or more light-sensing components satisfies one or more second criteria, including a criterion that is satisfied when the level of ambient light received by each of the one or more light-sensing components of the first light-sensing assembly is below a second threshold of saturation.

11. The electronic device of claim 10, wherein the second threshold of saturation is greater than the first threshold of saturation.

12. The electronic device of claim 10, the one or more programs further comprising instructions for:

in accordance with a determination that each of the one or more light-sensing components satisfies the one or more second criteria:

selecting the one or more channels of light sensor data corresponding to a first subset of the one or more light-sensing components that satisfy one or more third criteria, including a criterion that is satisfied when the level of ambient light received by each of the first subset of the one or more light-sensing components is below a third threshold of saturation.

13. The electronic device of claim 12, wherein the third threshold of saturation is greater than the second threshold of saturation.

14. The electronic device of claim 12, the one or more programs further comprising instructions for:

identifying a second subset of the one or more light-sensing components, wherein each of the second subset of the one or more light-sensing components fails to satisfy the one or more third criteria; and in accordance with a determination that one or more of the second subset of the one or more light-sensing components fail to satisfy one or more fourth criteria, including a criterion that is satisfied when the level of ambient light received by each of one or more each of light-sensing components of the second subset is below a fourth threshold of saturation, terminating the sensing period.

15. A non-transitory computer readable storage medium storing one or more programs, the one or more programs comprising instructions, which when executed by one or more processors of an electronic device, cause the electronic device to:

collect light sensor data from one or more light-sensing components of a first light-sensing assembly during a sensing period; and detect a level of ambient light received by one or more light-sensing components of the first light-sensing assembly;

in accordance with a determination that one or more first criteria are satisfied, including a criterion that is satisfied when a level of ambient light received by each of the one or more light-sensing components of the first light-sensing assembly is below a first threshold of saturation, select each channel of light sensor data corresponding to each of the one or more light-sensing components; and in accordance with a determination that the one or more first criteria are not satisfied, select one or more channels of light sensor data corresponding to a portion of the one or more light-sensing components of the first light-sensing assembly or forgoing selecting a channel of light sensor data.

16. The non-transitory computer readable storage medium of claim 15, the one or more programs further comprising instructions which cause the electronic device to:

in accordance with a determination that the one or more first criteria are not satisfied: determine whether each of the one or more light-sensing components satisfies one or more second criteria, including a criterion that is satisfied when the level of ambient light received by each of the one or more light-sensing components of the first light-sensing assembly is below a second threshold of saturation.

17. The non-transitory computer readable storage medium of claim 16, wherein the second threshold of saturation is greater than the first threshold of saturation.

18. The non-transitory computer readable storage medium of claim 16, the one or more programs further comprising instructions which cause the electronic device to:

in accordance with a determination that each of the one or more light-sensing components satisfies the one or more second criteria:

select the one or more channels of light sensor data corresponding to a first subset of the one or more light-sensing components that satisfy one or more third criteria, including a criterion that is satisfied when the level of ambient light received by each of the first subset of the one or more light-sensing components is below a third threshold of saturation.

19. The non-transitory computer readable storage medium of claim 18, wherein the third threshold of saturation is greater than the second threshold of saturation.

20. The non-transitory computer readable storage medium of claim 18, the one or more programs further comprising instructions which cause the electronic device to:

identify a second subset of the one or more light-sensing components, wherein each of the second subset of the one or more light-sensing components fails to satisfy the one or more third criteria; and in accordance with a determination that one or more of the second subset of the one or more light-sensing components fail to satisfy one or more fourth criteria, including a criterion that is satisfied when the level of ambient light received by each of one or more each of light-sensing components of the second subset is below a fourth threshold of saturation, terminate the sensing period.

* * * * *